United States Patent [19]
Fox et al.

[11] Patent Number: 5,832,456
[45] Date of Patent: *Nov. 3, 1998

[54] SYSTEM AND METHOD FOR WEATHER ADAPTED, BUSINESS PERFORMANCE FORECASTING

[75] Inventors: Frederic D. Fox, Wayne; Douglas R. Pearson, Wyomissing Hills; Diane Caine, Newark; Steven Mann, Philadelphia, all of Pa.; Ron M. Shapiro, Franklin, Mich.; Harve C. Light, Buckingham, Mich.; Suzanne M. Rodriguez, Troy, Mich.

[73] Assignee: Strategic Weather Services, Wayne, Pa.

[ * ] Notice: The term of this patent shall not extend beyond the expiration date of Pat. No. 5,491,629.

[21] Appl. No.: 588,248

[22] Filed: Jan. 18, 1996

[51] Int. Cl.$^6$ .................................................. G06F 17/60
[52] U.S. Cl. ............................................................. 705/10
[58] Field of Search .............................. 395/210; 705/10

[56] References Cited

U.S. PATENT DOCUMENTS

| | | | |
|---|---|---|---|
| 3,808,410 | 4/1974 | Schlesinger | 235/156 |
| 4,015,366 | 4/1977 | Hall, III | 47/1 |
| 4,218,755 | 8/1980 | Root | 364/900 |
| 4,766,539 | 8/1988 | Fox | 364/401 |
| 4,784,150 | 11/1988 | Voorhies et al. | 128/664 |
| 5,063,506 | 11/1991 | Brockwell et al. | 364/402 |
| 5,128,861 | 7/1992 | Kagami et al. | 364/403 |
| 5,128,862 | 7/1992 | Mueller | 364/405 |

(List continued on next page.)

FOREIGN PATENT DOCUMENTS

| | | |
|---|---|---|
| 1-236 396 | 9/1989 | Japan . |
| 1-259 488 | 10/1989 | Japan . |
| 2-268 396 | 11/1990 | Japan . |
| 2-299 059 | 12/1990 | Japan . |
| 0 477 896 | 3/1992 | Japan . |
| 4-135 271 | 5/1992 | Japan . |
| 4-353 970 | 12/1992 | Japan . |
| 5-189 406 | 7/1993 | Japan . |
| 676 161 | 3/1994 | Japan . |
| 6-149 833 | 5/1994 | Japan . |
| 4-135271 | 6/1994 | Japan ............................. G06F 15/21 |

OTHER PUBLICATIONS

Murrell, M.; The Weather Business; InterCity; pp. 29–32, Feb. 1991.

Demand Model & Frecasting System; CMI Competitive Solutions; Abstract, Jan. 22, 1991.

Best, et al., "Air Weather Service Model Output Statistics Systems", *USAF Air Weather Serive,* NTIS, AD–A139129, 1983.

Cave, "Weather Service Is a Boon To System Dispatchers", *Transmission & Distribution,* 43(8): 165, 166, 168–169, 1991.

(List continued on next page.)

*Primary Examiner*—Gail O. Hayes
*Assistant Examiner*—William N. Hughet
*Attorney, Agent, or Firm*—Sterne, Kessler, Goldstein & Fox, PLLC

[57] ABSTRACT

A system and method for forecasting future retail performance are described herein. The system includes a storage device that stores a sales history database, a weather history database, and a weather forecast database. An analyzer determines the extent to which past retail performance of a plurality of products at a plurality of locations was affected by weather using the sales history database and the weather history database. A configurator, coupled to the analyzer, estimates expected future retail performance of the products at the stores for a plurality of future time periods using the weather forecast database and results produced by the analyzer. A graphical user interface, coupled to the analyzer and the configurator, enables users to view and manipulate results produced by the analyzer and the configurator to thereby forecast future retail performance of the products at the locations.

72 Claims, 43 Drawing Sheets

U.S. PATENT DOCUMENTS

| | | | |
|---|---|---|---|
| 5,130,925 | 7/1992 | Janes et al. | 364/420 |
| 5,140,523 | 8/1992 | Frankel et al. | 364/420 |
| 5,168,445 | 12/1992 | Kawashima et al. | 364/403 |
| 5,189,606 | 2/1993 | Burns et al. | 364/401 |
| 5,208,665 | 5/1993 | McCalley et al. | 358/86 |
| 5,237,496 | 8/1993 | Kagami et al. | 364/401 |
| 5,250,941 | 10/1993 | McGregor et al. | 340/825.25 |
| 5,253,165 | 10/1993 | Leiseca et al. | 364/407 |
| 5,283,865 | 2/1994 | Johnson | 395/161 |
| 5,295,069 | 3/1994 | Hersey et al. | 364/419.17 |
| 5,309,355 | 5/1994 | Lockwood | 364/401 |
| 5,491,629 | 2/1996 | Fox et al. | 364/420 |
| 5,521,813 | 5/1996 | Fox et al. | 364/401 |

OTHER PUBLICATIONS

Hurrell, "The Weather Business", *Intercity*, pp. 29, 31–32, Feb. 1991.

"*Demand Modeling & Forecasting System*", Business Software Database®, date of release: 1984, available in DIALOG, File No. 256. Abstract only.

Brennan, "Portfolio Managers Weather Global Risk Management Challenge", *Wall Street Computer Review*, 7(1):20, 1989.

Jensen, Cary and Anderson, Loy, *Harvard Graphics: The Complete Reference*, Osborne McGraw–Hill, pp. 5, 16, 17, 126–129, 737–747, 1990.

Mitchell et al., "Where No Computer Has Gone Before: Massively Parallel Processing Promises Unparalled Performance", *Business Week*, pp. 81–84, 88, 1991.

The Met Office, "The Weather Initiative", Berkshire, England.

Engle, R.F. et al., "Modeling Peak Electricity Demand", *Journal of Forecasting*, vol. 11, No. 3, pp. 241–251, 1992.

*Microsoft Access® User's Guide*, Microsoft Corporation, pp. 22–27, 36–39, 327–335, 370–373, 395–447, 1992.

*Microsoft Excel® User's Guide*, Microsoft Corporation, pp. 280–281, 596–600, 706–708, 1992.

"*Down to Earth Sales Analysis 3.1*", Business Software Database®, date of release: 1989, available in DIALOG, File No. 256. Abstract only.

"*IMREX Demand Forcasting System*", Business Software Datebase®, date of release: 1984, available in DIALOG, File No. 256. Abstract only.

Ehrenberg, A.S.C. et al., "The After Effects of Price–Related Consumer Promotions", *Journal of Advertising Research*, vol. 34, No. 4, pp. 11–22, 1994.

SALES HISTORY 304

| YEAR | PRODUCT | STORE | DATA TYPE | P1 | P2 | P3 | P4 | P5 | P6 |
|------|---------|-----------|-------------|----|----|----|----|----|----|
| 1994 | HATS | STORE 001 | NET DOLLARS | 0 | 0 | 60 | 20 | 40 | 30 |
| 1995 | HATS | STORE 001 | NET DOLLARS | 0 | 0 | 30 | 40 | 70 | 70 |
| 1994 | HATS | STORE 001 | ITEMS SOLD | 0 | 0 | 6 | 2 | 4 | 3 |
| 1995 | HATS | STORE 001 | ITEMS SOLD | 0 | 0 | 3 | 4 | 7 | 7 |

702 → (row 1)
704 → (row 2)
706 → (row 3)
708 → (row 4)

FIG.7

| YEAR | MA | DATA TYPE | P1 | P2 | P3 | P4 | P5 | P6 |
|---|---|---|---|---|---|---|---|---|
| 1994 | MSA 100 | TEMP.SEA | 46 | 47 | 50 | 51 | 54 | 55 |
| 1995 | MSA 100 | TEMP.SEA | 46 | 47 | 49 | 51 | 53 | 55 |
| 1994 | MSA 100 | SNOW.SEA | 0.7 | 0.2 | 0.2 | 0.1 | 0 | 0.1 |
| 1995 | MSA 100 | SNOW.SEA | 0.8 | 0.2 | 0.2 | 0.1 | 0 | 0 |
| 1994 | MSA 100 | PREC.SEA | 1.01 | 1.03 | 1.08 | 1.1 | 1.12 | 1.1 |
| 1995 | MSA 100 | PREC.SEA | 1.01 | 1.03 | 1.07 | 1.1 | 1.12 | 1.1 |
| 1994 | MSA 100 | SNOW | 0 | 0 | 0 | 0 | 1.2 | 0.3 |
| 1995 | MSA 100 | SNOW | 0 | 0 | 0 | 0 | 0 | 0 |
| 1994 | MSA 100 | PREC | 1.5 | 0.4 | 0.9 | 1.3 | 1.7 | 0.3 |
| 1995 | MSA 100 | PREC | 1.1 | 0.01 | 2.68 | 1.78 | 0.48 | 0.01 |
| 1994 | MSA 100 | TEMP | 49 | 43 | 45 | 47 | 50 | 42 |
| 1995 | MSA 100 | TEMP | 53 | 51 | 56 | 50 | 58 | 54 |
| 1994 | MSA 100 | TEMP.CAT | 1 | -1 | -1 | -1 | -1 | -1 |
| 1995 | MSA 100 | TEMP.CAT | 1 | -1 | -1 | 0 | -1 | -1 |
| 1994 | MSA 100 | PREC.CAT | 1 | -1 | -1 | -1 | -1 | -1 |
| 1995 | MSA 100 | PREC.CAT | 1 | -1 | -1 | -1 | -1 | -1 |

WEATHER HISTORY 306

FIG.8

- TEMPERATURE/PRECIPITATION
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL
- TEMPERATURE/SNOW
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL
- SUSTAINED WEATHER
    - TEMPERATURE SUSTAINED 2 PERIODS
    - TEMPERATURE SUSTAINED 3 PERIODS
    - PRECIPITATION SUSTAINED 2 PERIODS
    - PRECIPITATION SUSTAINED 3 PERIODS
    - SNOW SUSTAINED 2 PERIODS
    - SNOW SUSTAINED 3 PERIODS
- TEMPERATURE/PRECIPITATION LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL
- TEMPERATURE/SNOW LAG 1 PERIOD
    - SEASONAL/SEASONAL
    - SEASONAL/ABOVE SEASONAL
    - SEASONAL/BELOW SEASONAL
    - ABOVE SEASONAL/SEASONAL
    - ABOVE SEASONAL/ABOVE SEASONAL
    - ABOVE SEASONAL/BELOW SEASONAL
    - BELOW SEASONAL/SEASONAL
    - BELOW SEASONAL/ABOVE SEASONAL
    - BELOW SEASONAL/BELOW SEASONAL

WEATHER PATTERNS 902

FIG.9

STORE/MA TABLE 1002

| STORE | MA |
|---|---|
| STORE 001 | MSA100 |

FIG.10

| BELOW SEASONAL | -1 |
|---|---|
| SEASONAL | 0 |
| ABOVE SEASONAL | 1 |

WEATHER PATTERN LEGEND 1102

FIG.11

ANALYZER OUTPUT DATA 310

| WEATHER PATTERN | STORE | PRODUCT | POSITIVE COUNT | NEGATIVE COUNT | NO CHANGE COUNT |
|---|---|---|---|---|---|
| t1P1 | STORE 001 | HATS | 1 | 0 | 0 |
| t1S1 | STORE 001 | HATS | 3 | 1 | 0 |
| t1S-1 | STORE 002 | HATS | 2 | 3 | 1 |
| t0S1 | STORE 001 | BOOTS | 0 | 2 | 2 |

FIG.12

| YEAR | MA | DATA TYPE | P1 | P2 | P3 | P4 | P5 | P6 |
|---|---|---|---|---|---|---|---|---|
| N+1 | MSA 100 | SNOW | 0.9 | 0.4 | 0.3 | 0.2 | 0 | 0 |
| N+1 | MSA 100 | PREC | 1.1 | 1.05 | 1.05 | 1.00 | 1.15 | 1.2 |
| N+1 | MSA 100 | TEMP | 48 | 49 | 50 | 53 | 55 | 57 |
| N+1 | MSA 100 | TEMP.CAT | -1 | -1 | -1 | -1 | -1 | -1 |
| N+1 | MSA 100 | PREC.CAT | -1 | -1 | -1 | -1 | -1 | -1 |
| N+1 | MSA 100 | SNOW.CAT | -1 | -1 | -1 | -1 | -1 | -1 |
| N+1 | MSA 100 | SNOW.SEA | 0.8 | 0.4 | 0.3 | 0.1 | 0 | 0 |
| N+1 | MSA 100 | PREC.SEA | 1.00 | 1.03 | 1.06 | 1.05 | 1.10 | 1.1 |
| N+1 | MSA 100 | TEMP.SEA | 47 | 47 | 49 | 52 | 54 | 55 |

WEATHER FORECAST DATA 312

| CITIES ⇩ | FORECAST VS. SEASONAL ⇩ | GREATER THAN ⇩ | 88 ⇩ | DEGREES(F) ⇩ |

| TIME PERIOD | TEMP | PREC | SNOW |
|---|---|---|---|
| 6/22/96 | 90 | 0.02 | 0.00 |
| 6/29/96 | 89 | 0.02 | 0.00 |
| 7/06/96 | 93 | 0.03 | 0.00 |
| 7/13/96 | 91 | 0.03 | 0.00 |
| 7/20/96 | 92 | 0.03 | 0.00 |
| 7/27/96 | 92 | 0.13 | 0.00 |
| 8/03/96 | 92 | 0.02 | 0.00 |
| 8/10/96 | 93 | 0.02 | 0.00 |
| 8/17/96 | 91 | 0.02 | 0.00 |
| 8/24/96 | 90 | 0.02 | 0.00 |

PALM SPRINGS, CA

| TIME PERIOD | TEMP | PREC | SNOW |
|---|---|---|---|
| 9/09/95 | 89 | 0.08 | 0.00 |
| 6/15/96 | 89 | 0.02 | 0.00 |
| 6/22/96 | 92 | 0.02 | 0.00 |
| 6/29/96 | 93 | 0.03 | 0.00 |
| 7/06/96 | 95 | 0.04 | 0.00 |
| 7/13/96 | 95 | 0.04 | 0.00 |

FIG. 32

LEWIS REPORT FOR
WASHINGTON, DC

LEWIS WEATHER

| | | 11/25/95 | 12/02/95 | 12/09/95 | 12/16/95 | 12/23/95 | 12/30/95 | 1/06/96 |
|---|---|---|---|---|---|---|---|---|
| TEMP | SEAS | 45-48 | 43-45 | 41-44 | 38-42 | 36-41 | 34-39 | 33-39 |
| | LY | 47 | 45 | 51 | 40 | 44 | 41 | 32 |
| | | SEAS | SEAS | WARM | SEAS | WARM | WARM | COLD |
| | FCST | 45-48 | 43-45 | 41-44 | >=43 | 36-41 | <=33 | 33-39 |
| | | SEAS | SEAS | SEAS | WARM | SEAS | COLD | SEAS |
| PRECIP | SEAS | 0.4-1.0 | 0.4-1.0 | 0.4-1.0 | 0.5-1.0 | 0.4-1.0 | 0.4-0.9 | 0.4-0.9 |
| | LY | .5 | .4 | 1.6 | .2 | .1 | .4 | 1.1 |
| | | SEAS | SEAS | WET | DRY | DRY | SEAS | WET |
| | FCST | 0.4-1.0 | >=1.1 | 0.4-1.0 | <=0.4 | 0.4-1.0 | 0.4-0.9 | 0.4-0.9 |
| | | SEAS | WET | SEAS | DRY | SEAS | SEAS | SEAS |
| SNOW | SEAS | 0.3-0.7 | 0.3-0.9 | 0.3-1.1 | 0.3-1.3 | 0.3-1.5 | 0.3-1.8 | 0.3-2.2 |
| | LY | 0 | 0 | 0 | 0 | 0 | 0 | 0 |
| | | Lt/Nn | Lt/Nn | Lt/Nn | Lt/Nn | Lt/Nn | Lt/Nn | Lt/Nn |
| | FCST | <=0.2 | <=0.2 | <=0.2 | <=0.2 | <=0.2 | <=0.2 | <=0.2 |
| | | Lt/Nn | Lt/Nn | Lt/Nn | Lt/Nn | Lt/Nn | 0.3-1.8 | Lt/Nn |
| | | | | | | | SEAS | |

FOR: BUFFALO, NY — 3504

INTERVAL REPORT 3502

| BUFFALO | 1 | 2 | 3 | 4 | 5 | 6 | 7 | 8 | 9 |
|---|---|---|---|---|---|---|---|---|---|
| TEMP SEASONAL | 78 | 79 | 80 | 80 | 80 | 81 | 81 | 81 | 82 |
| TEMP LY | 68 COLD | 69 COLD | 67 COLD | 75 SEAS | 86 WARM | 87 WARM | 93 WARM | 92 SEAS | 92 SEAS |
| TEMP FORECAST | MID 70S COLD ≤75 <br> 3506 | | MID 80S WARM ≥84 <br> 3508 | | UPPER 70'S– LOW 80'S SEASONAL 75-83 <br> 3510 | | | LOW 90S VERY WARM ≥91 <br> 3512 | |
| PRECIP SEASONAL | | | | | | | | | |
| PRECIP LY | | | | | | | | | |
| PRECIP FORECAST | | | | | | | | | |
| SNOW SEASONAL | | | | | | | | | |
| SNOW LY | | | | | | | | | |
| SNOW FORECAST | | | | | | | | | |
| NARRATIVE–JUNE WX HIGHLIGHTS | | | | | | | | | |

DAYS

3514

| 21 | 22 ●● | 23 | 24 ●● | 25 | 26 | 27 |
|---|---|---|---|---|---|---|
| 28 | 29 | 30 | 31 | | JULY<br>M T W T F S S<br>              1 2<br>3 4 5 6 7 8 9<br>10 11 12 13 14 15 16<br>17 18 19 20 21 22 23<br>24 25 26 27 28 29 30<br>31 | SEPTEMBER<br>S M T W T F S<br>            1 2 3<br>4 5 6 7 8 9 10<br>11 12 13 14 15 16 17<br>18 19 20 21 22 23 24<br>25 26 27 28 29 30 |

● NEW MOON 26TH
○ FULL MOON 10TH

AUGUST 1995:
TEMPERATURE: AUGUST 1994 COULD BE SUMMARIZED AS WARM IN THE WEST AND COOL IN THE EAST. FOR 1995, MOST OF THE NORTHCENTRAL AND EASTERN STATES WILL BE WARMER THAN LAST YEAR, PARTICULARLY AROUND THE DAKOTAS, MINNESOTA, IOWA AND WISCONSIN. MOST LOCATIONS IN THE WEST WILL BE SIMILAR TO LAST YEAR OR COOLER, ESPECIALLY ALONG THE ROCKIES. IT LOOKS TO BE COOLEST WHEN COMPARED TO 1994 FROM WEST TEXAS ACROSS NEW MEXICO INTO ARIZONA. AUGUST SHOULD SEE MOSTLY ABOVE NORMAL TEMPERATURES FOR THE MONTH ACROSS THE NORTHERN HALF OF THE COUNTRY, BUT ESPECIALLY THE NORTHCENTRAL STATES SUCH AS MONTANA.

SYSTEM AND METHOD FOR WEATHER ADAPTED, BUSINESS PERFORMANCE FORECASTING

CROSS-REFERENCE TO OTHER APPLICATIONS

The following applications of common assignee are related to the present application.

"System and Method for the Advanced Prediction of Weather Impact on Managerial Planning Applications," Ser. No. 08/002,847, filed Jan. 15, 1993, Attorney Docket No. 1481.0030000, now allowed, incorporated herein by reference in its entirety.

"A User Interface For Graphically Displaying the Impact of Weather on Managerial Planning," Ser. No. 08/504,952, filed Jul. 20, 1995, Attorney Docket No. 1481.0070001, currently pending, incorporated herein by reference in its entirety.

"System and Method for Determining the Impact of Weather and Other Factors on Managerial Planning Applications," Ser. No. 08/205,494, filed Mar. 4, 1994, Attorney Docket No. 1481.0080000, now allowed, incorporated herein by reference in its entirety.

BACKGROUND OF THE INVENTION

1. Field of the Invention

The present invention relates generally to business performance forecasting, and more particularly to weather adapted, business performance forecasting.

2. Related Art

A. Historical Perspective of Retailing

The retail industry has historically been influenced by the shape of the times. For example, the retail industry is impacted by war and peace, lifestyle changes, demographic shifts, attitude progressions, economic expansion and contraction, tax policies, and currency fluctuations.

The period from 1965 to 1975 was marked by growth and segmentation in the retail industry. New types of stores such as department stores, specialty stores, and discount stores appeared, increasing competition in the retail industry. One result of this growth was a decrease in gross margin (sales price −cost of goods sold). Another result was a shifting of supply sources. Originally, merchandise was supplied exclusively by vendors. However, segmentation and growth resulted in specialty chains and discounters manufacturing merchandise in-house (commonly known as vertical integration).

The period from 1975 to 1980 was marked by disillusionment and complexity in the retail industry. Inflation and women entering the work force in significant numbers resulted in a more sophisticated consumer. Many retailers began to rethink the basics of merchandising in terms of merchandise assortments, store presentations, customer service, and store locations. Other less sophisticated retailers continued on an undisciplined and unstructured policy of store growth.

The period from 1980 to 1990 was marked by recovery and opportunity in the retail industry. An economic boom stimulated consumer confidence and demand. This, coupled with the expansion of the previous period, paved the way for the retail industry to overborrow and overbuild. With their increased size, retailers became increasingly unable to manage and analyze the information flowing into their organizations.

B. Retailing Problems and Opportunities of Today

The problems and opportunities facing the retailer fall into two categories of factors: (1) external factors; and (2) internal (or industry) factors. External factors impacting the retail industry include, for example, adverse or favorable weather, rising labor costs, increasing property costs, increased competition, economics, increasing cost of capital, increasing consumer awareness, increasing distribution costs, changing demographics and zero population growth, decreasing labor pool, and flat to diminishing per capita income.

Internal (or industry) factors affecting the retail industry include, for example, large number of stores (decentralization), homogeneity among retailers, continuous price promotion (equates to decreased gross margin), decreasing customer loyalty, minimal customer service, physical growth limitations, and large quantities of specific retailer store information.

Growth and profitability can only be achieved by maximizing the productivity and profitability of the primary assets of the retail business: merchandise (inventory), people, and retail space. The above external and industry factors have added to a retailer's burdens of maintaining the productivity of these assets.

Of the three primary assets, merchandise productivity is particularly important due to the limiting effect of external and internal factors on people and space productivity (e.g., physical growth limitations and high labor costs). Merchandise productivity can be best achieved by maintaining effective mix of product in a store by product characteristic (merchandise assortments).

To achieve more effective merchandise assortments, a retailer must have a merchandise plan that provides the retailer with the ability to (1) define, source, acquire, and achieve specific target merchandise assortments for each individual store location; (2) achieve an efficient, non-disruptive flow from supply source to store; (3) maintain store assortments which achieve anticipated financial objectives; and (4) communicate effectively across all areas of the business to facilitate coordinated action and reaction.

Such an effective merchandise plan must consider all possible external and industry factors. To obtain this knowledge, a retailer must have responsive and easy access to the data associated with these factors, referred to as external and industry data, respectively. To assimilate and analyze this data, which comes from many sources and in many formats, retailers began utilizing management information systems (MIS). The primary function of the MIS department in the retail industry has been the electronic collection, storage, retrieval, and manipulation of store information. Mainframe-based systems were primarily utilized due to the large amount of store information generated. Store information includes any recordable event, such as purchasing, receiving, allocation, distribution, customer returns, merchandise transfers, merchandise markdowns, promotional markdowns, inventory, store traffic, and labor data. In contrast to the extensive collection and storage of internal data, these systems, did not typically process external data. Rather, this non-industry data was simply gathered and provided to the retailer for personal interpretation.

Since understanding of local and region level dynamics is a requisite for increased retailing productivity, retailers would essentially feed store information at the store level into massive mainframe databases for subsequent analysis to identify basic trends. However, the use of mainframes typically requires the expense of a large MIS department to process data requests. There is also an inherent delay from the time of a data request to the time of the actual execution. This structure prevented MIS systems from becoming cost effective for use by executives in making daily decisions, who are typically not computer specialists and thus rely on data requests to MIS specialists.

FIG. 37 illustrates a block diagram of a conventional MIS system architecture used in the retail industry. Referring to FIG. 37, an MIS architecture 3701 captures store information (one form of internal data) and electronically flows this information (data) throughout the organization for managerial planning and control purposes.

At point of sale 3704, scanners 3708 and electronic registers 3710 record transactions to create POS data 3706. These transactions include data related to customer purchases, customer returns, merchandise transfers, merchandise markdowns, promotional markdowns, etc. POS data 3706 is one form of store information 3716. Store information 3716 also includes other store data 3712. Other store data 3712 includes data related to receiving, allocation, distribution, inventory, store traffic, labor, etc. Other store data 3712 is generally generated by other in-store systems.

Store information 3716 is polled (electronically transferred) from point of sale 3704 by headquarters, typically by modem or leased-line means 3717. POS 3704 represents one typical location (retail store). However, MIS architecture 3701 can support multiple POS locations 3704.

A data storage and retrieval facility 3720 receives store information 3716 using computer hardware 3722 and software 3724. Data storage and retrieval facility 3720 stores store information 3716. Store information 3716 is retrieved into data analyzer 3727. Data analyzer 3727 shapes and analyzes store information 3716 under the command of a user to produce data, in the form of reports, for use in the preparation of a managerial plan 3730.

In the 1970's and 1980's, retrieval of store information 3716 into data analyzer 3727 and the subsequent report generation were manually or electronically generated through a custom request to MIS department personnel. More recently, in response to the need for a rapid executive interface to data for managerial plan preparation, a large industry developed in Executive Information Systems (EIS). Referring to FIG. 37, an EIS 3729, which typically operates on a personal computer workstation platform, interfaces with the MIS mainframe or mid-range database in data storage and retrieval facility 3720. An EIS system is a computer-based system by which information and analysis can be accessed, created, packaged and/or delivered for use on demand by users who are non-technical in background. Also, EIS systems perform specific managerial applications without extensive interaction with the user, which reduces or eliminates the need for computer software training and documentation.

In contrast to store information 3716, external information 3736 consists of manual reports covering such topics as economic forecasts, demographic changes, and competitive analysis. In conventional systems, external information 3716 is separately made available to the user for consideration in developing managerial plan 3730.

Technical improvements in speed and storage capability of personal computers (PCS) have allowed this trend towards EIS systems to take place, while most firms still maintain a mainframe or minicomputer architecture for basic POS data storage and processing. The advent of powerful mini computers, local area networks (LANs), and PC systems has resulted in many of the traditional mainframe retailing applications migrating to these new platforms.

C. The Nature of Weather Anomalies

Weather anomalies are more of a regional and local event rather than a national phenomenon in countries as geographically large as the United States. This is not to say that very anomalous weather cannot affect an entire country or continent, creating, for example, abnormally hot or cold seasons. However, these events are less frequent than regional or local aberrations. Significant precipitation and temperature deviations from normal events occur continually at time intervals in specific regions and locations throughout the United States.

Because actual daily occurrences fluctuate around the long term "normal" or "average" trend line (in meteorology, normal is typically based on a 30 year average), past historical averages can be a very poor predictor of future weather on a given day and time at any specific location. Implicitly, weather effects are already embedded in an MIS POS database, so the retailer is consciously or unconsciously using some type of historical weather as a factor in any planning approach that uses trendline forecasts based on historical POS data for a given location and time period.

D. Weather Relative to National Planning Applications

At a national level, weather is only one of several important variables driving consumer demand for a retailer's products. Several other factors are, for example, price, competition, quality, advertising exposure, and the structure of the retailer's operations (number of stores, square footage, locations, etc). Relative to the national and regional implementation of planning, the impact of all of these variables dominates trendline projections.

As described above, POS databases track sales trends of specific categories at specific locations which are then aggregated and manipulated into regional and national executive information reports. Since the impact of local weather anomalies can be diluted when aggregated to the national levels (sharp local sales fluctuations due to weather tend to average out when aggregated into national numbers), the impact of weather has not received much scrutiny relative to national planning and forecasting.

E. Weather Relative to Regional and Local Planning Applications

The impact of weather on a regional and local level is direct and dramatic. At the store level, weather is often a key driver of sales of specific product categories. Weather also influences store traffic which, in turn, often impacts sales of all goods. Weather can influence the timing and intensity of markdowns, and can create stockout situations which replenishment cycles can not address due to the inherent time lag of many replenishment approaches.

The combination of lost sales due to stockouts and markdowns required to move slow inventory are enormous hidden costs, both in terms of lost income and opportunity costs. Aggregate these costs on a national level, and weather is one of the last major areas of retailing where costs can be carved out (eliminate overstocks) and stores can improve productivity (less markdown allows for more margin within the same square footage).

In short, weather can create windows of opportunity or potential pitfalls that are completely independent events relative to economics, demographics, consumer income, and competitive issues (price, quality). The cash and opportunity costs in the aggregate are enormous.

F. Conventional Approaches Addressing Weather Impact

Though the majority of retailers acknowledge the effects of weather, many do not consider weather as a problem per se, considering it as a completely uncontrollable part of the external environment.

However, the underlying problem is essentially one of prediction of the future; i.e., developing a predictive model. All retailers must forecast (informally or formally) how much inventory to buy and distribute based on expected demand and appropriate inventory buffers. Hence, many conventional predictive modeling processes have been developed, none of which adequately address the impact of weather.

One conventional solution is to purposely not consider the impact of weather on retail sales. In such instances, the retailer will maintain high inventory levels and rapidly replenish the inventory as it is sold. This approach creates large working capital needs to support such a large inventory.

Another conventional solution is for the retailer to qualitatively use weather information to anticipate future demands. This procedure, if used by decision makers, is very subjective and does not evaluate weather in a predictive sense. Nor does it quantify the effect of past and future weather on consumer demands.

Another conventional approach is the utilization of climatology. Climatology is the study of the climates found on the earth. Climatology synthesizes weather elements (temperature, precipitation, wind, etc.) over a long period of time (years), resulting in characteristic weather patterns for a given area for a given time frame (weekly, monthly, seasonably, etc.). This approach does not utilize forecasted weather as a parameter, which can vary considerably from any given time period from year to year for a given area. Climatology yields only the average weather condition, and is not indicative of the weather for any specific future time frame.

Manufacturers and retailers have been known to rely on broad projections developed by the National Weather Service (the governmental entity in the USA charged with disseminating weather data to the public) and other private forecasting firms. With reference to long range projections, these may be vague, broad, and lack regional or local specificity. It is of limited use since they are issued to cover anticipated weather averaged for 30, 60, or 90 day periods covering large geographic areas. This information cannot be quantified or easily integrated into an MIS-based planning system which is geared toward a daily or weekly time increment for specific location and time.

In summary, the above conventional solutions to weather planning problems in retail all suffer from one or several deficiencies which severely limit their commercial value, by not providing: (1) regional and/or local specificity in measuring past weather impact and projecting future weather impact, (2) the daily, weekly, and monthly increment of planning and forecasting required in the retail industry, (3) ample forecast leadtime required by such planning applications as buying, advertising, promotion, distribution, financial budgeting, labor scheduling, and store traffic analysis, (4) the quantification of weather impact required for precise planning applications such as unit buying and unit distribution, financial budget forecasting, and labor scheduling, (5) reliability beyond a 3 to 5 day leadtime, (6) a predictive weather impact model, which links quantitative weather impact measurement through historical correlation, with quantitative forecasts, (7) the ability to remove historical weather effects from past retail sales for use as a baseline in sales forecasting, (8) an entirely electronic, computerized, EIS implementation for ease of data retrieval/analysis with specific functions that solve specific managerial planning applications, and (9) a graphical user interface representing a predictive model in graphs, formats, and charts immediately useful to the specific managerial applications.

G. Scope of the Problem

The above discussion focused on the retail industry, i.e., the impact of weather on the retail industry. Naturally, the effects of weather are not confined to the retail industry. Instead, weather impacts all aspects of human endeavor. Accordingly, the discussion above applies equally well to many other applications, including but not limited to retail products and services, manufacturing/production (i.e., construction, utilities, movie production companies, advertising agencies, forestry, mining), transportation, the entertainment industry, the restaurant industry, etc.

SUMMARY OF THE INVENTION

The present invention is directed to a system and method for forecasting future retail performance. The system includes a storage device that stores a sales history database, a weather history database, and a weather forecast database. An analyzer determines the extent to which past retail performance of a plurality of products at a plurality of locations was affected by weather using the sales history database and the weather history database. A configurator, coupled to the analyzer, estimates expected future retail performance of the products at the stores for a plurality of future time periods using the weather forecast database and results produced by the analyzer. A graphical user interface, coupled to the analyzer and the configurator, enables users to view and manipulate results produced by the analyzer and the configurator to thereby forecast future retail performance of the products at the locations.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 7, 8, 9, 10, 11, 12, 13C, and 22 depict preferred databases used by the present invention;

FIGS. 23, 24, 25, 26, 27, 28, 29, 30, 31, 32, 33, 34, 35, 36, 36A, 36B, 38, 39, 40, 41, and 42 are windows or screen shots generated by the graphical user interface of the present invention.

DETAILED DESCRIPTION OF THE PREFERRED EMBODIMENT

Overview of the Invention

The present invention is directed to a system and method for retail performance forecasting. As used herein, the term "retail performance" refers to all statistical metrics related to retail sales performance, such as gross revenue, net revenue, unit sales, customer traffic, etc. For convenience, the present invention is described herein in the context of a retail environment. However, it should be understood that the invention is adapted and envisioned for use at any commercial level, such as manufacturing, distribution, value added reselling, etc., in addition to retail. Moreover, the present invention is well suited and adapted for use with any endeavor and/or industry and/or market that is potentially or actually impacted by weather. This includes, but is not limited to, retail products and services, manufacturing/production (i.e., construction, utilities, movie production companies, advertising agencies, forestry, mining), transportation, the entertainment industry, the restaurant industry, etc.

The present invention is "weather adapted." In other words, the present invention when forecasting retail performance takes the affect of weather into consideration. For example, suppose the invention is used to forecast the opportunity of the snow sled market for next January. In performing this forecasting function, the present invention will take into consideration the weather predictions for next January (whether snow will be below seasonal, seasonal, or above seasonal, for example). Because it takes weather into consideration, the present invention is generally more accurate than similar systems and methods that do not take the affect of weather into consideration.

Figure 1:
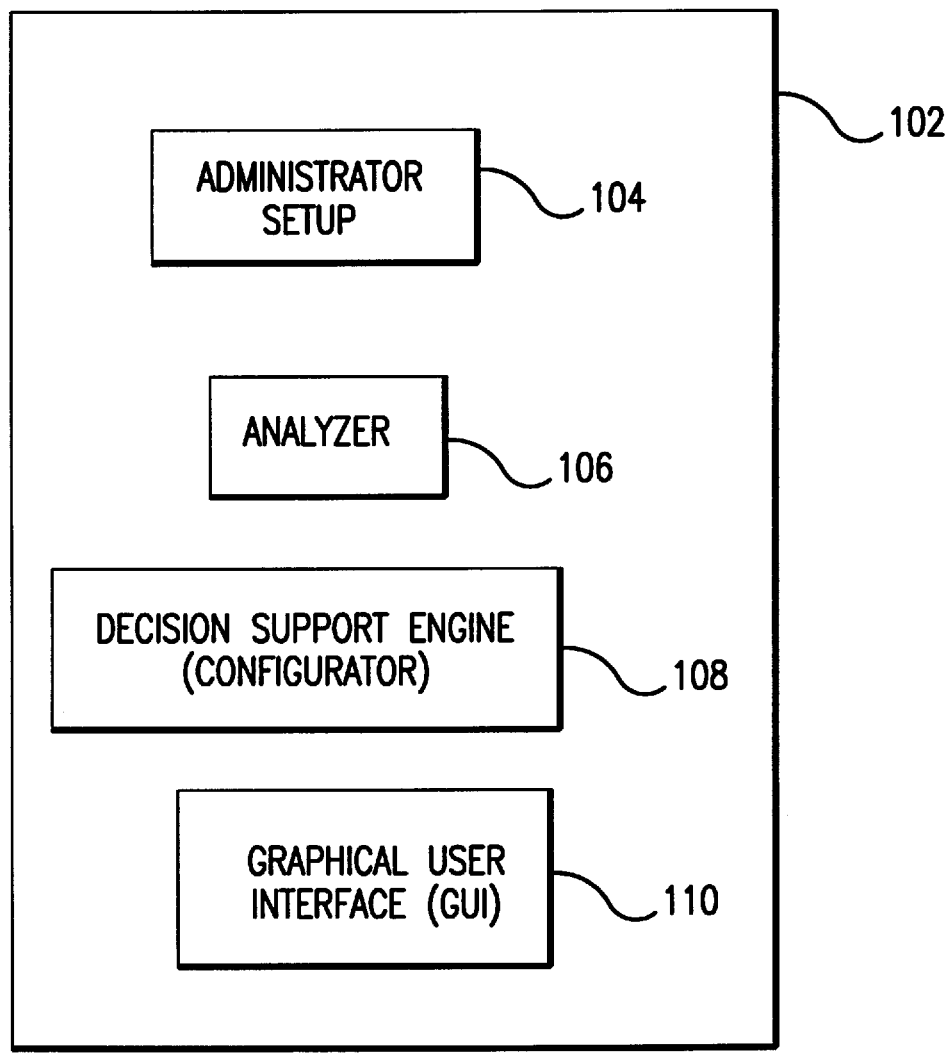
FIG. 1 is a block diagram of a weather adapted, retail performance forecasting system according to a preferred embodiment of the present invention.

FIG. 1 is a block diagram of a weather adapted, retail performance forecasting system 102 (also called system herein) according to a preferred embodiment of the present invention. The system 102 includes a Administrator Setup 104, an analyzer 106, a decision support engine 108 (also called configurator herein), and a graphical user interface (GUI) 110.

Figure 4:
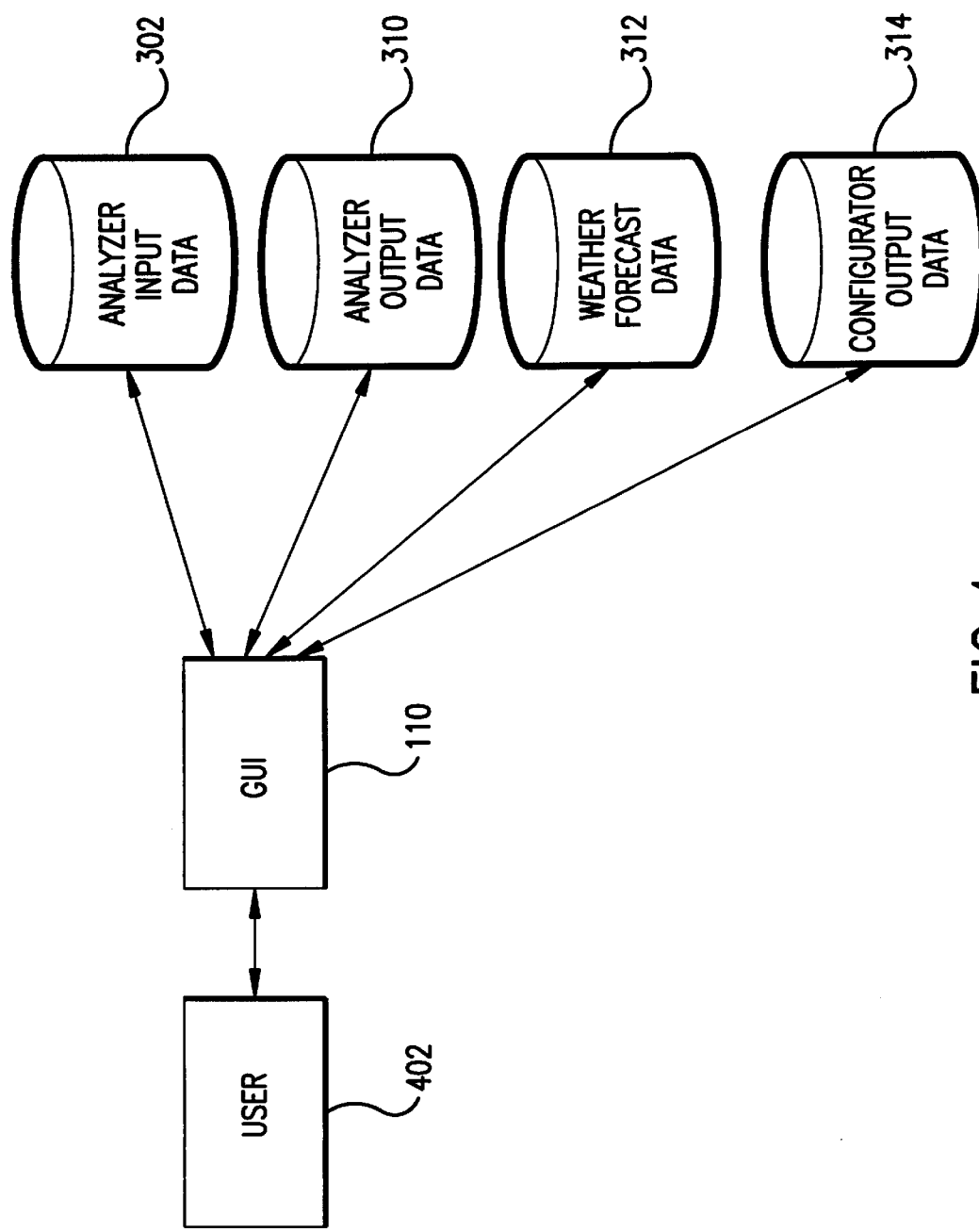
FIG. 4 is a dataflow diagram of a graphical user interface of the forecasting system.
Figure 5:
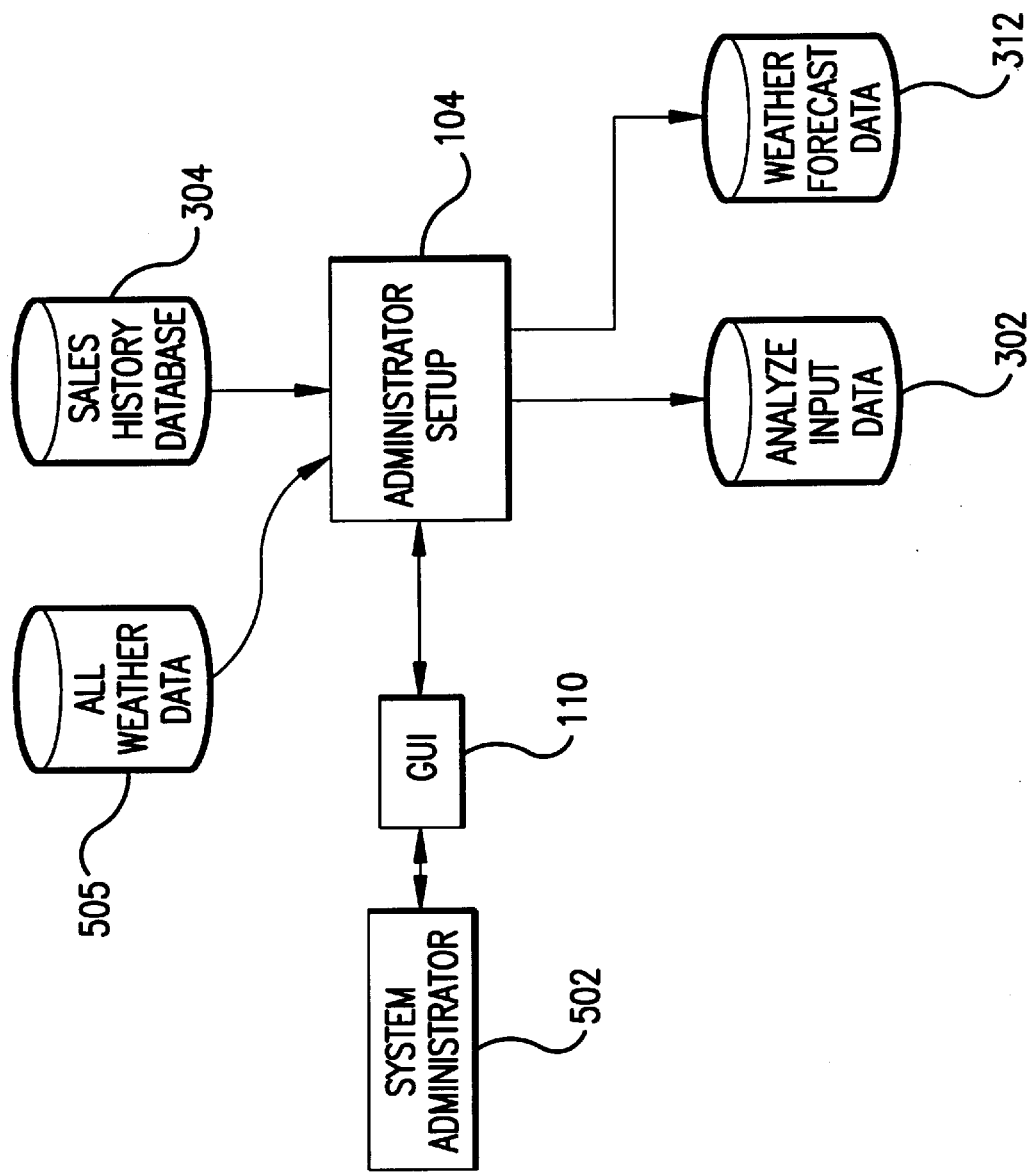
FIG. 5 is a dataflow diagram of administration setup of the forecasting system.
Figure 21:
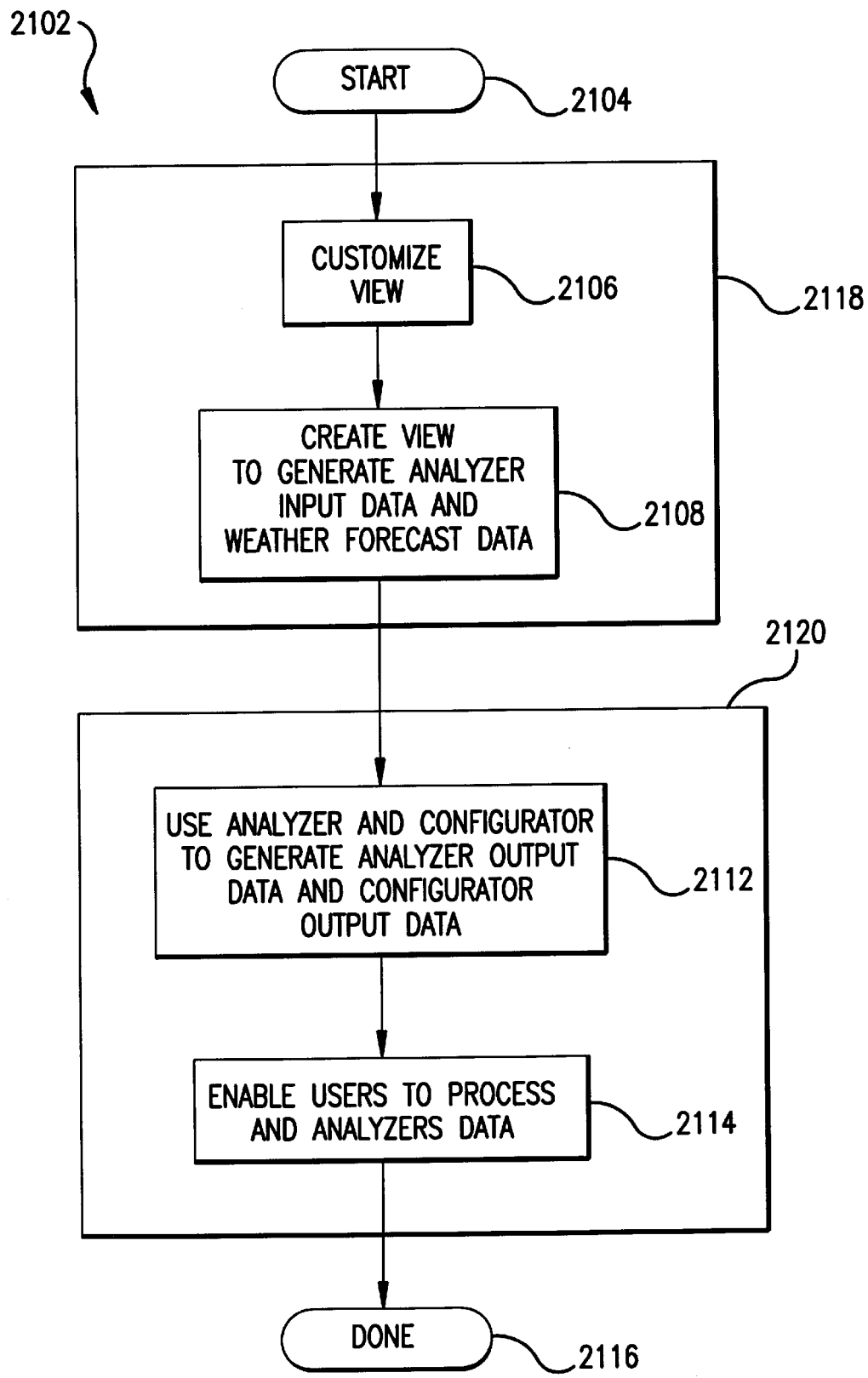

FIG. 21 presents a flowchart 2102 depicting the high-level operation of these components. In flowchart 2102, steps 2118 are performed by the Administrator Setup 104 in accordance with commands from a system administrator 502 (FIG. 5). Steps 2120 are performed by the analyzer 106, configurator 108, and GUI 110 in accordance with commands from an user 402 (FIG. 4). The system administrator 502 and user 402 may or may not be the same person. Flowchart 2102 shall now be described, with reference to FIG. 5 (a data flow diagram of the Administrator Setup 104), FIG. 3 (a data flow diagram of the analyzer 106 and configurator 108), and FIG. 4 (a data flow diagram of the GUI 110). Flowchart 2102 begins with step 2104, where control immediately passes to step 2106.

In step 2106, the Administrator Setup 104 and the GUI 110 enable the system administrator 502 to define a customized view per a party's specifications. Step 2106 shall now be described in detail with reference to FIG. 5.

The present invention makes use of weather and sales data 304, 505. The weather data includes seasonal weather data (for example, the average temperature in June), historical weather data (for example, the temperature last June), and forecast weather data (for example, a prediction as to what the temperature will be next June). The seasonal weather data, for example, seasonal temperature, represents a narrow range of temperatures, which is implementation dependent, for a specific location and period. It is based upon the 40% of occurrences centered around the mean temperature during a 30 year period. The historical weather data preferably represents a library of historical weather data covering two to five years, although other time spans are alternatively possible and envisioned by the present invention. The forecast weather data represents weather predictions for preferably fifteen months although other time spans are alternatively possible and envisioned by the present invention. Databases of seasonal weather data and historical weather data are available from many publicly and/or commercially available publications and services. The forecast weather data is commercially available from Strategic Weather Services of Wayne, Pa. Other forms of forecast weather data are available from other commercial sources, but these other forms cannot be used directly with the present invention. Instead, they must be modified so as to be consistent with the form and substance discussed herein.

The Weather Database 505 comprises Weather History 306, Weather Patterns 308 and Weather Forecasts 312. The Sales Database 304 represents a party's historical sales data. The party is an entity (such as a chain of retail stores) who wishes to use the forecasting system 102 to predict future retail performance. (The user 402 mentioned above is preferably an employee of the party.) The sales history database 304 preferably includes historical sales data pertaining to all products offered for sale at all of the party's commercial outlets. Typically, the sales data includes the past year's historical sales data, but may include other time spans.

As one will appreciated, Weather Database 505 and Sales history database 304 are potentially very large. Also, much of the information contained in the weather database 505 and sales database 304 may not be pertinent to needs of the party. For example, the party may be only interested in the past two years' historical weather data. Also, the party may only be interested in analyzing the performance of a subset of its commercial outlets, and/or a subset of the products that it offers. Accordingly, the present invention allows the party to filter the data from both the weather database 505 and the sales history database 304, and supply only the data desired to the Analyzer 106 from both databases by the System Administrator 502. The data filtering process is performed by the Administrator Setup 104.

Accordingly, in step 2106 the system administrator 502 interacts with the Administrator Setup 104 via the GUI 110 to customize a view (i.e., to establish the parameters of the impending view). The system administrator 502 customizes the view in accordance with specifications previously provided to the party. For example, the party may have specified to include only Stores A, B, and E in the view, and/or to include only performance data relating to shoes and shirts in the view, and/or to include only forecast weather data for January through May of next year. Step 2106 is described in greater detail below.

In step 2108, the Administrator Setup 104 creates a view in accordance with the party's specifications. In essence, the Administrator Setup 104 in step 2108 extracts from the weather database 505 and sales history database 304 the weather and sales information needed to satisfy the party's specifications as defined in step 2106 (for example, if the party specified shoes in step 2106, then retail performance data relating to shoes is extracted from the sales database 506 in step 2108). The Administrator Setup 104 stores the extracted data in an analyzer input database 302 and a weather forecast database 312.

The analyzer input database 302 is used in the Analyzer 106, the weather forecast database 312 is used in conjunction with the analyzer output database 310 in the configurator 108. The analyzer output database 310 and the weather forecast database 312 are utilized by the party to forecast future retail performance.

Figure 3:
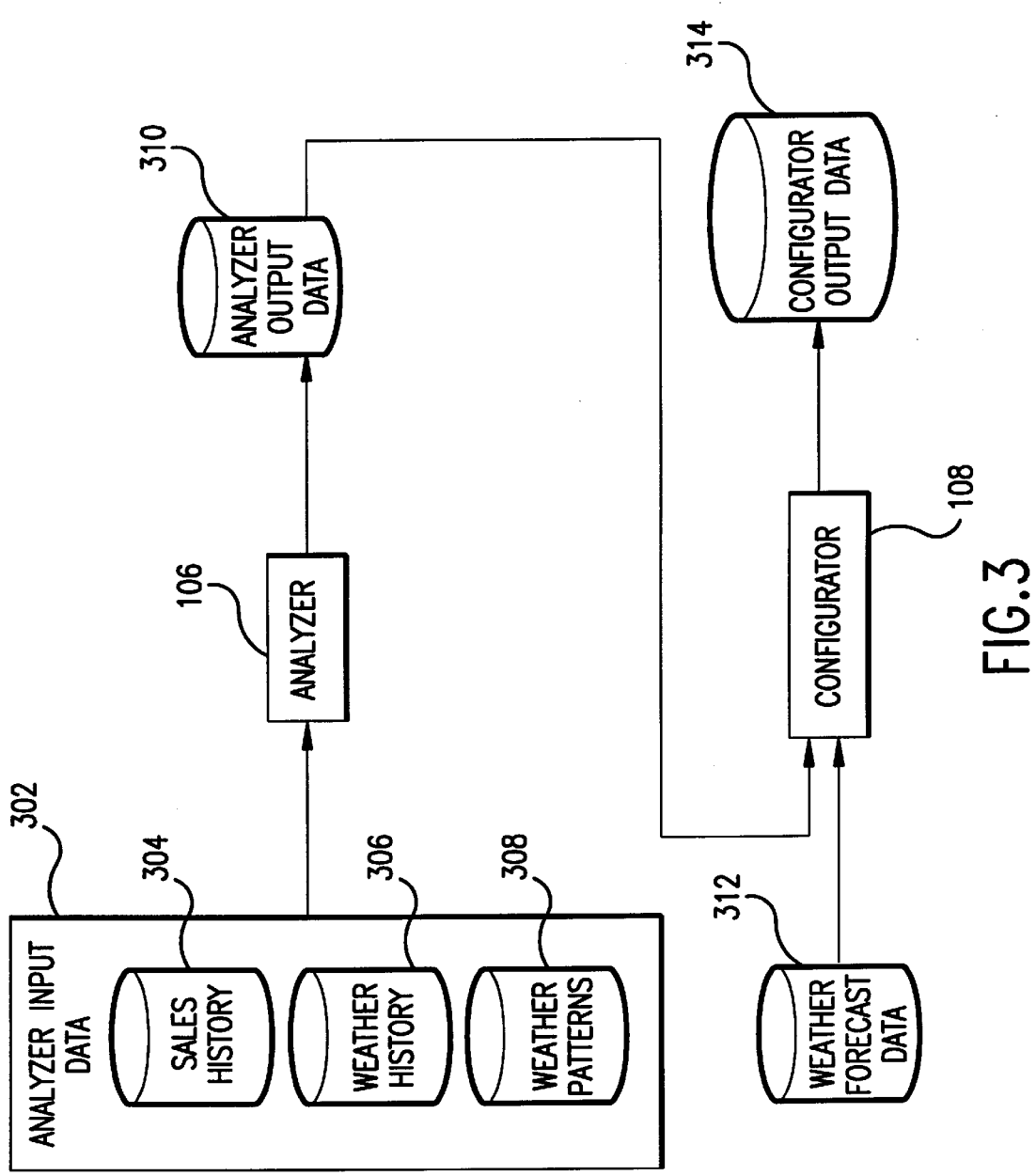
FIG. 3 is a dataflow diagram of an analyzer and a configurator of the forecasting system.

In step 2112, the analyzer 106 at each client site receives the analyzer input database 302 (see FIG. 3). The analyzer input database 302 includes a sales history database 304, a weather history database 306, and a weather patterns database 308. These databases 304, 306, and 308 are described below. The analyzer 106 analyzes the analyzer input database 302, and produces an analyzer output database 310. Generally speaking, the analyzer output database 310 includes data that indicates the manner in which the retail performance of each product at each store was affected by weather. The operation of the analyzer 106 is discussed in greater detail below.

Also in step 2112, the configurator 108 analyzes the analyzer output database 310 and the weather forecast database 312 and produces a configurator output database 314. Generally speaking, the configurator output database 314 includes data that indicates the expected future retail performance of each product at each store. In generating the configurator output database 314, the configurator 108 takes into consideration the affects of predicted future weather. The operation of the configurator 108 is discussed in greater detail below.

In step 2114, the GUI 110 enables users 402 at each client site (who are typically employed by the party) to extract and analyze in meaningful ways information from the analyzer output database 310, the weather forecast database 312, and the configurator output database 314. The operation of the GUI 110 is discussed in greater detail below.

Flowchart 2102 is complete after step 2114 has been performed, as indicated by step 2116.

Preferred Implementation of the Present Invention

Figure 2:
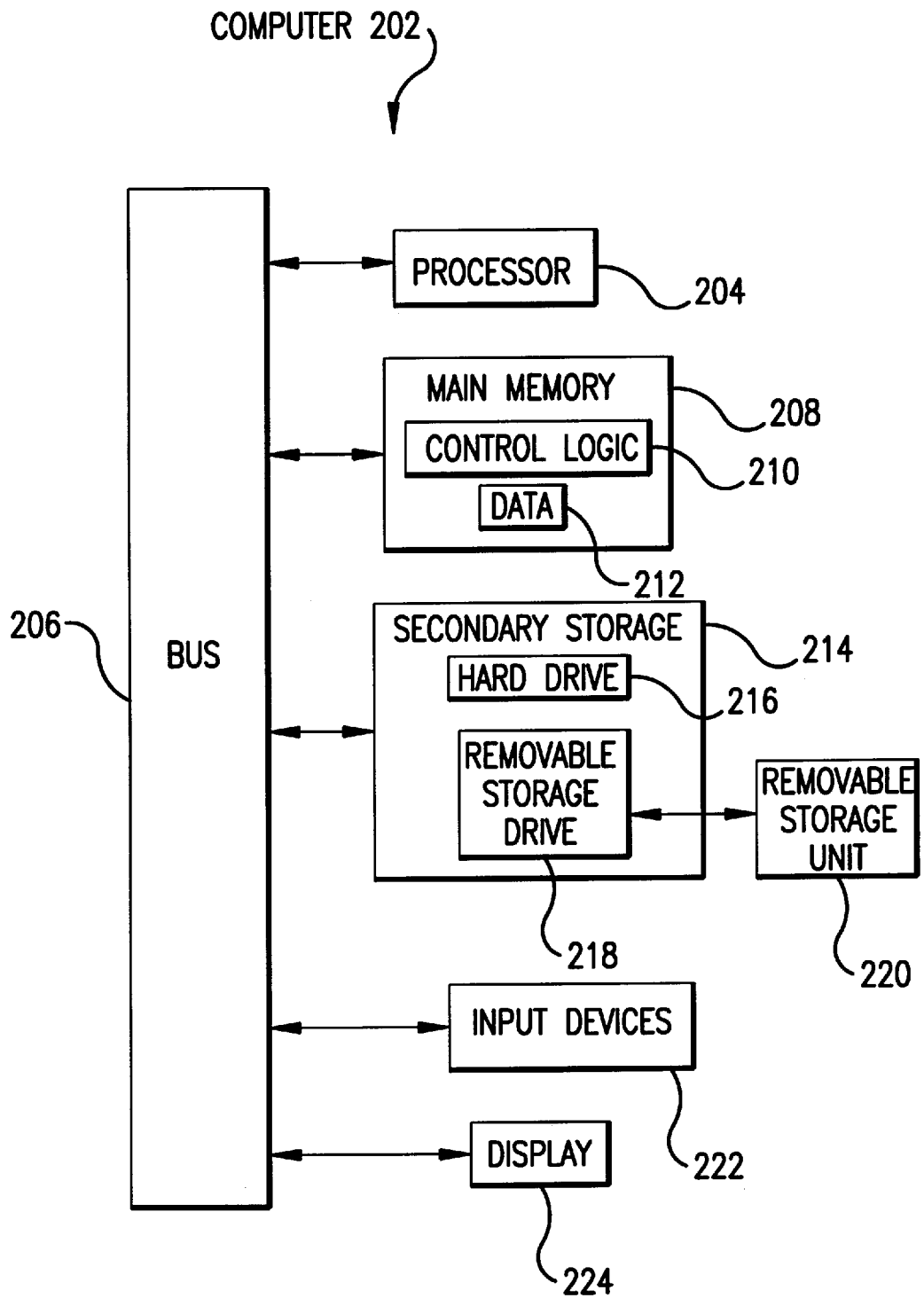
FIG. 2 is a block diagram of a computer system preferably used to implement the present invention.

In one embodiment, the invention is directed to a computer system operating as discussed herein. Specifically, the forecasting system 102 could be implemented using a computer system 202 as shown in FIG. 2. Typically, a computer system 202 implementing the forecasting system 102 of the present invention would be located at the view site and at each of the client sites.

The computer system 202 includes one or more processors, such as processor 204. The processor 204 is connected to a communication bus 206.

The computer system 202 also includes a main memory 208, preferably random access memory (RAM). Control logic 210 (i.e., software) and data 212 (such as the analyzer input database 302, the analyzer output database 310, the weather forecast database 312, and the configurator output database 314) are stored in the main memory 208, and may also be stored in secondary storage 214.

The computer system 202 also includes secondary storage 214. The secondary storage 214 includes, for example, a hard disk drive 216 and/or a removable storage drive 218, representing a floppy disk drive, a magnetic tape drive, a compact disk drive, etc. The removable storage drive 218 reads from and/or writes to a removable storage unit 220 in a well known manner.

Removable storage unit 220, also called a program storage device or a computer program product, represents a floppy disk, magnetic tape, compact disk, etc. As will be appreciated, the removable storage unit 220 includes a computer usable storage medium having stored therein computer software and/or data.

Computer programs (also called computer control logic) are stored in main memory 208 and/or the secondary storage 220. Such computer programs, when executed, enable the, computer system 202 to perform the features of the present invention as discussed herein. In particular, the computer programs, when executed, enable the processor 204 to perform the features of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

The computer system 202 also includes input devices 222, such as a keyboard and/or a mouse, and display devices 224, such as a computer monitor.

Analyzer Input Database

The analyzer input database 302 includes a sales history database 304, a weather history database 306, and a weather patterns database 308. These are described below.

Sales History Database

An example sales history database 304 (alternatively called the product history database) is shown in FIG. 7. The sales history database 304 includes, for each year in the view, one or more records (or rows) for each product sold in each store. For any given product/store combination, there is a record for each of several data types. The data types represent performance metrics that are being tracked, such as gross revenue, net revenue, number of items sold, etc.

It should be understood that the invention accommodates and supports any business and/or product related data. In addition to that mentioned above, such product data (that is stored in the sales history database 304) includes retail POS data, shipment data (manufacturing plant, wholesales, etc.), inventory data, store traffic data, economic data, demographic data, order data, etc.

Each record also includes historical performance information for the product/store combination on a per period basis.

For example, the records shown in the example sales history database 304 in FIG. 7 pertain to HATS (i.e., the product) sold in Store001 (i.e., the store or location). Records 702 and 706 pertain to historical information for 1994, and records 704 and 708 pertain to historical information for 1995. The data type for record 702 is "Net Dollars," which represents net sales revenue. Record 702 includes net sales revenue information for HATS sold in Store001 in 1994. This net sales revenue information is provided on a per period basis. A period may be any increment of time, such as a day, a month, a quarter, etc. For convenience purposes, only six periods P1–P6 are shown in FIG. 7. There may be more or less periods, depending on the actual implementation.

The information contained in the sales history database 304 depends on the party's specifications that were provided to the Administrator Setup 104 during the view process. For example, the party may have indicated that it only wanted data on hats and shoes. In this case, no data would be contained in the sales history database 304 about any other product but hats and shoes (for clarity, the sales history database 304 in the example of FIG. 7 only has entries on hats). Alternatively, the party may have indicated that it was only interested in the net sales revenue and the number of items sold (as shown in FIG. 7). Alternatively, the party may have indicated that it wanted to analyze data on a bi-weekly basis (in which case the periods would each correspond to a two week period).

Weather History Database

An example weather history database 306 is shown in FIG. 8. The weather history database 306 includes, for each year in the view, one or more records for each metropolitan area (MA). (The term MA closely resembles the well known name Metropolitan Statistical Area (MSA). However MA encompasses a larger surrounding geographical area/region than the strict MSA definition.) (However, since MA and MSA are similar, they are used interchangeably herein.) The Weather History database contains but is not limited to data on 309 metropolitan areas. These records contain information specifying the weather that occurred in the subject MA in the time span represented in the view. Specifically, for each MA, there is a record for each of several weather data types.

The are three classes of weather data types as it relates to the weather history database: seasonal, actual, and category (also called weather pattern). A seasonal data type is the seasonal (or average) value of a weather parameter. Accordingly, the data type "temp.sea" is the average temperature. The data type "snow.sea" is the average snowfall. The data type "prec.sea" is the average precipitation.

An actual data type is the actual value of a weather parameter. Accordingly, the data type "temp" is the actual temperature. The data type "snow" is the actual snowfall. The data type "prec" is the actual precipitation.

A category data type reflects a weather parameter's actual versus seasonal values. Accordingly, the data type "temp.cat" reflects actual temperature versus seasonal temperature. The data type "prec.cat" reflects actual precipitation versus seasonal precipitation. If a category data type is equal to 1, then the actual value was greater than the seasonal value. If a category data type is equal to 0, then the actual value was equal to (or substantially corresponded to) the seasonal value. If a category data type is equal to −1, then the actual value was less than the seasonal value. These relationships are summarized in the weather pattern legend 1102 presented in FIG. 11. Of course, values other than 1, 0, and −1 could be alternatively used to indicate these relationships.

The historical weather information in the weather history database 306 is provided on a per period basis. As indicated above, the period may be any increment of time, such as daily, weekly, bi-weekly, monthly, bi-monthly, quarterly, etc. Preferably, the increment of time represented by a period is the same in all of the databases.

The Administrator Setup 104 process determines the information that is stored in the analyzer input database 302. For example, the length of the period is specified during the Administrator Setup 104 process. Also, the years and the locations (i.e., MAs) to be represented in the weather history database 306 are specified in the Administrator Setup process. As noted above, the Administrator Setup process is customized by the system administrator 502 in accordance with the party's specifications. Additional information on the Administrator Setup 104 can be found below.

Note that the weather history database 306 is on a per MA basis, whereas the sales history database 304 is on a per store basis. Typically, a plurality of stores are located in each MA. The forecasting system 102 maintains a store/MA table 1002 (FIG. 10) that provides a mapping between stores and MAs. The information contained in the store/MA table 1002 is preferably provided by the party (i.e., the entity that owns and/or manages the stores).

Weather Patterns Database

The present invention makes use of a number of different weather patterns to characterize the weather that occurred during any given past period, or that is predicted to occur during any given future period. Preferred weather patterns are presented in FIG. 9. As indicated in FIG. 9, exemplary weather patterns employed by the present invention include temperature/precipitation, temperature/snow, sustained weather, temperature/precipitation lag 1 period, and temperature/snow lag 1 period. The present invention is not limited to these weather patterns, for example patterns also include temperature/precipitation/snow combinations.

The temperature/precipitation and temperature/snow weather patterns are self-explanatory.

The sustained weather pattern represents contiguous weeks (or other periods) of similar weather, for example having "temperature sustained two weeks" as a pattern.

The "temperature seasonal/precipitation seasonal lag 1 period" pattern represents the occurrence of "temperature seasonal/precipitation seasonal" in the previous week.

The temperature seasonal/snow seasonal lag 1 period is similar to the above.

As indicated by the above list, each weather pattern includes one or more weather parameters. For example, the temperature/precipitation weather pattern includes the temperature parameter and the precipitation parameter. For any given period, each parameter can be either seasonal, below seasonal, or above seasonal (except the sustained weather pattern, described above). For any given period, the values of these weather patterns are represented by the entries in the weather history database 306 having the category data type. For example, in 1994, the weather pattern in MSA1OO during period P1 was temperature above seasonal/ precipitation above seasonal (see records 802 and 804 in FIG. 8). This weather pattern is abbreviated by T1P1 (see FIG. 11). The weather patterns 308 is a file containing but not limited to all patterns depicted in FIG. 9. This file is used as the "look up" to allow the system to determine which patterns it will use.

Weather Forecast Database

An example weather forecast database 312 is shown in FIG. 22. The weather forecast database 312 includes, for each future year in the view, one or more records for each metropolitan area (MA). These records contain information specifying the weather that is predicted to occur in the subject MA in the future time span represented in the view. Specifically, for each MA, there is a record for each of several weather data types.

There are also three classes of weather data types as in the weather history database: seasonal, actual, and category (also called weather pattern). These are the same as those described above with respect to the weather history database 306. Accordingly, the description above of the weather history database 306 also applies to the weather forecast database 312.

Relationship Between Past and Future Databases

As evident by the description above, the sales history database 304, weather history database 306, and weather patterns database 308 are past databases because they contain historical information. The weather forecast database 312 is a future database because it contains information pertaining to predicted weather in the future.

All of these databases contain information on a per period basis. The increment of time represented by a period is the same in all of the databases. Suppose that the increment of time is set equal to a month in the Administrator setup process. In this example, period P1 represents January. Specifically, in the sales history database 304, weather history database 306, and weather patterns database 308, period P1 represents January of a past year. In the weather forecast database 312, period P1 represents January of a future year.

Time Periods

As discussed above, data may be stored in the analyzer input database 302 and the weather forecast database 312 using any time increment or period, including but not limited to daily, weekly, monthly, quarterly, etc. For example, the revenue sales for each location may be stored in the sales history database 304 on a daily basis, a weekly basis, a monthly basis, or a quarterly basis. Similarly, weather forecast information for each location may be stored in the weather forecast database 312 on a daily basis, a weekly basis, a monthly basis, or a quarterly basis. Preferably, the time increment/period is the same in both the analyzer input database 302 and the weather forecast database 312. The time increment/period is preferably user selectable. In practice, the system administrator selects the time increment/period during the administrator setup 104 process (described below).

Operation of the Analyzer

Figure 6:
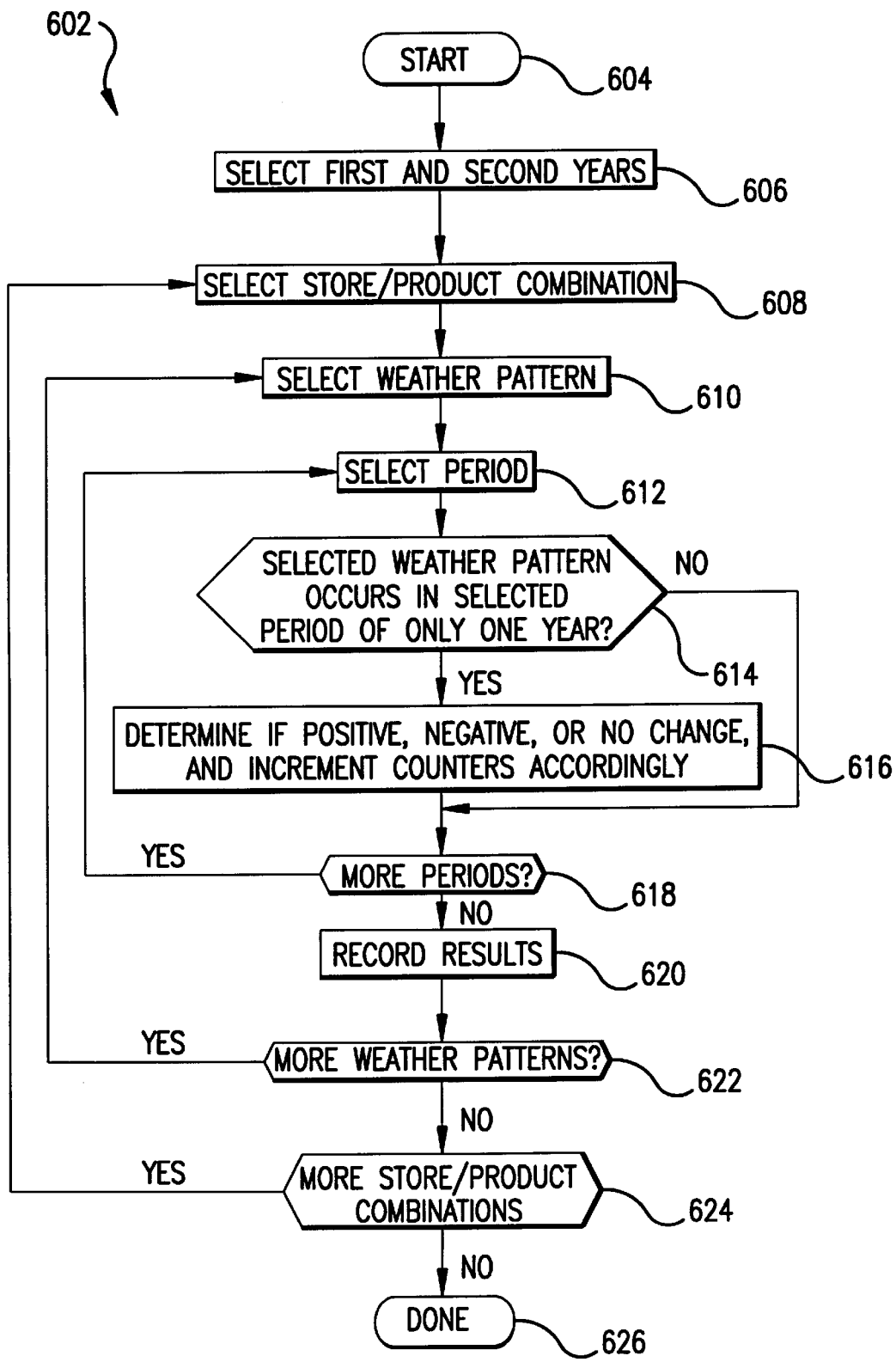
FIGS. 6, 13A, 13B, 14, 15, 16, 17, 18, 19, 20, and 21 are flowcharts depicting the preferred operation and control flow of the present invention.

As noted above, analyzer 106 determines the manner in which the retail performance of each product at each store was affected by weather. Such operation of the analyzer 106 shall now be described. Reference shall be made to a flowchart 602 in FIG. 6, which represents the steps performed by the analyzer 106 while performing step 2112 in FIG. 21 (described above). Flowchart 602 begins with step 604, where control immediately flows to step 606.

In step 606, the analyzer 106 selects two prior years for evaluation. Preferably, the analyzer 106 in step 606 selects the immediately two prior years for evaluation (in which case these years are referred to as Year N−1, and Year N−2, where N is the current year), but the analyzer 106 could alternatively select any two or more past years for analysis. Assume, for purposes of illustration, that the analyzer 106 selected 1994 and 1995.

In step 608, the analyzer 106 selects a store/product combination. That is, the analyzer 106 selects a store and a product for evaluation. For purposes of illustration, assume that the analyzer 106 selects Store001, and the product HATS.

In step 610, the analyzer 106 uses the weather patterns database 308 and selects a weather pattern for evaluation. For illustrative purposes, assume that the analyzer 106 asserts the T1P1 weather pattern for evaluation (temperature above seasonal/precipitation above seasonal).

At this point, the analyzer 106 has selected a store, a product, and a weather pattern for evaluation. The analyzer 106 has also selected two years on which to base the evaluation. In the following steps, the analyzer 106 determines the extent to which the selected weather pattern (in this case, T1P1) affected the retail performance of the selected product (HATS) in the selected store (Store001) over the selected two years (1994 and 1995).

In step 612, the analyzer 106 selects a period for evaluation. Suppose that the analyzer 106 selects period P1.

In step 614, the analyzer 106 determines whether the selected weather pattern occurs in the selected period of only one of the two selected years. Consider, for example, records 802–805 in the weather history database 306 shown in FIG. 8. In period P1, the weather pattern T1P1 occurred in both 1994 and 1995.

If the analyzer 106 in step 614 determined that the selected weather pattern did not occur in the selected period of only one of the two selected years (as was the case in period P1; this is also the case in periods P2, P4, P5, and P6), then step 618 is performed. In step 618, the analyzer 106 selects another period for evaluation.

If, instead, the analyzer 106 in step 614 determined that the selected weather pattern did occur in the selected period of only one of the two selected years (as is the case in period P3; note that the weather pattern T1P1 occurs only in 1995), then step 616 is performed.

In step 616, the analyzer 106 determines whether the selected weather pattern had a positive impact, a negative impact, or no impact on retail performance in the selected period from Year N−2 to Year N−1. The selected weather pattern had a positive impact if performance improved in the selected period from Year N−2 to Year N−1. The selected weather pattern had a negative impact if performance worsened in the selected period from Year N−2 to Year N−1. The selected weather pattern had no impact if performance was the same in the selected period from Year N−2 to Year N−1. Referring to the sales history database 304 in FIG. 7, note that net revenue for HATS in Store001 in Period 3 was $60 for 1994, and $30 for 1995. Thus, the selected weather pattern T1P1 had a negative impact on the sales of HATS in Store001 during period P3 from 1994 to 1995.

Also in step 616, the analyzer 106 increments the positive counter, negative counter, or the no change counter. The positive counter is incremented if it is determined that the selected weather pattern had a positive impact on retail performance in the selected period from Year N−2 to Year N−1. The negative counter is incremented if it is determined that the selected weather pattern had a negative impact on retail performance in the selected period from Year N−2 to Year N−1. The no change counter is incremented if it is determined that the selected weather pattern had no impact on retail performance in the selected period from Year N−2 to Year N−1.

In step 618, the analyzer 106 determines if there are other periods to process. The number of periods in any given year were previously determined during the view process, as discussed above. If there are additional periods to process, then control returns to step 612. The analyzer 106 processes steps 612, 614, 616, and 618 for each period in the years selected in step 606.

If there are no more periods to process, then step 620 is performed. In step 620, the analyzer 106 stores the results for the selected weather pattern. This data is stored in the analyzer output database 310. An example analyzer output database 310 is shown in FIG. 12. The analyzer output database 310 includes a record for each weather pattern/store/product combination. Each record stores the positive count, the negative count, and the no change count for the weather pattern/store/product combination. These counts indicate the manner in which the selected weather pattern impacted the retail performance of the selected product in the selected store.

In step 622, the analyzer 106 determines whether there are additional weather patterns to process. Preferably, the analyzer 106 processes all possible weather patterns (see FIG. 9) for each product/location combination. In step 623, the analyzer 106 calculates a score for each pattern for each product/location combination and stores these scores in the file "AEOUTPUT.DAT".

If there are additional weather patterns to process, then control returns to step 610. Otherwise, control flows to step 624.

In step 624, the analyzer 106 determines whether there are additional store/product combinations to process. Preferably, all store/combinations are processed. If there are additional store/product combinations to process, then control flows to step 608. Otherwise, flowchart 602 is complete, as indicated by step 626.

Operation of the Configurator

Figure 13A:
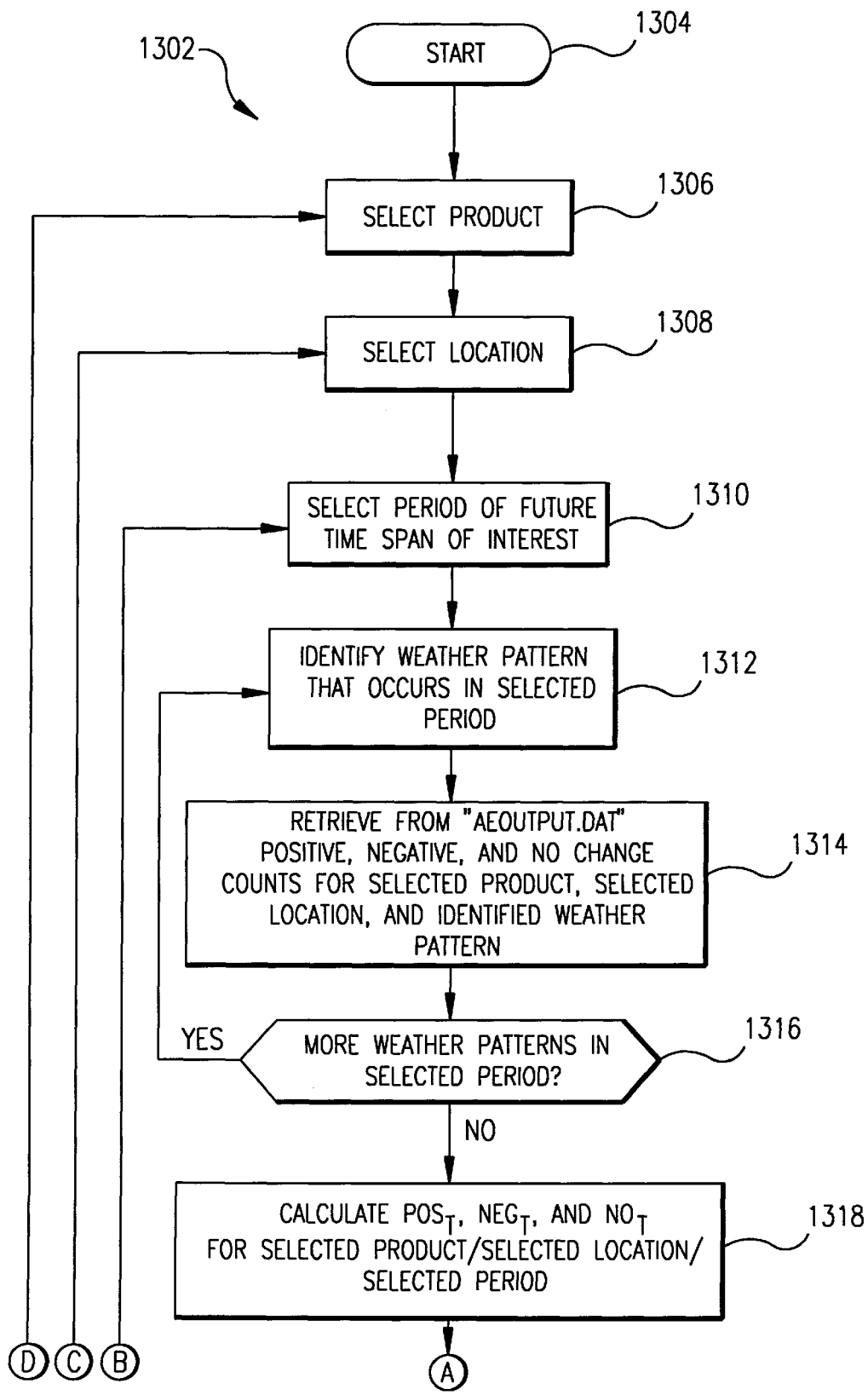

As discussed above, the configurator 108 determines the expected future retail performance of each product at each store. When performing this task, the configurator 108 takes into consideration the affects of predicted future weather. Such operation of the configurator 108 shall now be described in detail with reference to a flowchart 1302 presented in FIGS. 13A and 13B. Flowchart 1302 represents the operation of the configurator 108 while performing step 2112 in FIG. 21. Flowchart 1302 begins with step 1304, where control immediately passes to step 1306.

In step 1306, the configurator 108 selects a product to evaluate. For illustrative purposes, assume that the configurator 108 selects HATS.

In step 1308, the configurator 108 selects a location or store to evaluate. Assume that the configurator 108 selects Store001.

In step 1310, the configurator 108 selects a period in a future time span to evaluate. Assume that the configurator 108 selects period P1 in the future time span.

At this point, the configurator 108 has selected a product, a store, and a future period. In the following steps, the configurator 108 estimates the retail performance of the selected product in the selected store during the selected future time period. In doing this, the configurator 108 takes into account the affect of the weather that is predicted to occur in the future time span.

In step 1312, the configurator 108 identifies the weather pattern that occurs in the predicted future time period. Consider, for example, weather forecast database 312 in FIG. 22. As indicated by records 2202 and 2204, the predicted weather pattern in MSA1OO (where Store001 is located; see FIG. 10) in future period P1 is T1P1. Accordingly, in this example, the configurator 108 in step 1312 identifies weather pattern T1P1 as occurring in the selected future time period P1.

Many weather patterns potentially occur in any given period. For example, the weather pattern T1S1 (temperature above seasonal/snowfall above seasonal) also occurs in future time period P1. In step 1312, the configurator identifies all weather patterns that occur in the selected future time period.

In step 1314, the configurator 108 determines the manner in which these identified weather patterns have, in the past, impacted the sale of the selected product in the selected store. In particular, in step 1314 the configurator 108 retrieves from the analyzer output database 310 (also called "aeoutput.dat") the positive, negative, and no change counts for the selected product/selected store combinations. The configurator 108 does this for each identified weather pattern. The configurator 108 stores these counts in a temporary memory location.

Consider the example analyzer output database 310 shown in FIG. 12. In step 1314, the configurator 108 retrieves the positive, negative, and no change counts from record 1202. This record corresponds to Store001 (the selected store), HATS (the selected product), and T1P1 (one of the weather patterns identified in the selected period P1). Also in step 1314, the configurator 108 retrieves the positive, negative, and no change counts from record 1204. This record corresponds to Store001 (the selected store), HATS (the selected product), and T1S1 (the other weather pattern identified in the selected period P1).

As indicated above, the configurator 108 performs steps 1312 and 1314 for every predicted weather pattern identified in the selected period. This is indicated by step 1316. After all weather patterns in the selected period have been identified (in step 1312) and processed (in step 1314), control flows to step 1318.

In step 1318, the configurator 108 totals all positive counts to obtain a total positive count for the selected period. Also, the configurator 108 totals all negative counts to obtain a total negative count for the selected period. Also, the configurator 108 totals all no change counts to obtain a total no change count for the selected period. In the example of FIG. 12, the total positive count is 4, the total negative count is 1, and the total no change count is 0.

In step 1320, the configurator 108 uses the total positive count, the total negative count, and the total no change count to obtain a score for the selected future period. This score represents an indication of the predicted strength of the market for the selected product in the selected store for the selected future time period in view of the predicted weather. The manner in which this score is generated is discussed below.

In step 1322, the configurator 108 determines whether there are additional periods in the future time span to process for the selected product/selected store combination. The user 402 preferably specifies the periods in the future time span to process. If there are more periods to process, then control returns to step 1310. Otherwise, control flows to step 1324.

In step 1324, the configurator 108 stores information pertaining to the selected product/selected store combination in the configurator output database 1390 (also called "confout.dat"). The configurator output database 1390 includes a record for each store/product combination. Each record stores the total positive count, total negative count, total no change count, and score for each period for the store/product combination.

In step 1326, the configurator 108 determines whether there are any additional locations (i.e., stores) to analyze. Preferably, the user 402 selects the locations to analyze. If there are more stores to analyze, then control returns to step 1308. Otherwise, control flows to step 1328.

In step 1328, the configurator 108 determines whether there are any other products to analyze. If there are more products to analyze, then control returns to step 1306. Otherwise, flowchart 1302 is complete, as indicated by step 1330.

Calculating Scores

Figure 13B:
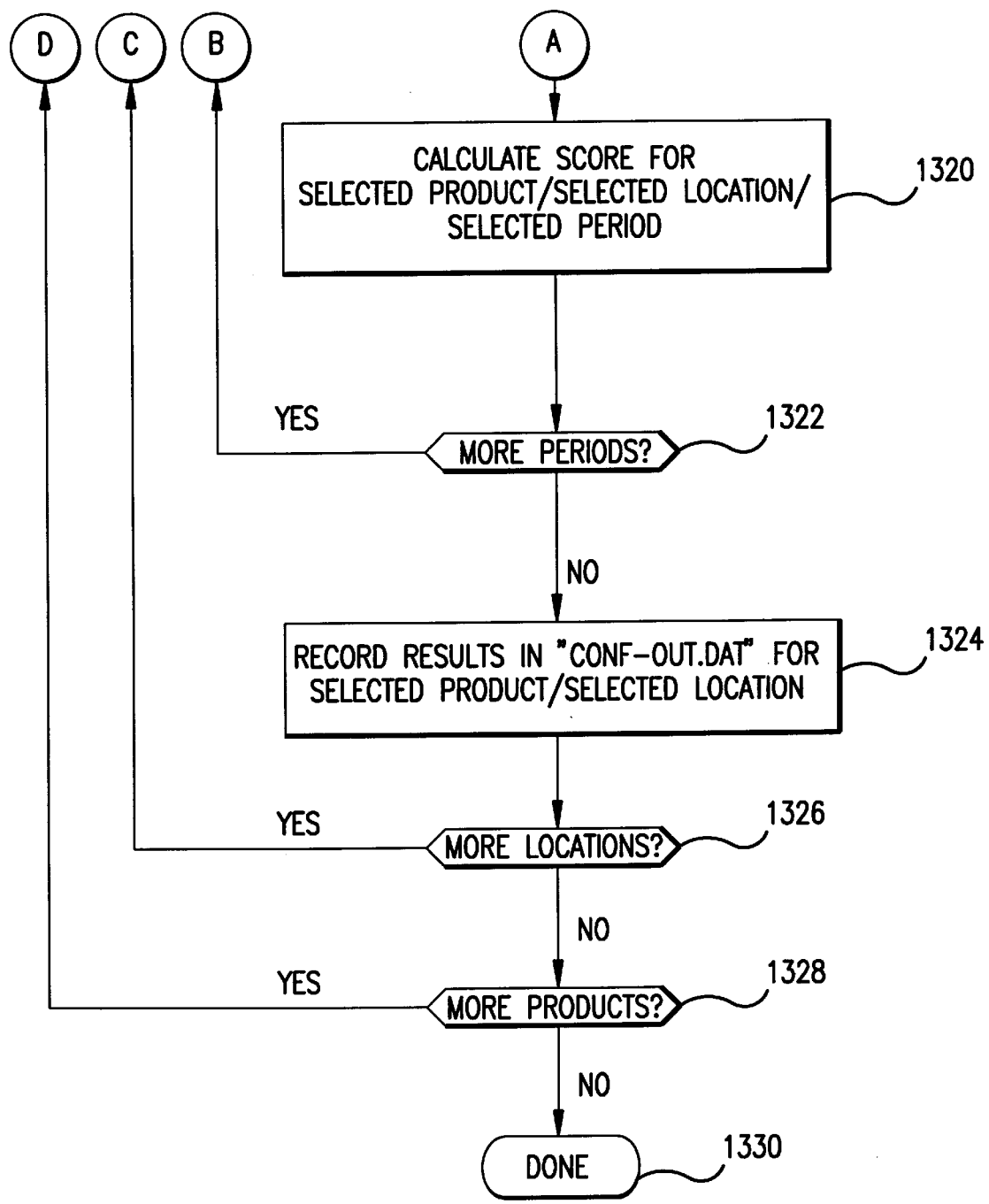
Figure 13C:

As discuss above, the configurator 108 in step 1320 of FIG. 13B uses the total positive count, the total negative count, and the total no change count to obtain a score for the selected future period. This score represents an indication of the predicted strength of the market for the selected product in the selected store for the selected future time period in view of the predicted weather. Also discussed above, the analyzer 106 in step 623 of FIG. 6 uses the total positive count, the total negative count, and the total no change count to obtain a score for each weather pattern for each store/product combination across all historical periods processed. The manner in which these scores is are generated shall now be discussed.

Figure 16:
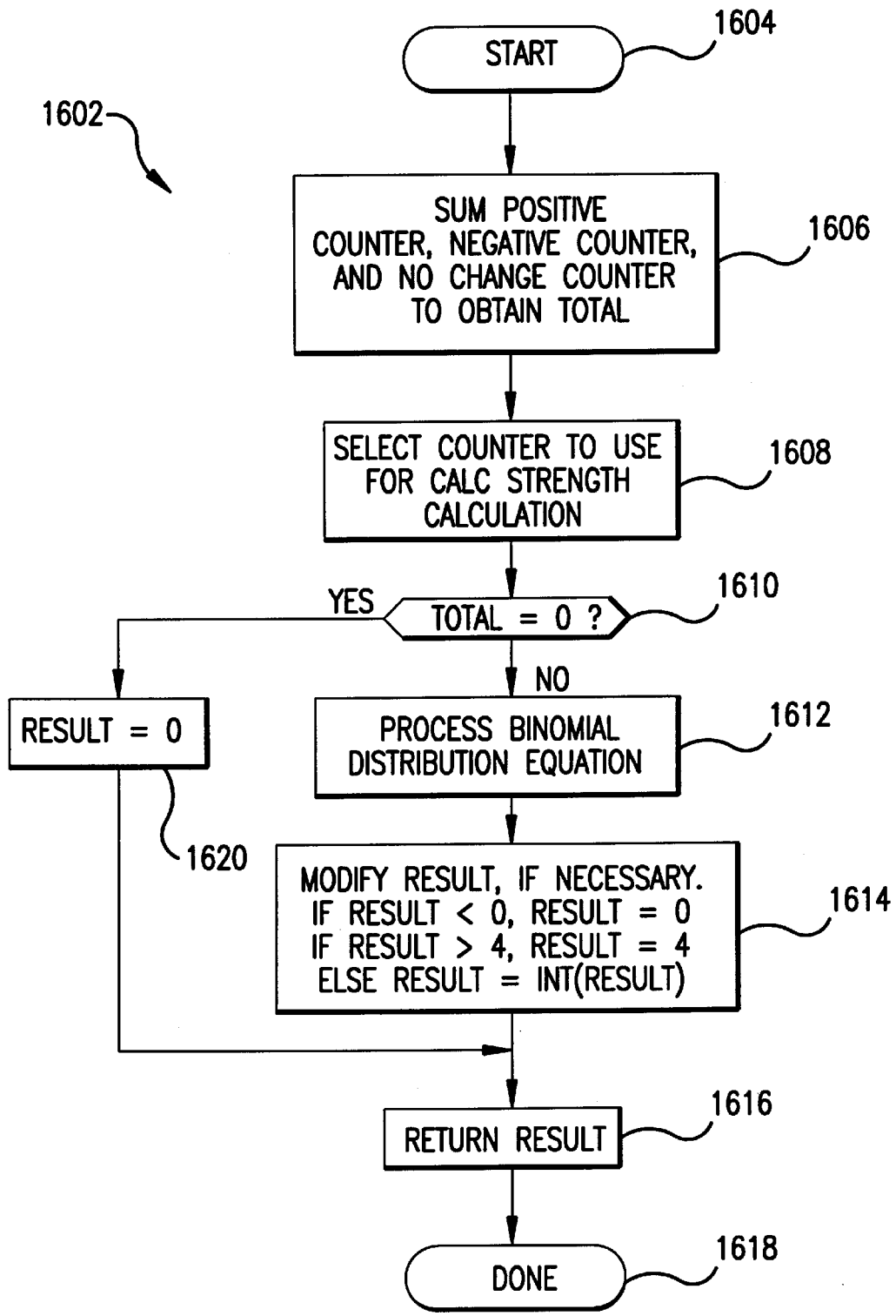

The invention uses a "calc strength" algorithm/calculation to calculate scores for both the analyzer 106 and configurator 108. The calc strength algorithm itself uses a well known binomial distribution algorithm. For example, The steps that make up the calc strength algorithm are depicted in a flowchart 1602 shown in FIG. 16 which displays the use of the calc strength algorithm in the configurator 108. Flowchart 1602 begins with step 1604, where control immediately passes to step 1606.

In step 1606, the configurator 108 sums the positive count, the negative count, and the no change count to obtain a total count for each future period. In the example of FIG. 12, described above, the total positive count is 4, the total negative count is 1, and the total no change count is 0. Accordingly, in step 1606 the configurator 108 obtains a total count of 5.

In step 1608, the configurator 108 selects either the positive count, the negative count, or the no change count in the calc strength calculation. The configurator 108 preferably selects the greater of either the positive count, the negative count, and the no change count. In the example of FIG. 12, the total positive count is greater than either the total negative count or the total no change count. Accordingly, the configurator 108 in step 1608 selects the positive count to use.

In step 1610, the configurator 108 determines whether the total count is equal to zero. If it is equal to zero, then in step 1620 the configurator 108 sets the results of the calc strength calculation to zero. If the total count is not equal to zero, then step 1612 is performed.

In step 1612, the configurator 108 processes the binomial distribution equation that is part of the calc strength calculation. The preferred binomial distribution equal is as follows:

$$\frac{\frac{selectedcount}{totalcount} - 0.5}{\sqrt{ABS\frac{(0.5 * (1 - 0.5))}{totalcount}}}$$

In step 1614, the configuration 108 modifies (or limits) the result of Equation 1. In particular, if the result of Equation 1 is less than 0, then the result is set equal to 0. If the result is greater than 4, then the result is set equal to 4. If the result is within the range of 0 to 4 (inclusive), then the result is set equal to the integer component of the result (this integer function may alternatively be performed by code outside of the configurator 108). It is noted that this range is implementation dependent, and can be other values.

In step 1616, the result is returned. This result represents the score. Flowchart 1602 is complete after step 1616 is performed, as indicated by step 1618.

Operation of the GUI

The GUI 110 enables users to perform the Administrator Setup 104 which prepares and processes the analyzer input database 302. Also, As discussed above, the GUI 110 enables users 402 to extract and analyze in meaningful ways information from the analyzer output database 310, the weather forecast database 312, and the configurator output database 314. The operation of the GUI 110 shall now be discussed in detail.

Figure 20:
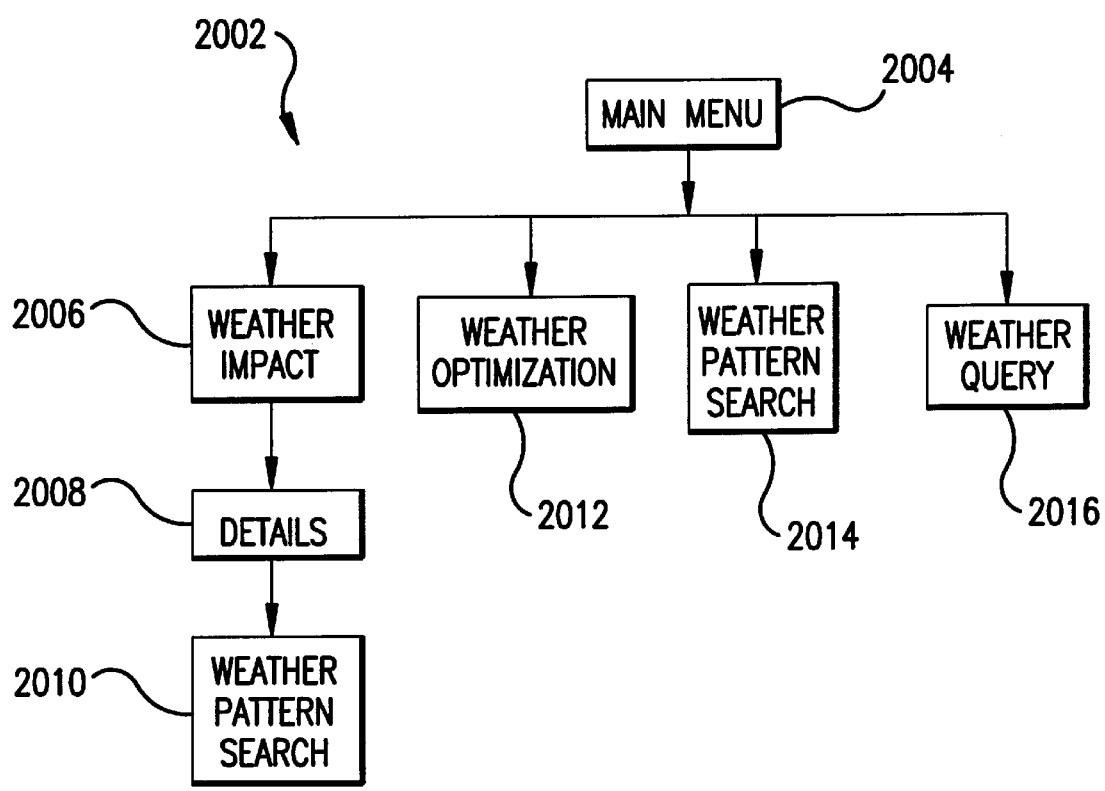

FIG. 20 depicts the manner in which users 402 may navigate through functions and services provided by the forecasting system 102. Users 402 navigate through the system 102 as shown in FIG. 20 via interaction with the GUI 110. It should be understood that the control flows shown in FIG. 20 are presented for example purposes only. The GUI 110 of the present invention is sufficiently flexible and configurable such that users 402 may navigate through the system 102 in ways other than that shown in FIG. 20.

Upon initiation of the forecasting system 2004, the user 402 is presented with a main menu 2004. The main menu 2004 is preferably displayed on the computer monitor 224 (this is true of all screens described herein). The main menu 2004 provides to the user 402 various menu selections, such as administrator setup 104, weather impact 2006, weather optimization 2012, weather pattern search 2014, and location report 2018. The user 402 must first navigate through the administrator setup 104 before proceeding to other menu selections.

Administrator Setup

Figure 37:
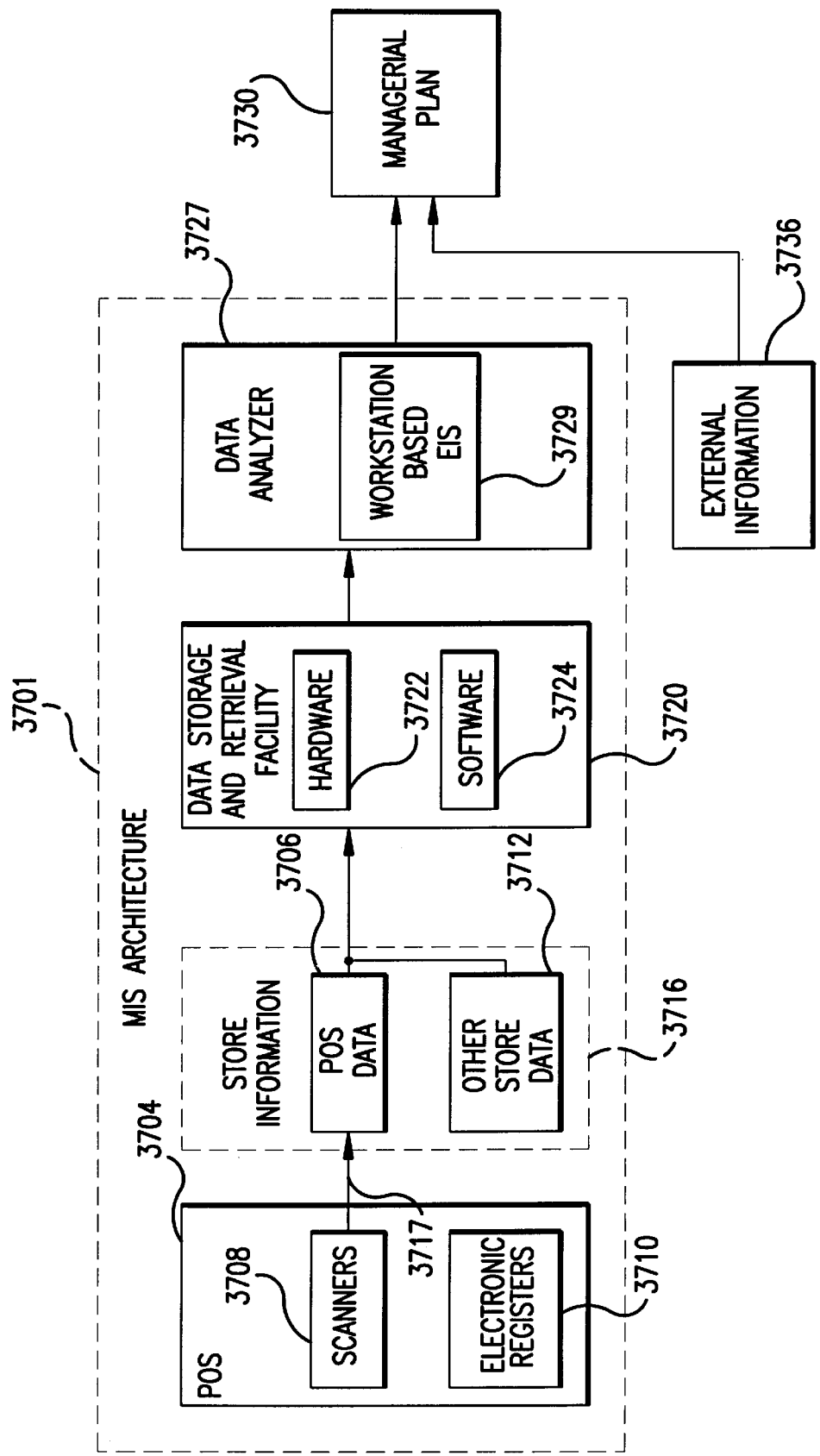
FIG. 37 is a block diagram of a conventional MIS system architecture used in the retail industry.

FIG. 37 presents a screen from GUI 110 that represents the operation of the present invention when performing the administrator setup 104. The system administrator 502 uses the administrator setup 104 to prepare the analyzer input database 302 for use with the analyzer 106. In particular, the administrator setup 104 is used to filter the all weather database 505 and the sales history database according to the client's specifications so as to generate the analyzer input database 302 and the weather forecast database 312, as discussed above.

Figure 38:
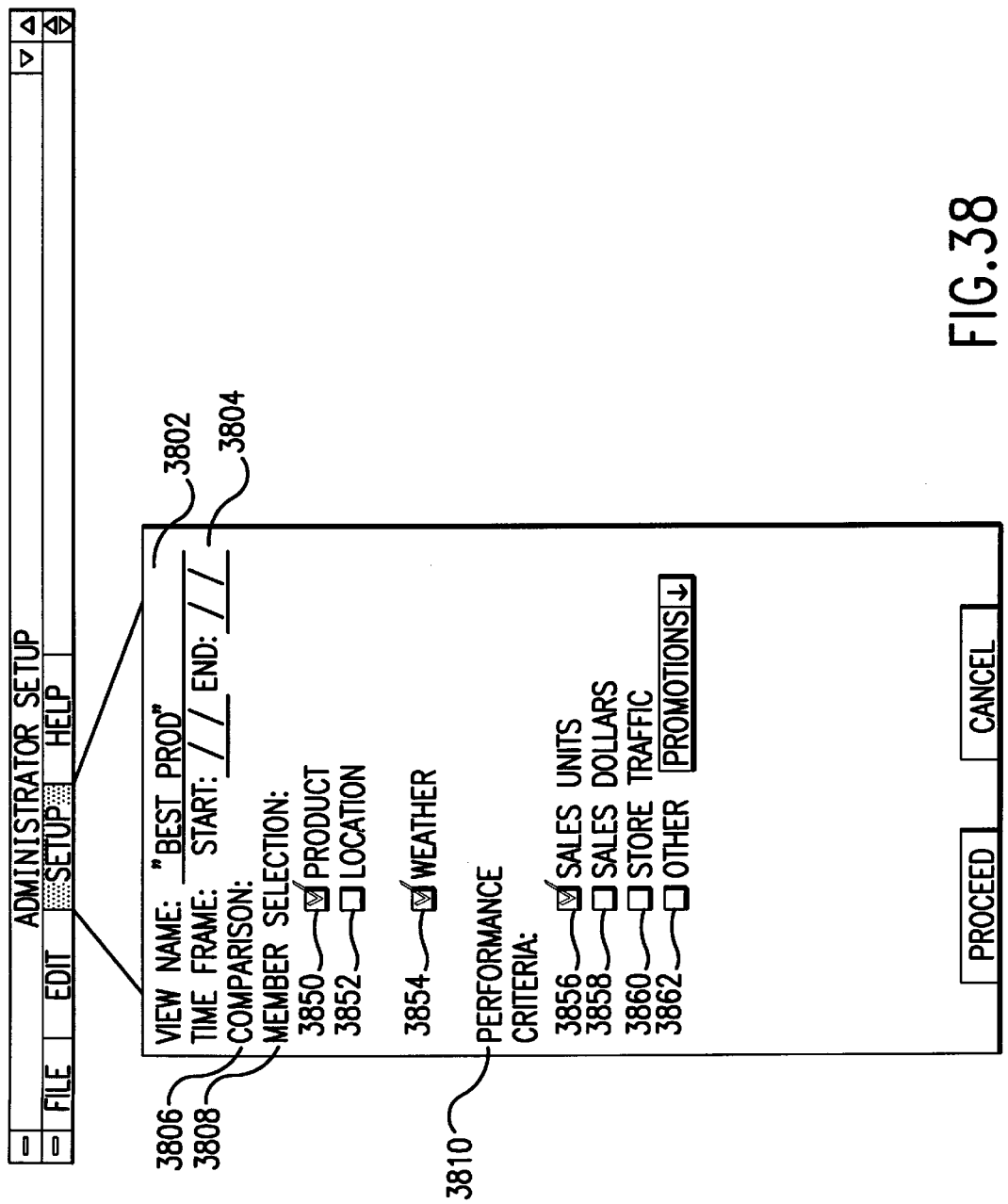

Referring to FIG. 38, the first step in the administrator setup 104 is to define a view name 3802. The view name 3802 is typed by the system administrator 502. The view name 3802 is any file name supported by the underlying operating system. The view name is simply the name of the view that is being created.

Figure 39:
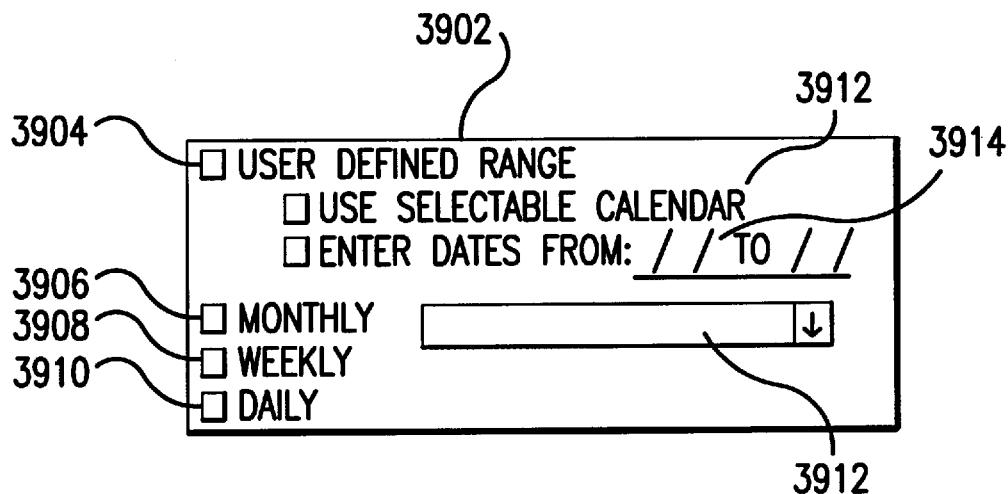
Figure 40:
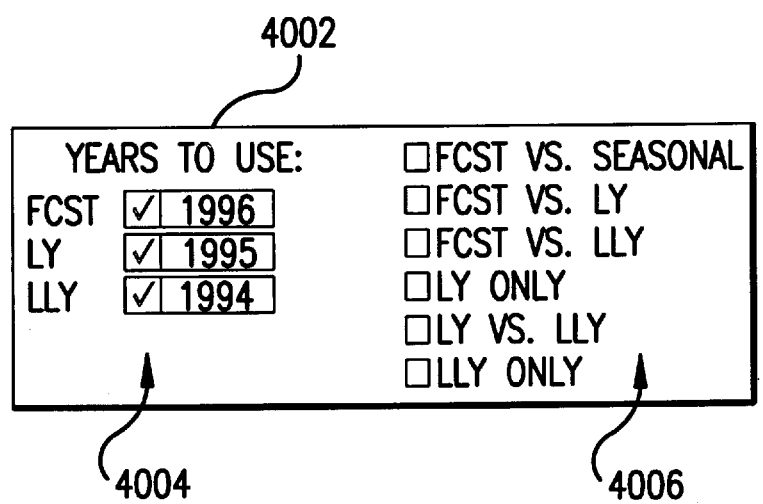

The system administrator 502 then enters a time frame in field 3804. The time frame represents the time span of the view. Preferably, the system administrator 502 double clicks on "Time Frame," which results in the display of a time frame entry window 3902 in FIG. 39. In FIG. 39, the system administrator 502 can either select and enter a user defined range (see checkbox 3904), a monthly range (see checkbox 3906), a weekly range (see checkbox 3908, or a daily range (see checkbox 3910). For either the monthly range, the weekly range, or the daily range, the user enters the month, week, or day, respectively, in field 3912. If user defined range is selected, then the system administrator 502 can manually enter the ranges (see 3914), or can use a calendar (see 3912). If the system administrator 502 elects the calendar option, then a calendar window 4202 is displayed. In this calendar window 4202, the system administrator 502 can select the days to be included in the view.

Referring again to FIG. 38, the system administrator 502 then selects a comparison option. Preferably, the system administrator 502 double clicks on a comparison button 3806, which results in the display of a comparison option window 4002. The comparison option window 4002 includes field 4004 where the system administration 502 can enter the years that will be represented in the view (FCST stands for forecast, LY stands for last year, and LLY stands for two years ago). Recall that the analyzer 106 utilized two prior years in its calculations. LY and LLY preferably represents those two years.

The comparison option window 4002 also includes checkboxes 4006 where the system administrator 502 can select which type of comparison will be used for the current view. The comparison defines how the category values are to be determined. For example, if the comparison selected is forecast versus last year, then the category values are determined based on a comparison of forecast values and last year's values.

Figure 24:
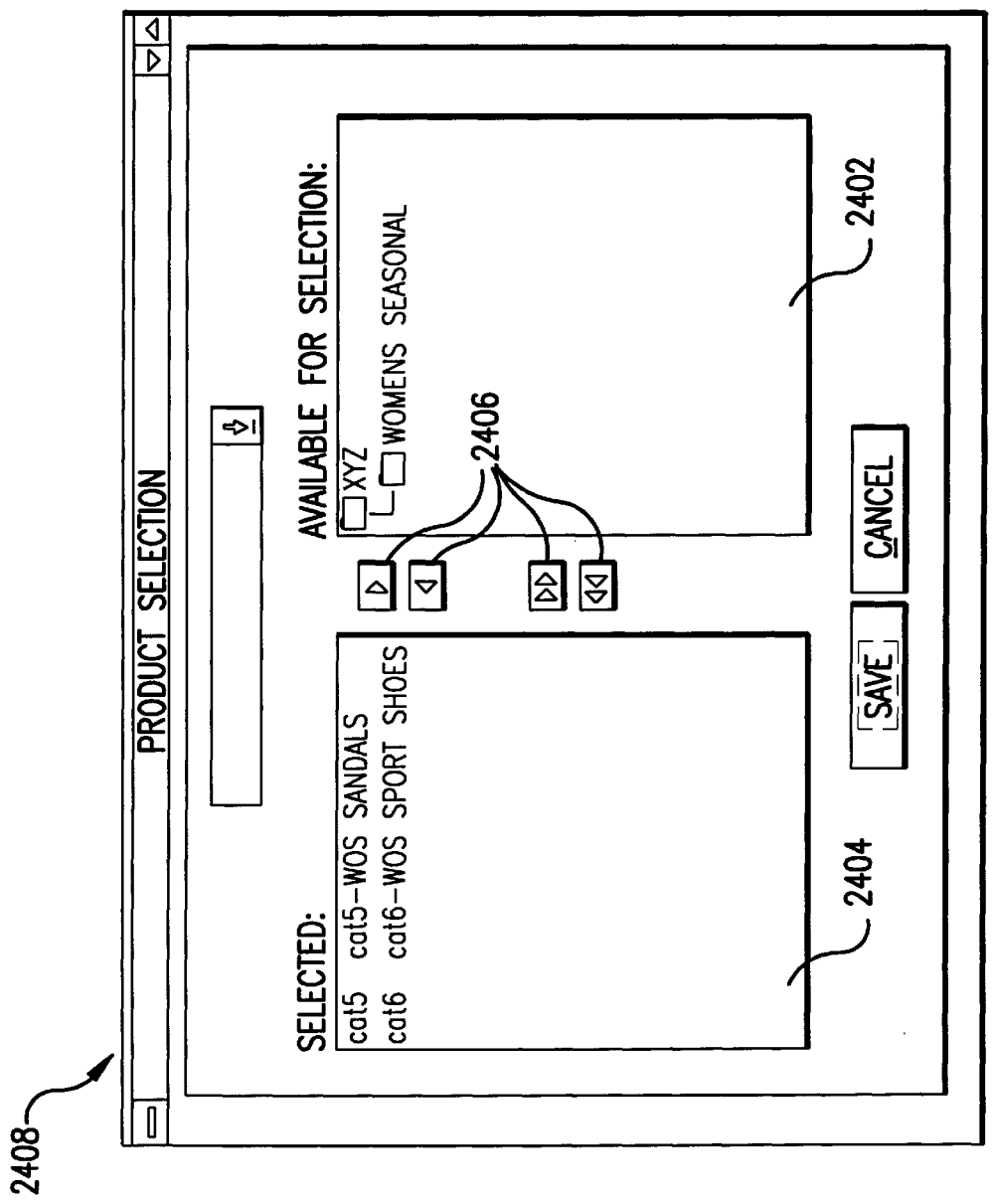
Figure 25:
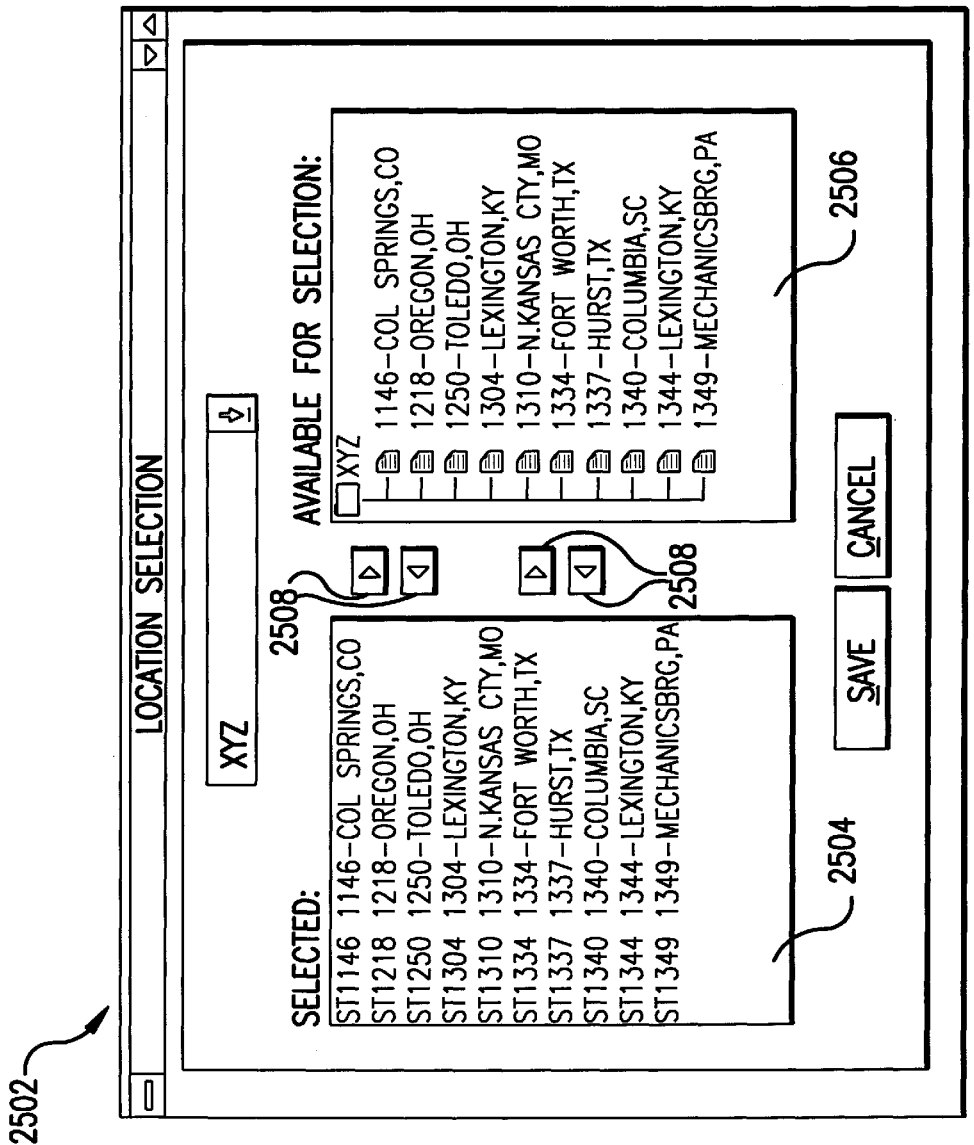
Figure 41:
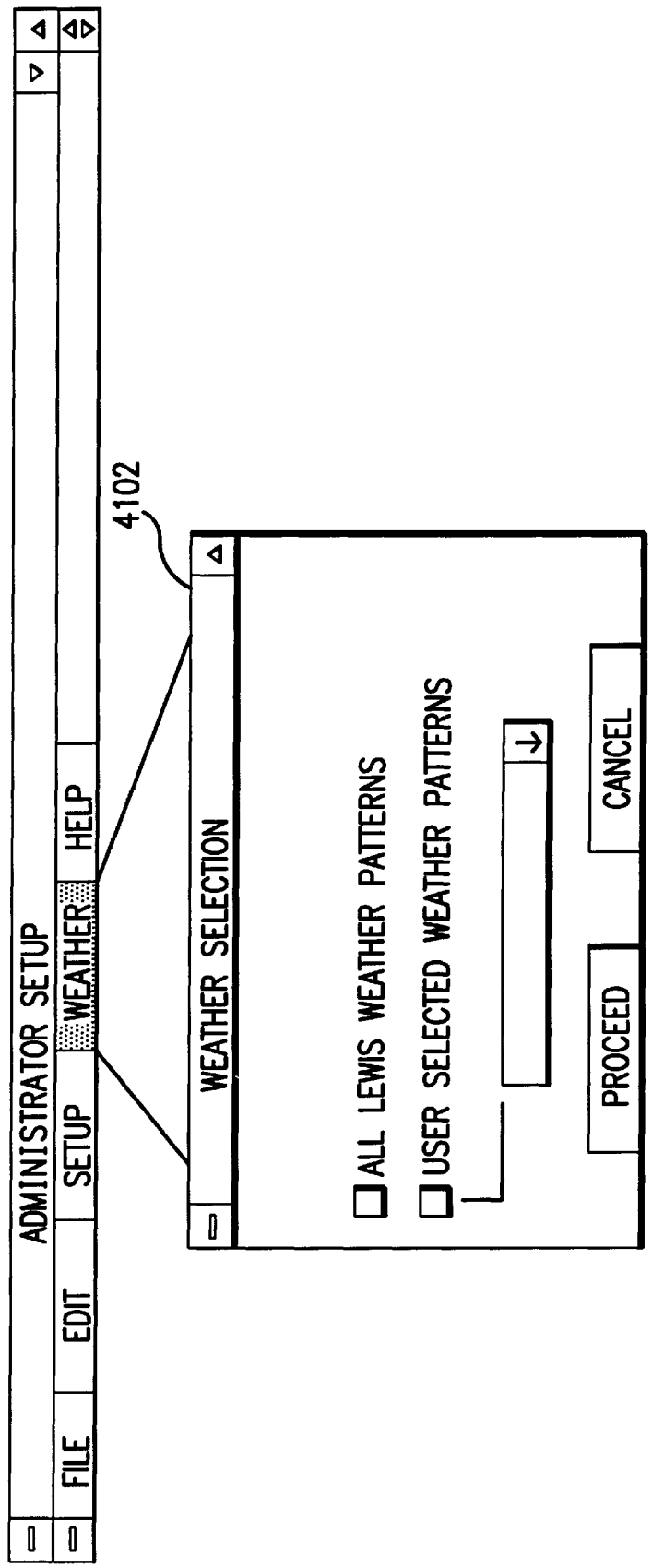
Figure 42:
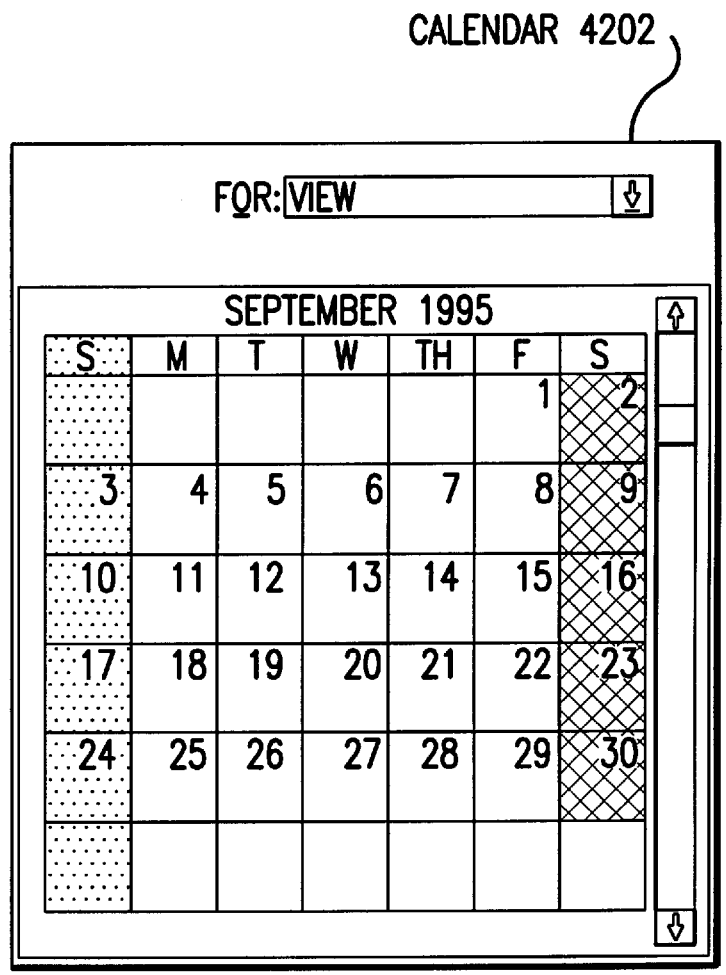

Referring again to FIG. 38, the system administrator 502 can then select which members he wishes to limit. This is done in the member selection field 3808. If the system administrator 502 wishes to limit the products that are to be in the view, then the system administrator 502 checks the product checkbox 3850. In this case, the product selection window 2408 in FIG. 24 is displayed. If the system administrator 502 wishes to limit the locations that are to be in the view, then the system administrator 502 checks the locations checkbox 3850. In this case the location selection window 2502 in FIG. 25 is displayed. If the system administrator 502 wishes to limit the weather patterns that are to be in the view, then the system administrator 502 checks the weather checkbox 3854. In this case, the weather selection window 4102 in FIG. 41 is displayed. All products, locations, and/or weather patterns are included in the view if the corresponding checkbox 3850, 3852, and/or 3854, respectively, is not checked.

Referring back to FIG. 38, the system administrator 502 can select which retail performance metric to include in the view. This is done via the performance criteria fields 3810. Suppose that the sales history database 304 multiple metrics, such as sales units, sales dollars, etc. The system administrator 502 can select which of these to include in the view by checking the appropriate checkboxes 3856, 3858, 3860, 3862 in the performance criteria field 3810.

It is noted that the above has been described in the context of the system administrator 502 performing the steps. Alternatively, the user 402 may perform the administrator setup function 104.

After the view has been configured, the other menu options shown in FIG. 20 can be accessed (alternatively, the user can load in a previously configured and saved view). These menu options are described below.

Weather Impact

Figure 14:
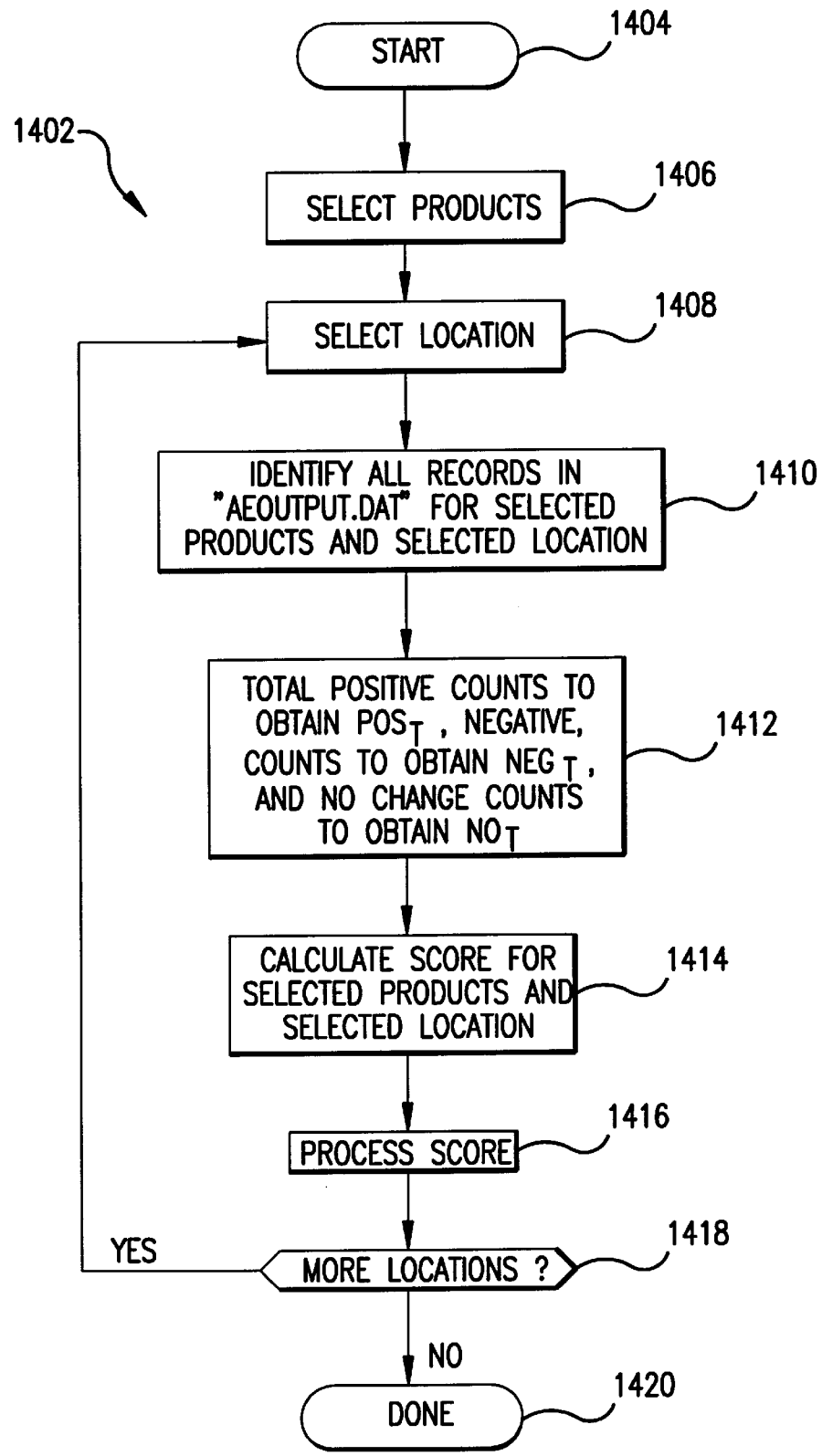

FIG. 14 presents a flowchart 1402 that represents the operation of the present invention when performing the weather impact function 2006.

In step 1406, the GUI 110 enables the user 402 to select one or more products for analysis. The GUI 110 performs step 1406 by displaying a product selection window 2408 as shown in FIG. 24. Products that are available for selection are displayed in an Available for Selection box 2402. Products that have been selected by the user 402 are displayed in a Selected box 2404. The user 402 moves products between these two boxes 2402, 2404 using arrows 2406 in a well known manner.

In step 1408, the GUI 110 enables the user 402 to select one or more locations for analysis. The GUI 110 performs step 1408 by displaying a location selection window 2502. Locations that are available for selection are displayed in an Available for Selection box 2506. Locations that have been selected by the user 402 are displayed in a Selected box 2504. The user 402 moves locations between these two boxes 2504, 2506 using arrows 2508 in a well known manner.

It is noted that steps 1406, 1408 are not necessarily performed when the user selects the weather impact option 2006 from the main menu 2004. Steps 1406, 1408 could have been performed prior to the user 402's selection of the weather impact option 2006. For example, the main menu 2004 could include a Select Products option and a Select Location option.

In step 1410, the configurator 108 accesses the analyzer output database 310 (also called "aeoutput.dat") and retrieves all records for the selected products/selected locations combinations. For example, if the user 402 selected Store001, Store002, BOOTS, and HATS, then the configurator 108 in step 1410 would select records 1202, 1204, 1206, and 1208 in the example analyzer output database 310 shown in FIG. 12.

In step 1412, for each selected location, the configurator 108 sums the positive counts to obtain a total positive count. The configurator 108 also sums the negative counts to obtain a total negative total, and the no change counts to obtain a total no change total.

In step 1414, the configurator 108 calculates a score for each location. The manner in which scores are calculated is described above. These scores indicate the degree to which the sales of the selected products at each selected location are impacted by the affects of weather. The more positive the score, the greater the positive impact. The more negative the score, the greater the negative impact. If the score is zero, then weather does not have an overall impact.

Figure 23:
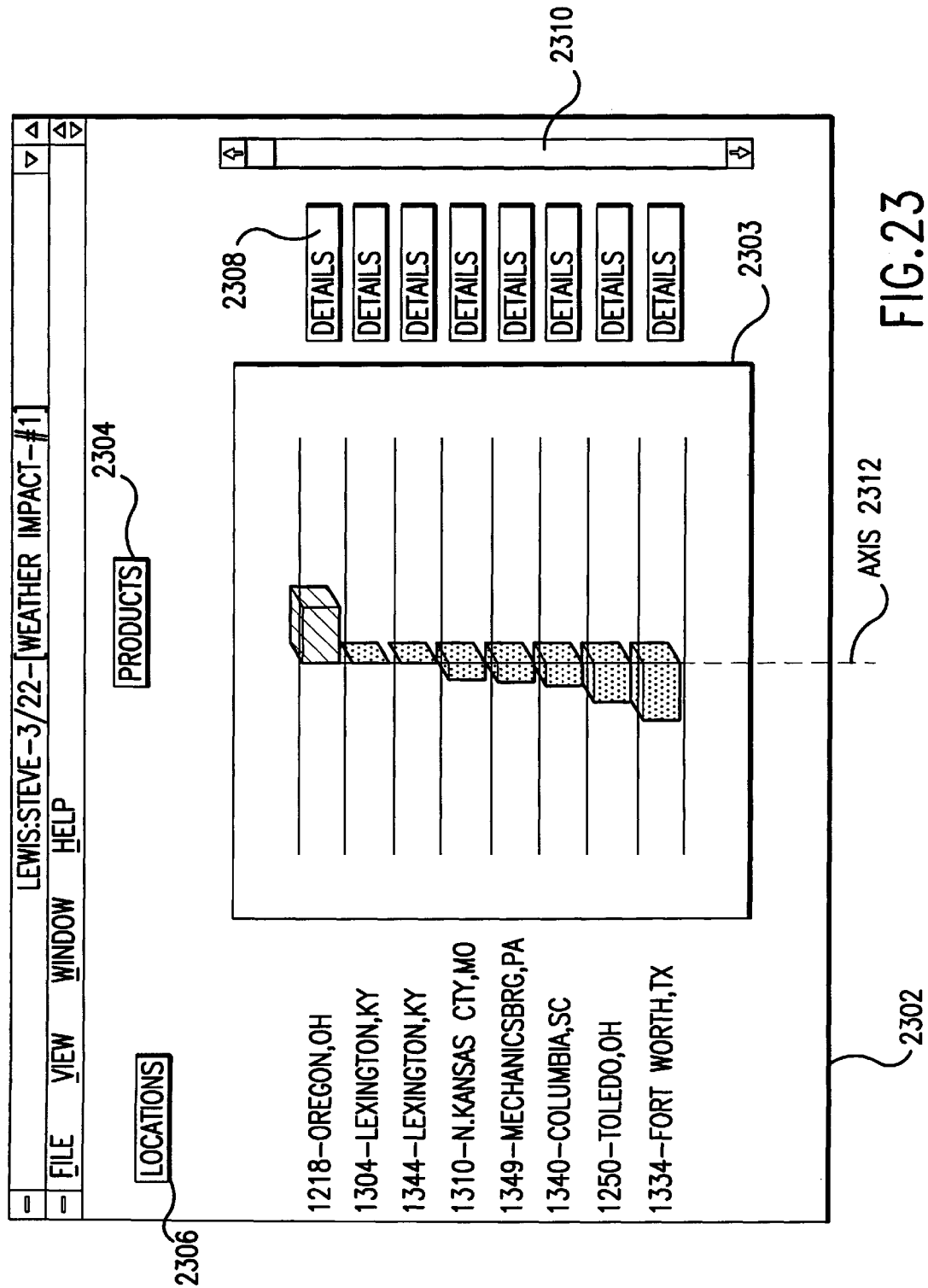

In step 1416, the configurator 108 processes these scores. Preferably, the configurator 108 processes the scores by displaying them to the user 402. The configurator 108 displays the scores to the user by displaying a weather impact window 2302 as shown in FIG. 23. The weather impact window 2302 includes a bar graph 2303. The scores for the selected locations are represented in this bar graph 2303. In particular, a positive score is represented by a bar that begins from an axis 2312 (this axis 2312 is for illustrative purposes only, and is not displayed in the weather impact window 2302) and moves to the right (see the bar for Oregon). A negative score is represented by a bar that begins at the axis 2312 and moves to the left (see the bar for Kansas City and locations displayed under Kansas City). A zero score is represented using a bar of essentially zero width that is even with the axis (see the bar for the Lexington sites). Preferably, bars for positive scores are shown in a first color (such as blue), and bars for zero and negative scores are shown in a second color (such as red).

The GUI 110 enables the user 402 to change the sets of locations and/or products. This is generally reflected by step 1418. The user 402 changes locations and/or products by selecting either a location button 2306 and/or a products button 2304. This results in displaying the product selection window 2408 or the location selection window 2502. Operation of the configurator 108 then proceeds as described above.

Figure 26:
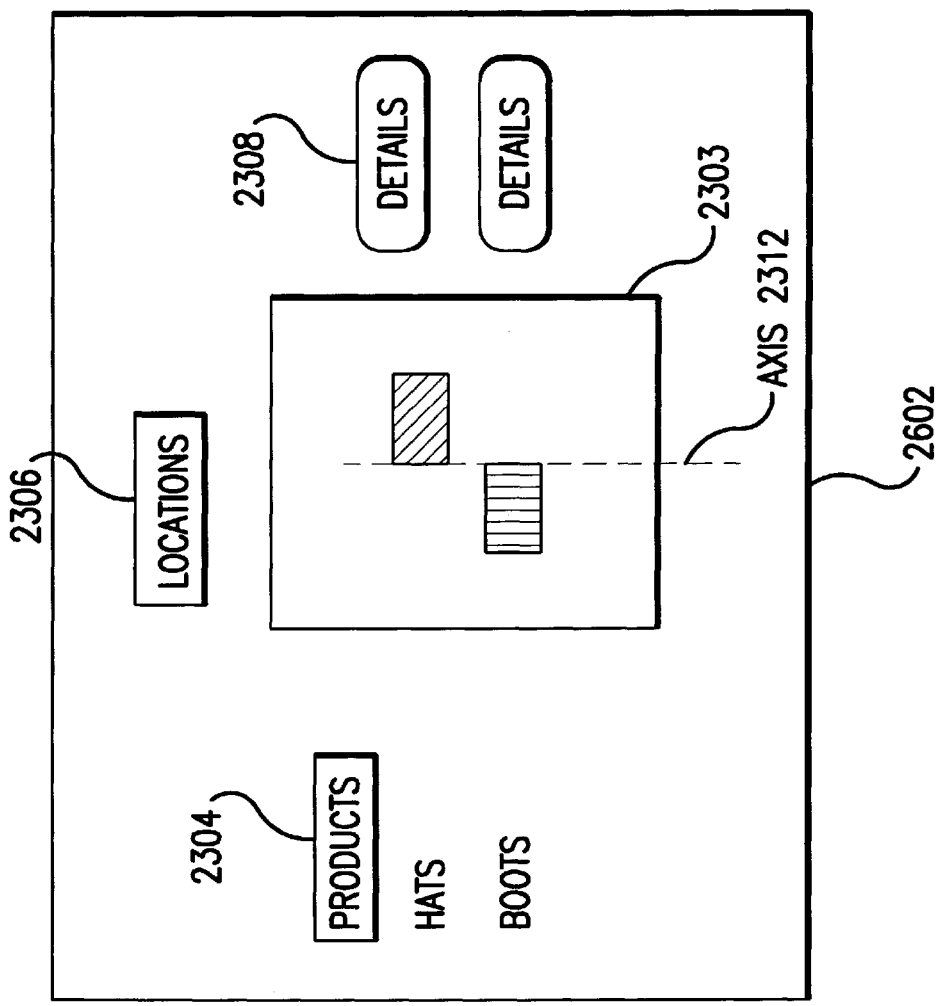
Figure 27:
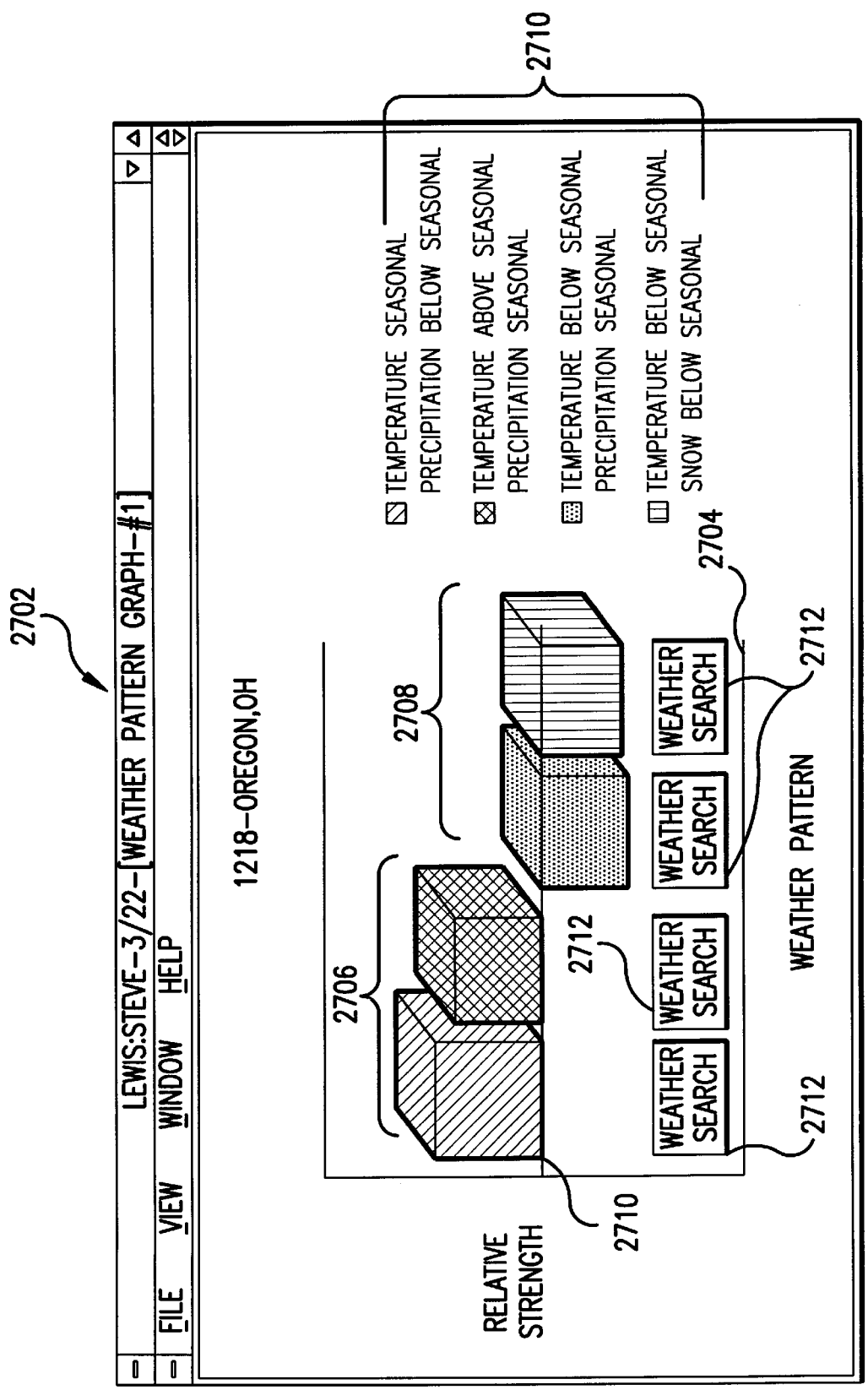

Note that the locations and products shown in the weather impact window 2302 represent two dimensions of a database. The GUI 110 enables the user 402 to interchange the position of these two dimensions in the weather impact window 2302. Preferably, the user 402 does this by selecting the products button 2304 and dragging it over top the locations button 2306, or visa versa. The GUI 110 then displays an alternate weather impact window 2602 as shown in FIG. 26. FIG. 26 is very similar to FIG. 23. In FIG. 23, however, the bars in the bar graph 2303 indicate the degree to which weather impacts sales of the selected products on a per selected location basis. In FIG. 26, the bars in the bar graph 2303 indicate the degree to which weather impacts sales in the selected locations on a per selected product basis.

In the embodiment shown in FIG. 26, the configurator 108 operates as discussed above with respect to FIG. 14. However, in step 1412, for each selected product (instead for each selected location), the configurator 108 sums the positive counts to obtain a total positive count. The configurator 108 also sums the negative counts to obtain a total negative total, and the no change counts to obtain a total no change total. Also, in step 1414, the configurator 108 calculates a score for each selected product (instead of for each selected location).

Figure 15:
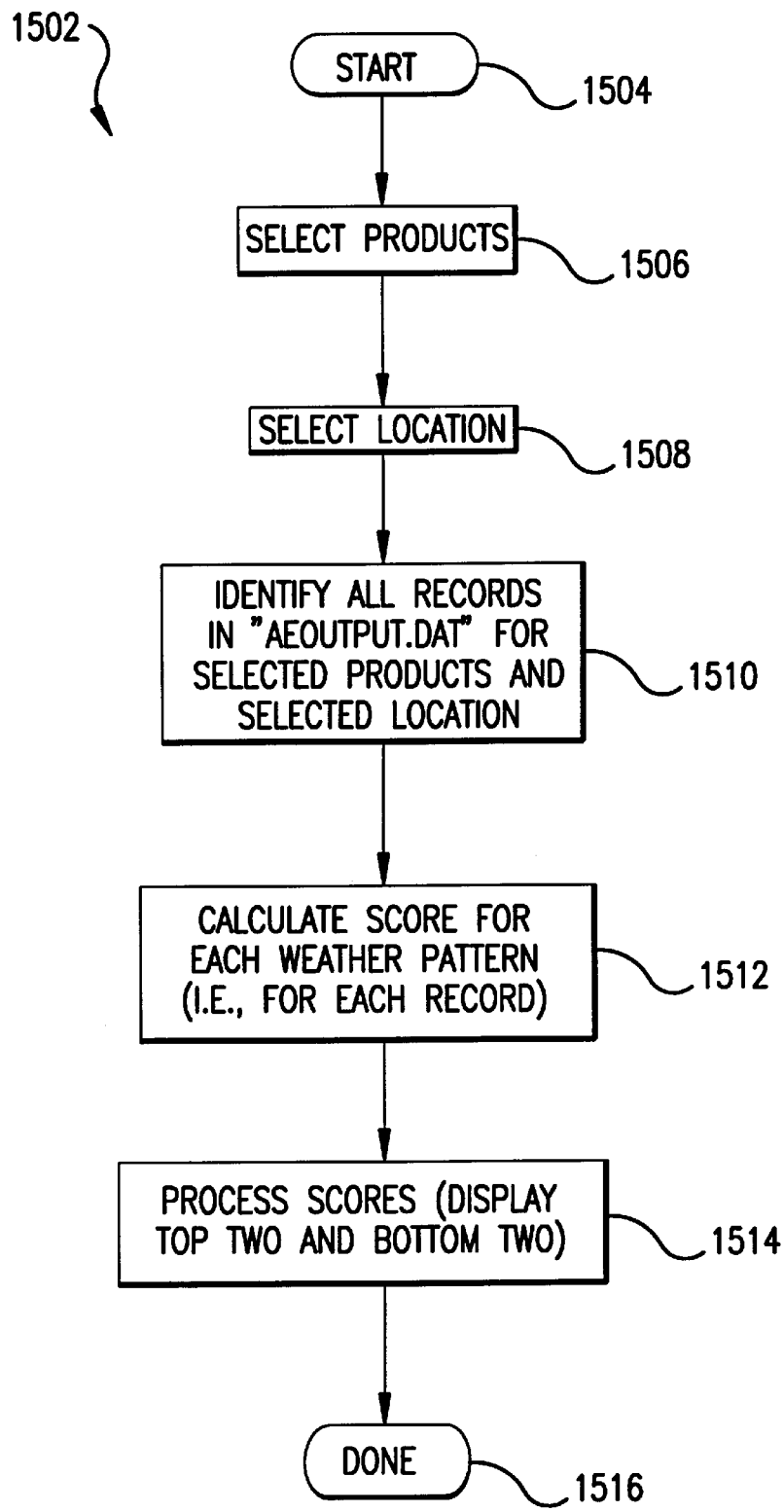

Referring again to FIG. 23, note that there is a Details button 2308 by each bar. The user 402 can click on the Details button 2308 by the bar for a location to obtain details as to that location. The operation of the present invention in this regard (i.e., to process the user 402's request for details) is represented by a flowchart 1502 in FIG. 15.

In steps 1506 and 1508, the products and location are selected for analysis. In practice, steps 1506 and 1508 are performed when the user 408 presses the detail button 2308, since the detail button 2308 that is pressed indicates the location and the products that the user 402 wishes to analyze (the products are always the same when working with the window 2302 shown in FIG. 23; the location is that which corresponds to the bar graph located next to the detail button 2308 that is pushed).

In step 1510, the configurator 108 accesses the analyzer output database 310 (also called "aeoutput.dat") and retrieves all records for the selected products/selected location combinations.

In step 1512, for each weather pattern represented in the records retrieved in step 1510, the configurator 108 generates a score (the manner in which scores are calculated is described above).

In step 1514, the GUI 110 processes these scores. Preferably, the GUI 110 processes these scores by displaying a weather pattern graph window 2702. The weather pattern graph window 2702 includes a bar graph 2704. The GUI 110 selects the two most positive weather pattern scores and the two most negative weather pattern scores and plots these scores in bar graph form in the bar graph 2704. The bars for the two most positive scores start from an axis 2710 and move upward. These scores are generally indicated by 2706. The bars for the two most negative scores start from the axis 2710 and move downward. These bars are generally indicated by 2708. These bars graphically indicate the two weather patterns that had the greatest positive impact on the sale of the selected products in the selected location, and the two weather patterns that had the greatest negative impact on the sale of the selected products in the selected location. These four weather patterns are described in area 2710. Preferably, these descriptions are color coded to match the bars, which are preferably different colors (alternatively, the positive bars 2706 are one color, such as blue, and the negative bars 2708 are another color, such as red).

The embodiment shown in FIG. 26 also has details buttons 2308. The operation of the invention when the details buttons 2308 in FIG. 26 are pushed is very similar to that described above with respect to FIG. 23. However, in the case of the embodiment in FIG. 26, the configurator 108 in step 1510 accesses the analyzer output database 310 (also called "aeoutput.dat") and retrieves all records for the selected locations/selected product combinations.

Referring again to FIG. 2704, note that there is a weather search button 2712 corresponding to each bar. By pressing a weather search button 2712 for a bar corresponding to a particular weather pattern, the user 402 is able to find periods in the future where the weather pattern is predicted to occur. This represents the weather pattern search option 2014 (FIG. 20), and is described below.

Weather Optimization

Figure 19:
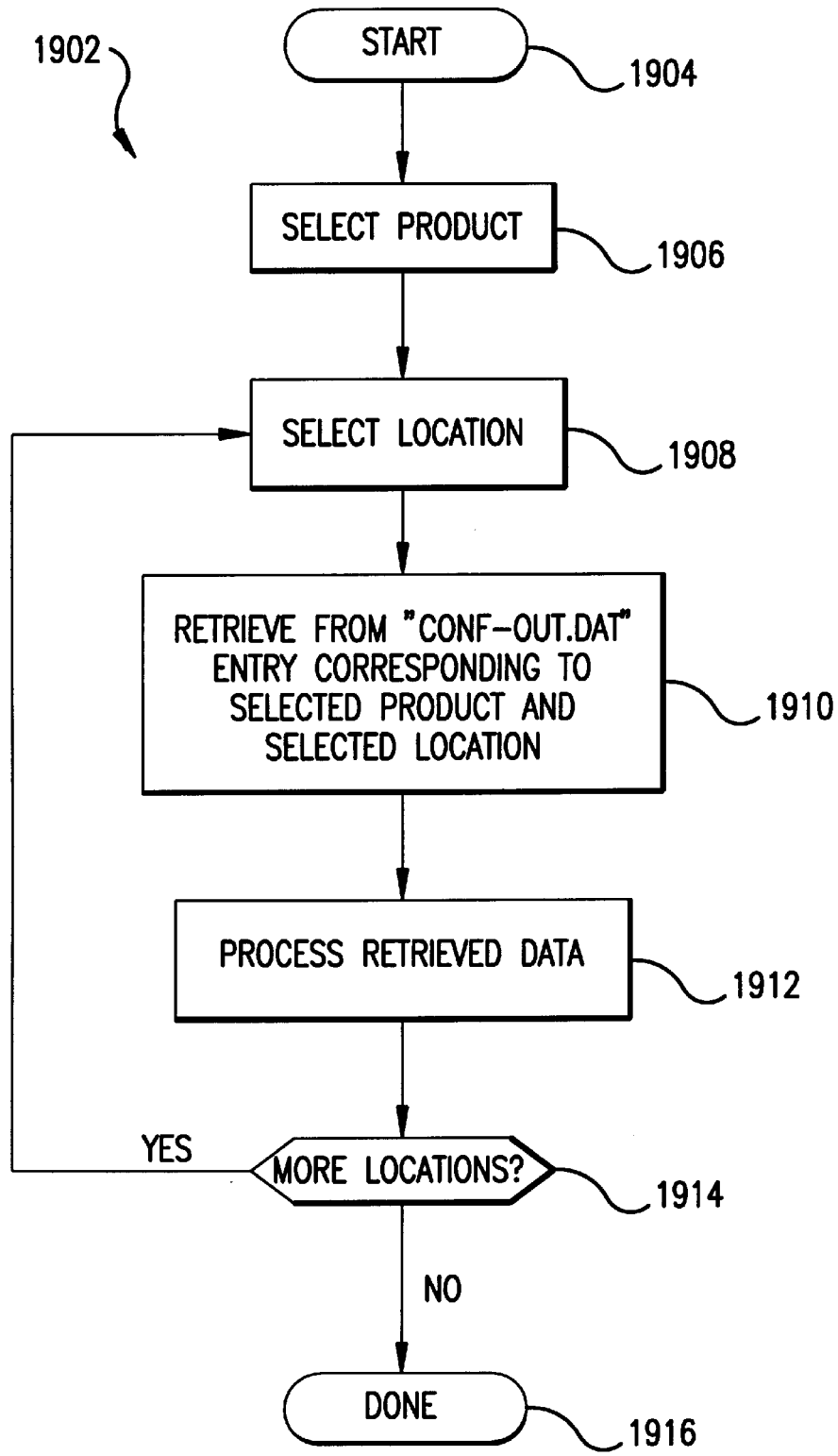

The weather optimization option enables users 402 to review predicted future retail performance of selected products at selected locations in view of the affect of predicted weather at these locations. The present invention performs the steps shown in flowchart 1902 of FIG. 19 when the user 402 selects the weather optimization option 2012.

In steps 1906 and 1908, products and locations are selected for evaluation. The manner in which products and locations are selected is described above.

In step 1910, the configurator 108 retrieves from the configurator output database 1390 all records relating to the selected products/selected stores combinations (i.e., any entry having stored therein one of the selected products and one of the selected stores is retrieved). Note that for any given store, there may be one or more records retrieved from the configurator output database 1390 (one record for each of the selected products that are sold in the store).

In step 1912, the configurator 108 processes the retrieved records. Where multiple records were retrieved for a given store, the configurator 108 for each future period sums the positive, negative, and no change counts from the records and calculates an overall score for the store (taking into account all of the selected products that are sold in the store) for each future period. The manner in which the score is calculated is described above. Where there is only one record for a given store, the configurator 108 need not calculate a score for the score, since such a score was already calculated and in stored in the configurator output database 1390.

Figure 28:
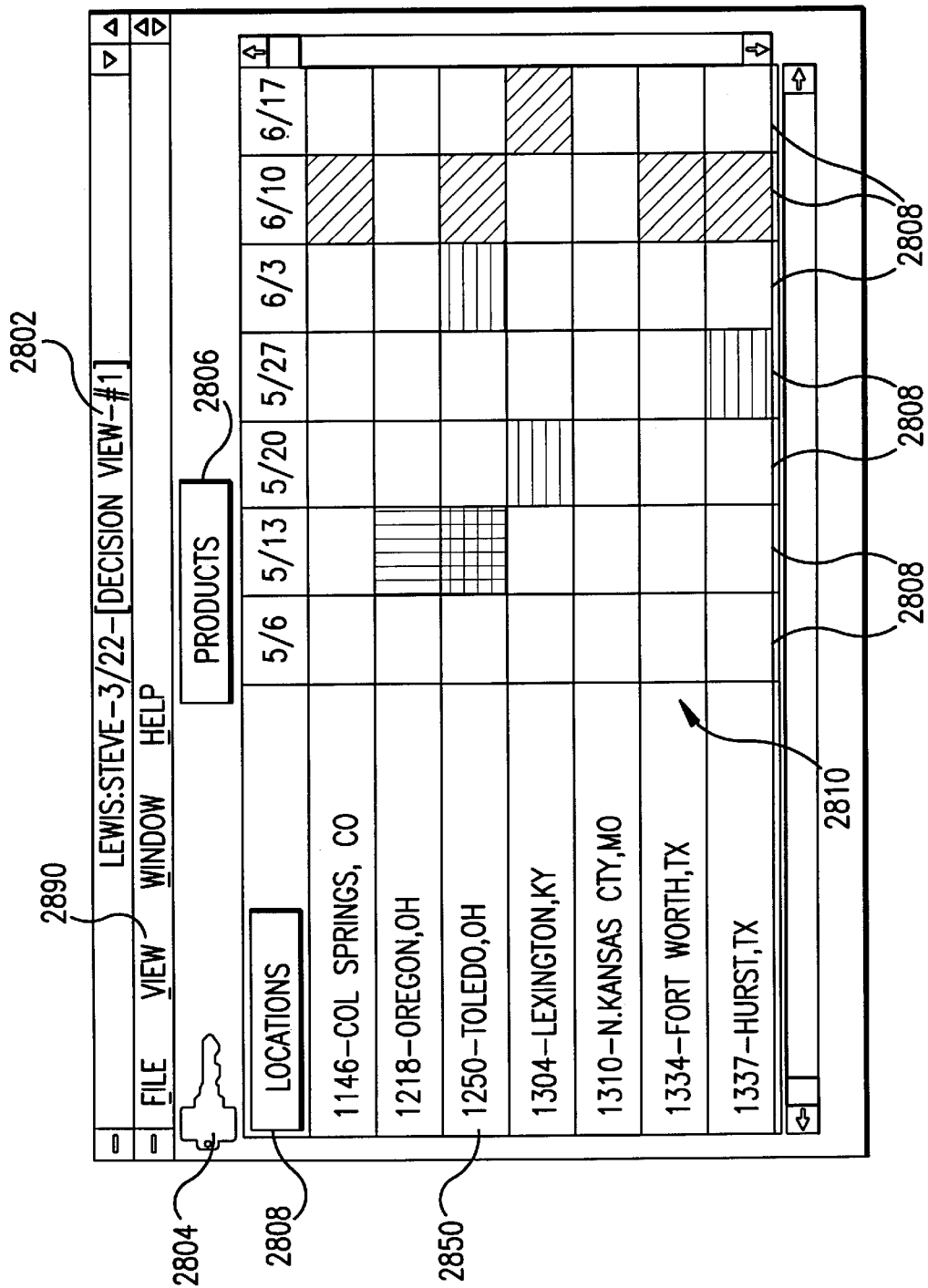

Then, the GUI 110 in step 1912 displays these scores on a per store (location) basis. In particular, the GUI 110 displays a decision view window 2802 as shown in FIG. 28. The decision view window 2802 includes a calendar graph 2810. The calendar graph 2810 includes columns 2808 that represent future periods. The score for each location is graphically represented in the calendar graph 2810 on a per period basis. Consider, for example, Toledo, Ohio. The row 2850 in the calendar graph 2810 for Toledo includes an icon for period 5/13. This row 2850 includes other icons in periods 6/3 and 6/10. These icons graphically represent the scores for these periods for the selected products and for Toledo. If the score is between −1.645 and +1.645, no icon is displayed as the score falls outside the confidence interval of 90%. Confidence intervals are well known to those skilled in the relevant statistical art(s).

Figure 29:
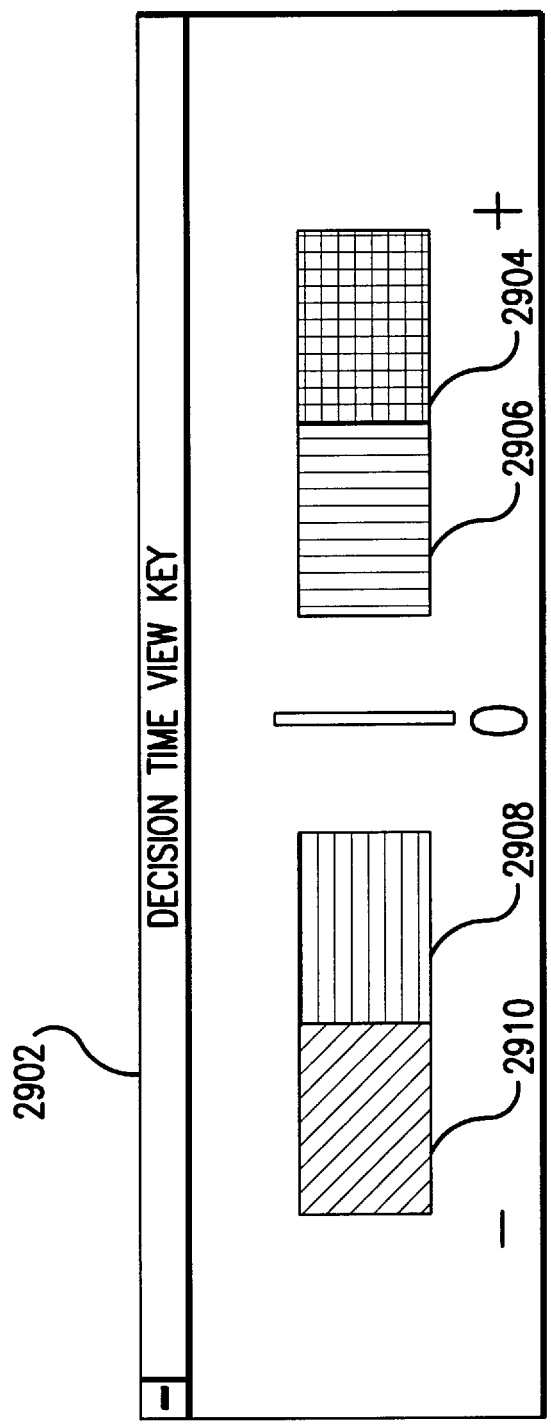

FIG. 29 presents a decision time view key 2902 used for interpreting the icons shown in the decision view window 2802. This key 2902 is displayed when the user 402 presses the key icon 2804 (FIG. 28). As shown in the decision time view key 2902, there are preferably four different icons. Icon 2904 represents strongest predicted future retail performance. Icon 2906 represents stronger predicted future retail performance. Icon 2908 represents weaker predicted future retail performance. Icon 2910 represents weakest predicted future retail performance. In practice, these icons are color coded. For example, icon 2906 is preferably green, icon 2906 is preferably light green, icon 2908 is preferably light red, and icon 2910 is preferably red.

The GUI 110 displays icon 2904 in a time period for a location if the corresponding score is between 2 and 4. Icon 2906 is displayed if the score is between 1.645 and 2. Icon 2908 is displayed if the score is between −2 and −1.645. Icon 2910 is displayed if the score is between −2 and −4. Icon 2912 represents null values, i.e., −1.645 to +1.645. Other values for assigning the icons could alternatively be used. Areas 2908, and 2906 represent a 90% confidence level. Areas 2910, and 2904 represent a 95%+confidence level. Area 2912 falls below the minimum confidence level defined herein. Other confidence intervals can be used to provide a further breakdown of area 2912 if desired.

Figure 30:
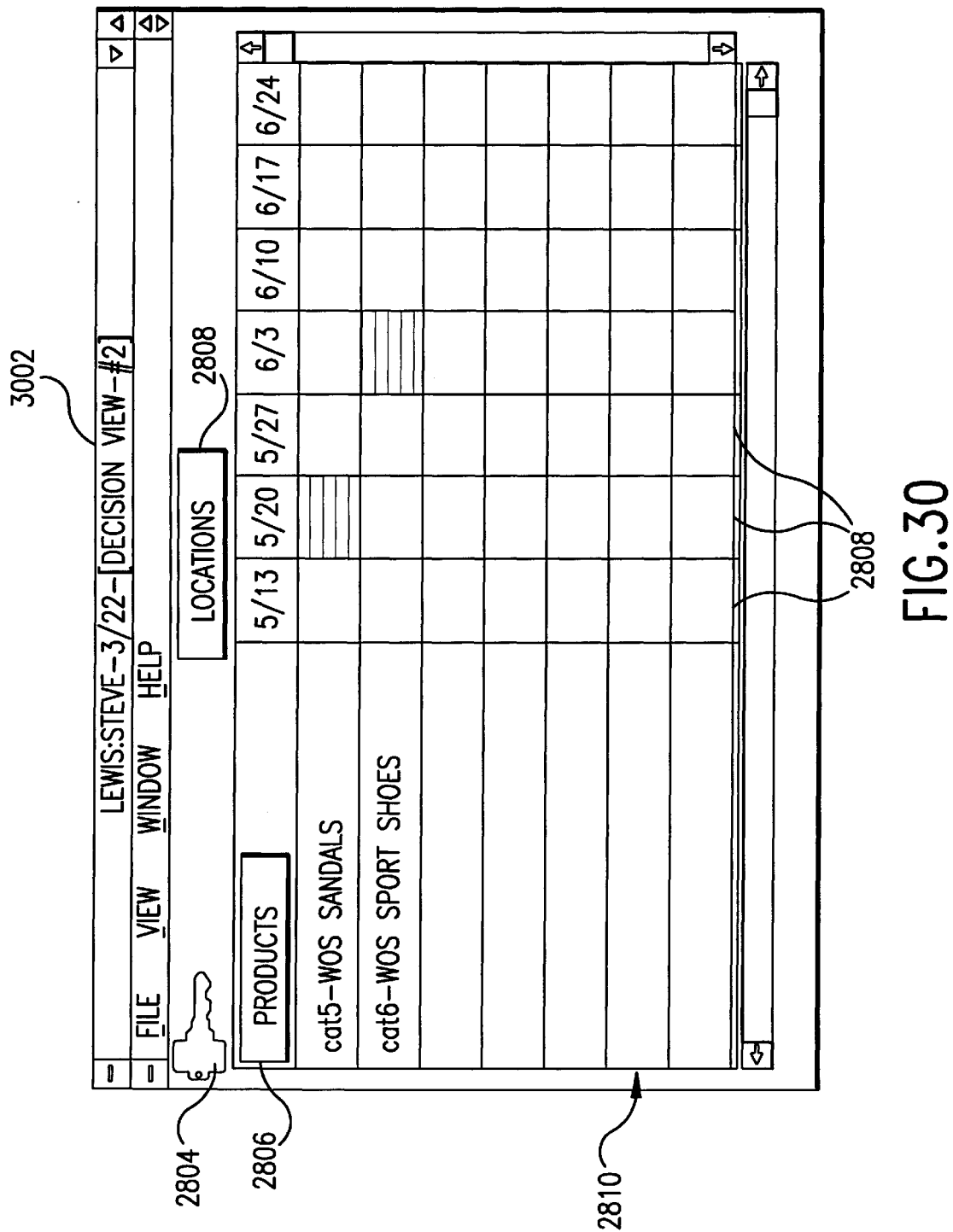

The GUI 110 enables the user 402 to interchange the location dimension and the products dimension by use of the location button 2808 and the products button 2806, as described above. In this case, the GUI 110 displays the decision view window 3002 as shown in FIG. 30. The operation of the invention in this embodiment of FIG. 30 is the same as described above with regard to the embodiment of FIG. 28, except that in step 1912 the configurator 108 groups together the retrieved records for each of the selected products, and then sums the positive, negative, and no change counts from these records and calculates an overall score for each of the selected products (that is, on a per product basis, instead of a per location basis).

Weather Pattern Search

Figure 17:
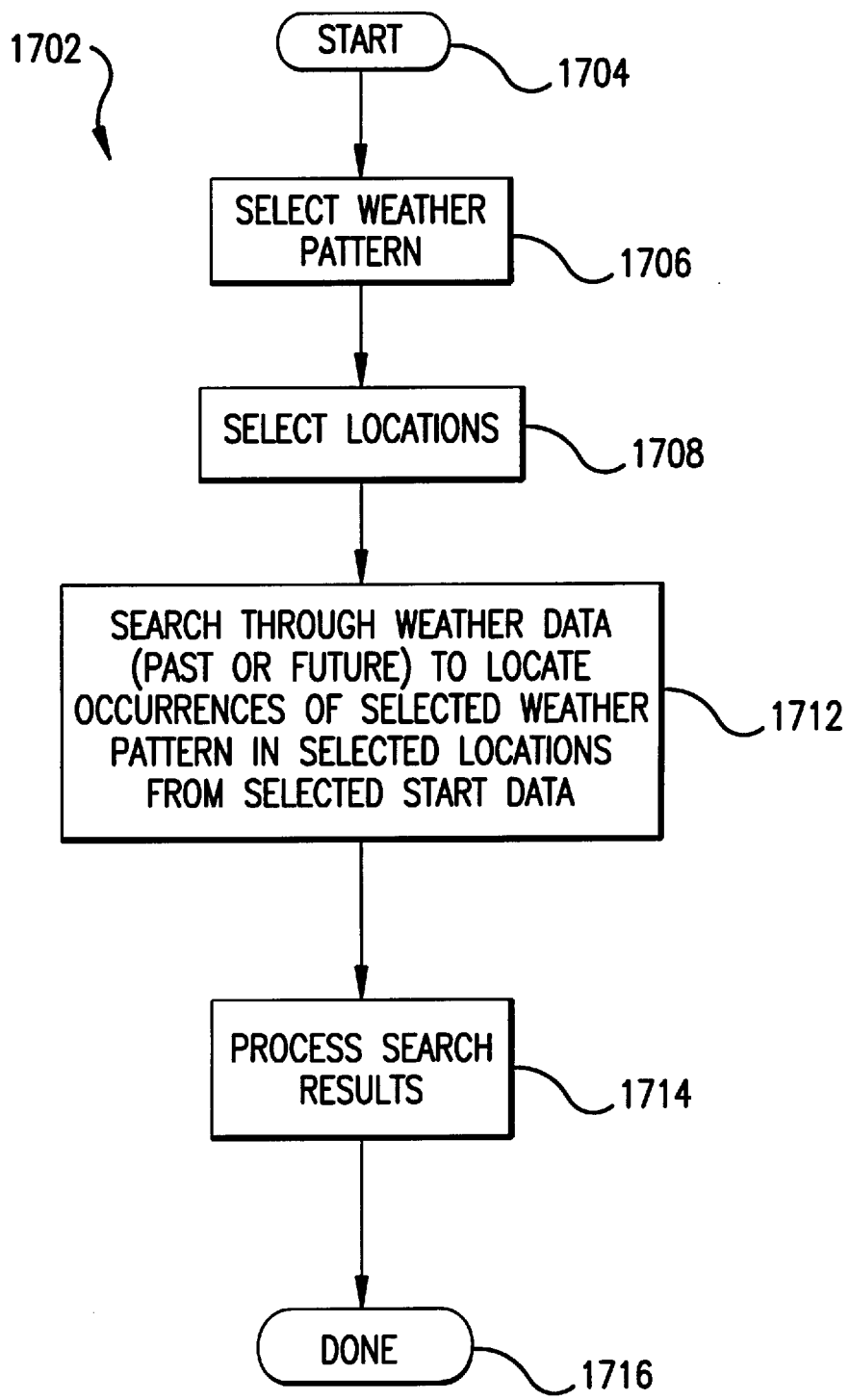

The weather pattern search option 2014 enables the user 402 to specify a particular weather pattern. The system 102 then locates any future periods in selected locations where the particular weather pattern is predicted to occur. The operation of the present invention when performing the weather pattern search option 2014 is represented by a flowchart 1702 in FIG. 17.

Figure 31:
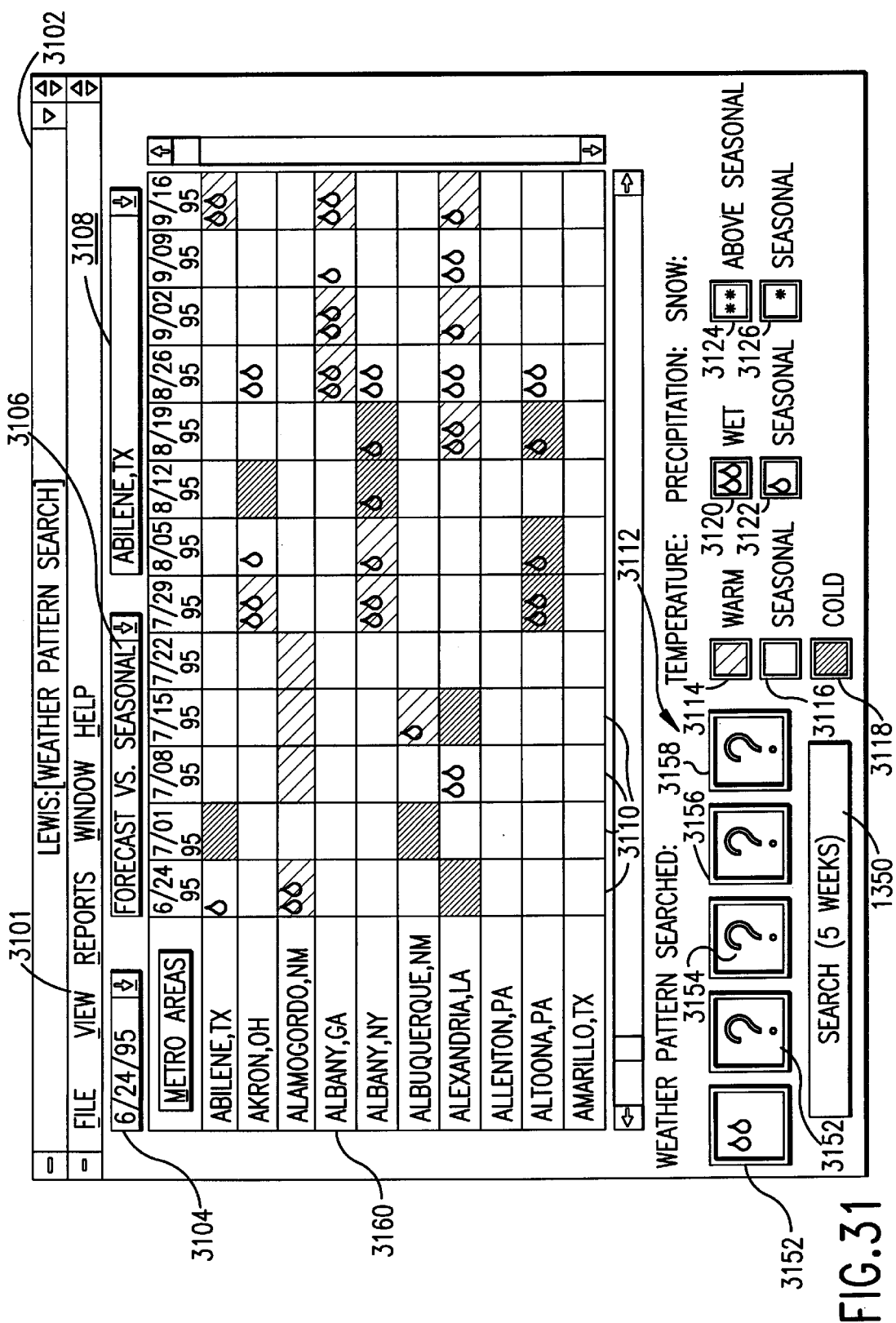

In step 1706, the GUI 110 displays a weather pattern search window 3102. The user 402 then selects a weather pattern to search for. The user 402 may enter a search key for any number of consecutive periods. The user can select the number of periods by pressing button 3150. The search keys for these periods are shown in the search selection area that is generally designated by 3112. In the example of FIG. 31, the user 402 has selected five consecutive periods. To the right of this area 3112 are various icons representing weather search pattern keys that the user 402 may select. In particular, there is an icon 3114 for warm temperature (i.e., above seasonal), an icon 3116 for seasonal temperature, and icon 3118 for cold temperature (i.e., below seasonal), an icon 3120 for wet precipitation (i.e., above seasonal), an icon 3122 for seasonal precipitation, an icon 3124 for above seasonal snowfall, and an icon 3126 for seasonal snowfall. These icons may include graphical items, such as two raindrops for wet or heavier than seasonal precipitation in icon 3120, one raindrop for seasonal precipitation in icon 3122, two snowflakes for heavier than seasonal snow in icon 3124, and one snowflake for seasonal snow in icon 3126. The icons may also be color coded, such as red for icon 3114, grey for icon 3116, and blue for icon 3118.

The user 402 specifies a weather pattern search key for a period in the area 3112 by selecting one of the search icons 3114, 3116, 3118, 3120, 3122, 3124, 3126, dragging the selected search icon to one of the periods in the area 3112, and then dropping the selected search icon into the period in the area 3112. For example, in FIG. 31, the user 402 has selected icon 3114 (warm temperature) and dropped it into period 3152 in the area 3112. The invention allows a period to have more than one search icon. Thus, in FIG. 31, the user 402 has selected icon 3120 (wet), and has dropped it into period 3152. Accordingly, for period 3152, the user 402 has indicated that he wants to search for a period of warm temperature and wet precipitation. The user 402 can specify the weather pattern for the other four periods in a similar manner (these periods have not yet been specified by the user 402), or simply leave them as "?" and the system will return the next four weather patterns following the selected weather pattern.

It step 1708, the user 402 selects the locations for the search. The user 402 preferably performs step 1708 via location selection window 2502, as described above.

In step 1712, the system 102 (either the GUI 110 or the configurator 108) searches through the weather forecast database 312 to locate a sequence of periods that match the sequence that the user specified in the search selection area 3112. Specifically, the system 102 compares the weather pattern search keys from the search selection area 3112 to the category entries in the weather forecast database 312. Consider the weather pattern search key that the user 402 entered for period 3152 in FIG. 31. This weather pattern search key represents T1P1 (temperature above seasonal/ precipitation above seasonal). The system 102 searches through the temp.cat and prec.cat entries in the weather forecast database 312 to identify periods where weather pattern T1P1 is predicted to occur. Periods P1, P2, and P5 match this search criteria in the example shown in FIG. 22. The system 102 then determines whether the four periods respectively following periods P1, P2, and P5 match the weather patterns entered by the user 402 in periods 3152, 3154, 3156, and 3158 of the search selection area 3112. The period is a "don't care" if the user 402 did not enter a weather pattern into the area and will display any four patterns that happen to follow the selected pattern In step 1714, the GUI 110 displays forecast weather information for the selected locations in a calendar graph 3160. The GUI 110 performs step 1714 by retrieving from the weather forecast database 312 the weather pattern (from category entries) for the selected locations. The GUI 110 then represents these weather patterns in the calendar graph 3160 using the same icons 3114, 3116, 3118, 3120, 3122, 3124, and 3126 that the user 420 used to define the search criteria. The calendar graph 3160 includes a number of columns 3110 that corresponds to periods. The starting period displayed in the calendar graph 3160 is determined by the periods matching the search sequence (entered by the user 420 in the search selection area 3112) and appears to the left of the calendar graph 3160.

Flowchart 1702 is complete after step 1714 is performed, as indicated by step 1714.

The weather pattern search option 2014 has been described with respect to search for weather patterns predicted to occur in future periods. Alternatively, the weather pattern search option 2014 can be alternatively used to search for weather patterns that occurred in past periods. This can be achieved by using the weather history database 306, instead of the weather forecast database 312 by changing the comparison button 3106 to Last Year Actual vs Seasonal.

Weather Query

Figure 18:
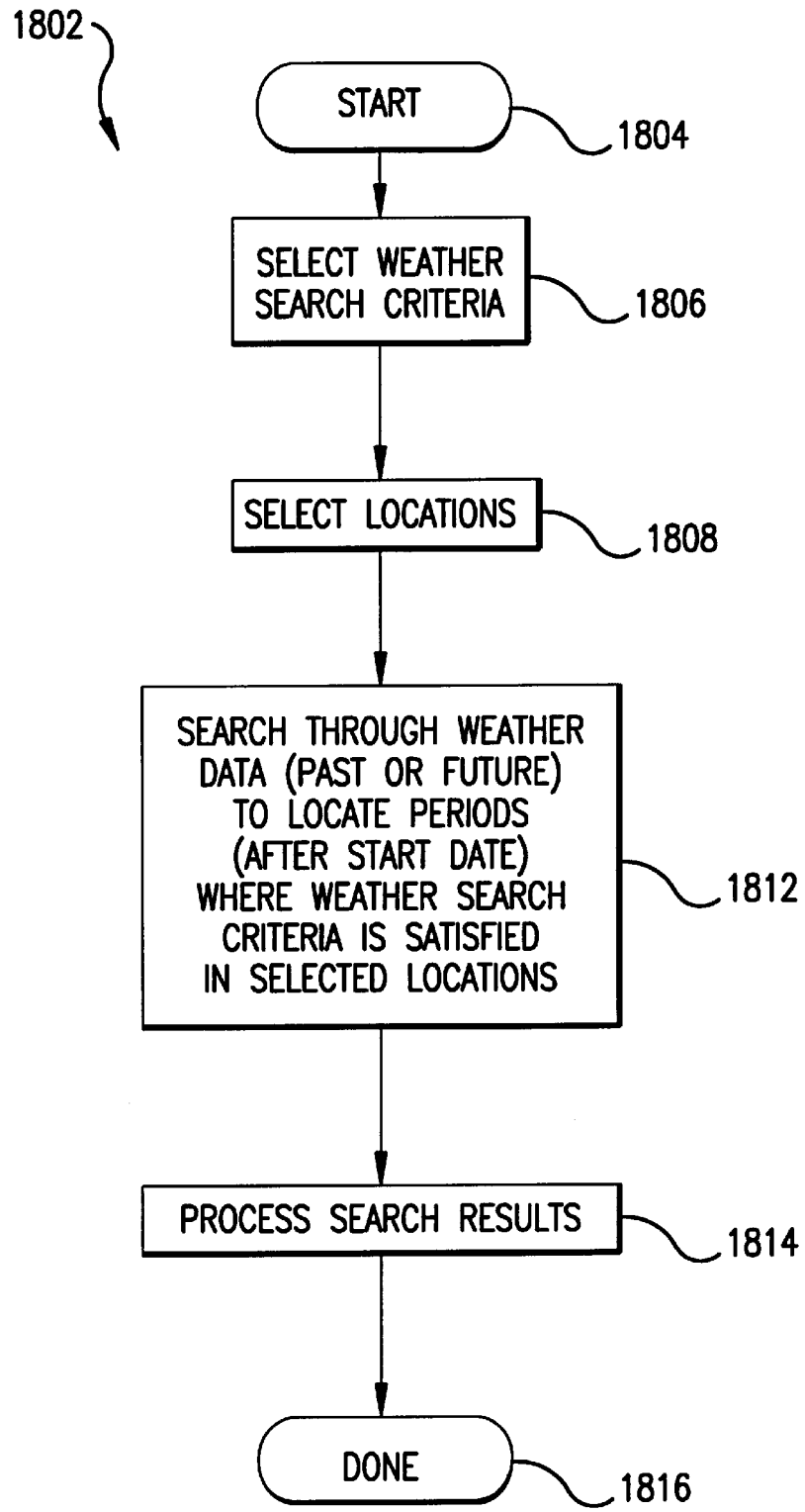

The weather pattern search option 2014 (described above) locates a sequence of periods (either past or future) that match a sequence of weather patterns entered by the user 420. The weather query option 2016 is similar to the weather pattern search option 2014. However, the weather query option 2016 locates periods (past or future) that match quantitative relationships entered by the user 420. For example, the weather query option 2016 can be used to find all periods where the temperature was greater than 85 degrees, or where the snowfall was less than 2 inches. The operation of the system 102 when performing the weather query option 2016 is represented by a flowchart 1802 in FIG. 18.

In step 1806, the GUI 110 displays a weather query window 3202 as shown in FIG. 32. The user 420 interacts with this window 3202 to define a weather search criteria. Specifically, the user 420 opens a first pull down window to select whether the search will be done using the weather forecast database 312 and/or the weather history database 306. The user 420 opens a second pull down window 3208 to define the logical relationship, such as equal to, greater than, or less than. The user 420 opens a third pull down window 3210 to enter the value that will be used for comparison. The user 420 opens a fourth pull down window 3212 to define the units (degrees, inches of snow, inches of precipitation, etc.) for the value entered via the third pull down window 3210. In the example shown in FIG. 32, the user 420 has defined the following search: locate all periods where the temperature was greater than 88 degrees.

In step 1808, the user 420 selects locations to include in the search. The user 420 preferably performs step 1808 through interaction with the location selection window 2502, described above (access to this window 2502 is achieved by pressing the cities button 3204).

In step 1812, the system 102 (either the GUI 110 or the configurator 108) searches through the weather history database 306 (if the user 420 entered a date in the past) or the weather forecast database 312 (if the user 420 entered a future date) and locates any periods for the selected locations and after the selected start date where the weather satisfies the criteria entered by the user 420 in step 1806.

In step 1814, the GUI 110 displays this information in a results area 3214 of the weather query window 3202.

Flowchart 1802 is complete after step 1814 is performed, as indicated by step 1816.

Alternative Report Formats

Figure 33:
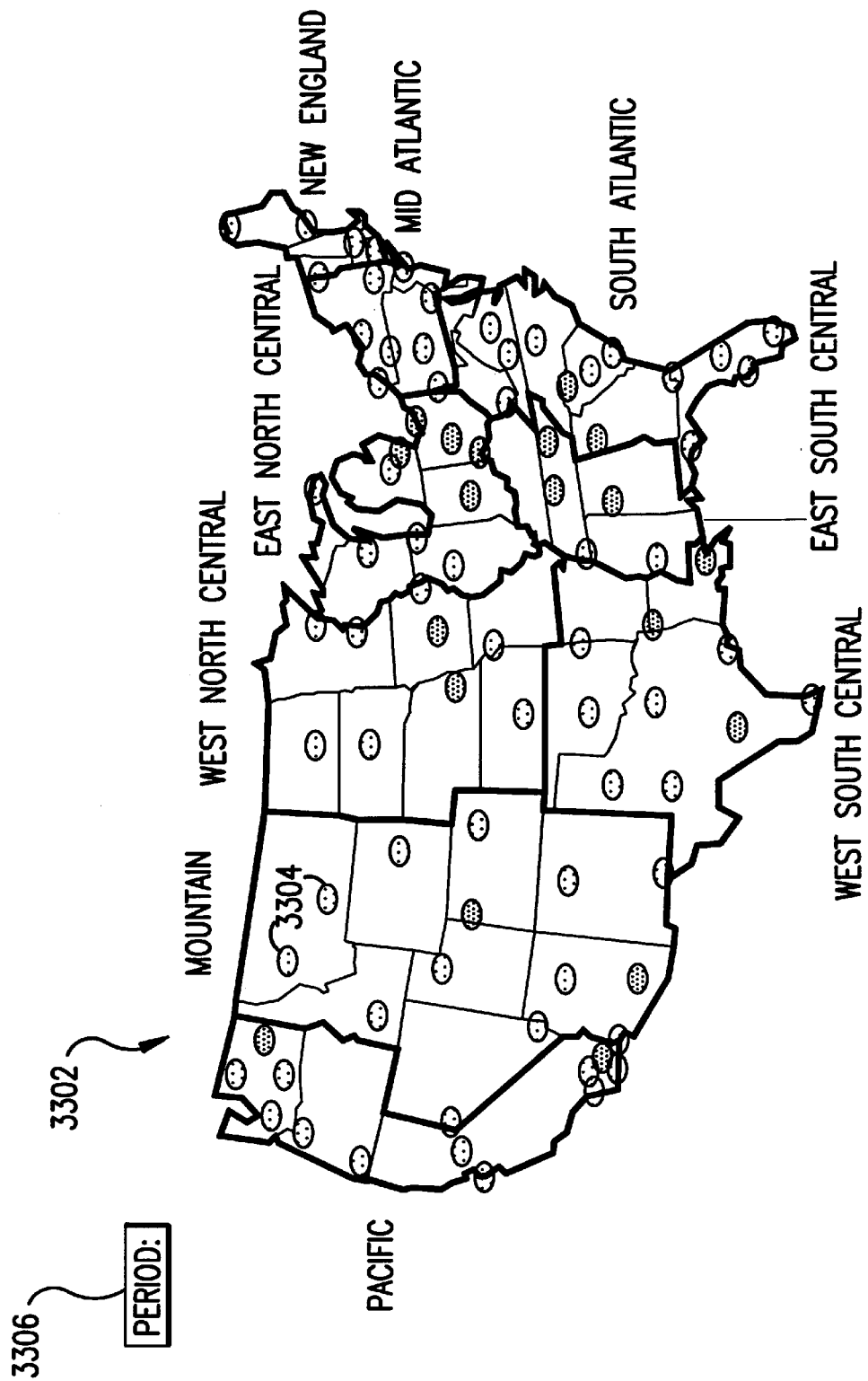

The system 102 supports reporting formats other than those discussed above. For example, the system 102 supports a location report 3302 as shown in FIG. 33. The location report 3302 includes an image of a geographical area, such as the United States. An oval 3304 is displayed over every selected location (i.e., every selected metro area or store). The ovals 3304 are color coded in the same way as the default reporting format.

For example, consider the decision view window 2802 shown in FIG. 28. This window 2802 is the default reporting format for the weather optimization option 2012. The information contained in the decision view window 2802 can alternatively be displayed using the location report 3302 (the user 402 preferably switches to the location report 3302 by selecting an appropriate option in the View pull down menu 2890). To use the location report 3302, the user 420 must enter a time period in the period field 3306. In the location report 3302, the ovals 3304 are color coded so as to graphically indicate the predicted strength of retail performance in the selected stored on the period entered into the period field 3306. As indicated above, the ovals 3304 are color coded using the scheme from the default reporting format, in this case the decision view window 2802. Accordingly, when processing the weather optimization option 2012, the color coding scheme shown in FIG. 29 is used.

Figure 34:
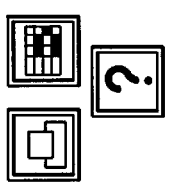

The invention also supports a text based report format 3402 as shown in FIG. 34. In the example shown in FIG. 34, weather that has occurred in the past and/or that is predicted to occur in the future is displayed for a location specified in a location field 3404 (in this case, Washington, D.C.). In the text based report format 3402, the period must be greater than one day. In the example shown in FIG. 34, the period is one week. The user 402 can adjust the length of the time period to anything greater than one day. If the user 402 wishes to view information on a daily basis, then the daily report format is used (discussed below).

The user 402 can elect the text based report format 3402 from the default reporting format from any of the options available from the main menu 2004. For example, the user 402 can elect to view the results of the weather pattern search 2014 in the text based report format 3402. The user 402 does this by selecting one of the locations while at the weather pattern search window 3102 (FIG. 31), and then selecting the text based report format 3402 from the View pull down menu 3101. Information that is required for display in the text based report format 3402 is retrieved from the weather history database 306 and/or the weather forecast database 312. Electing the text based report format 3402 from the weather impact window 2302, the decision view window 2802, or the weather query window 3202 proceeds in a similar manner.

As noted above, the daily report format 3502 (FIG. 35) is used if the user 402 wishes to view data on a daily basis. The user 402 can elect the daily report format 3502 from the default reporting format from any of the options available from the main menu 2004. For example, the user 402 can elect to view the results of the weather pattern search 2014 in the daily report format 3502. The user 402 does this by selecting one of the locations while at the weather pattern search window 3102 (FIG. 31), and then selecting the daily report format 3402 from the View pull down menu 3101. Information that is required for display in the text based report format 3402 is retrieved from the weather history database 306 and/or the weather forecast database 312. Electing the daily report format 3502 from the weather impact window 2302, the decision view window 2802, or the weather query window 3202 proceeds in a similar manner.

The daily report format 3502 preferably includes at least one row that is color coded for ease of viewing. In the example of FIG. 35, a temperature forecast row 3514 is color coded. In particular, cold days are color coded with a first color (such as blue), warm days are color coded with a second color (such as pink), seasonal days are color coded with a third color (such as green), and very warm days are color coded with a fourth color (such as red). What constitutes cold, warm, seasonal, and very warm is implementation dependent. Note that the text based report format 3402 can be color coded in a similar manner.

Figure 36:
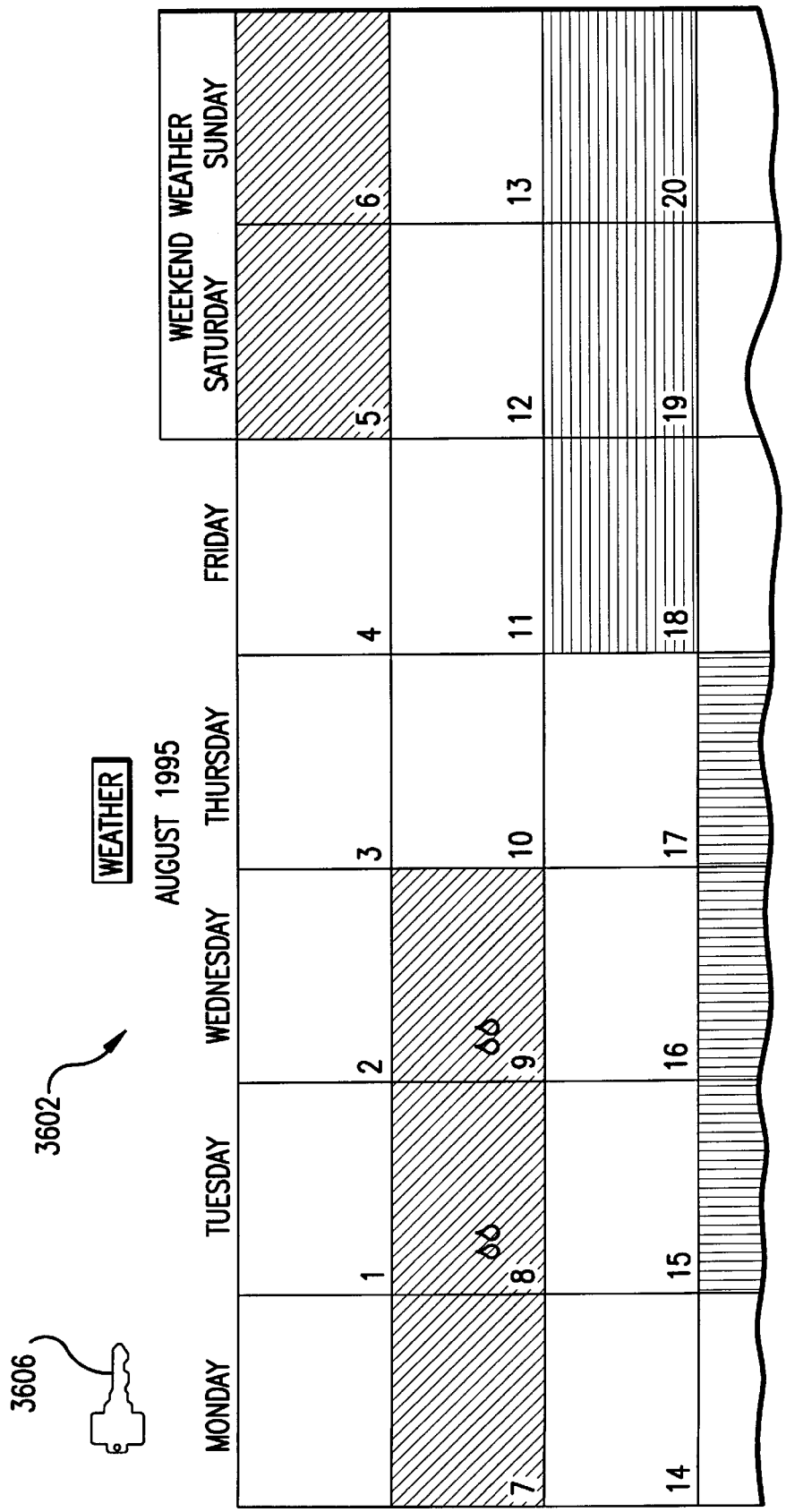

The invention also supports a calendar format 3602 (FIGS. 36 and 36A). The calendar format 3602 includes a calendar image of a month selected by the user 402. Icons are displayed in the days of this month. These icons correspond to those from the default reporting format. Consider, for example, the weather pattern search window 3102. The user 402 can elect to view the results of the weather pattern search 2014 in the calendar report format 3602 by selecting one of the locations while at the weather pattern search window 3102 (FIG. 31), and then selecting the calendar report format 3502 from the View pull down menu 3101. Icons displayed in the weather pattern search window 3102 are then displayed in the corresponding days of the calendar report format 3602. The user 402 can view a legend for the icons displayed in the calendar view 3602 by pressing a key button 3606 (shown in FIG. 36).

The calendar format 3602 also includes a summary 3604 (shown in FIG. 36A) of the weather that occurred or that is predicted to occur in the subject month. The summary 3604 is provided in both the weather history database 306 and the weather forecast database 312. A similar summary could also be displayed in any of the other reporting formats discussed herein.

Figure 36B:
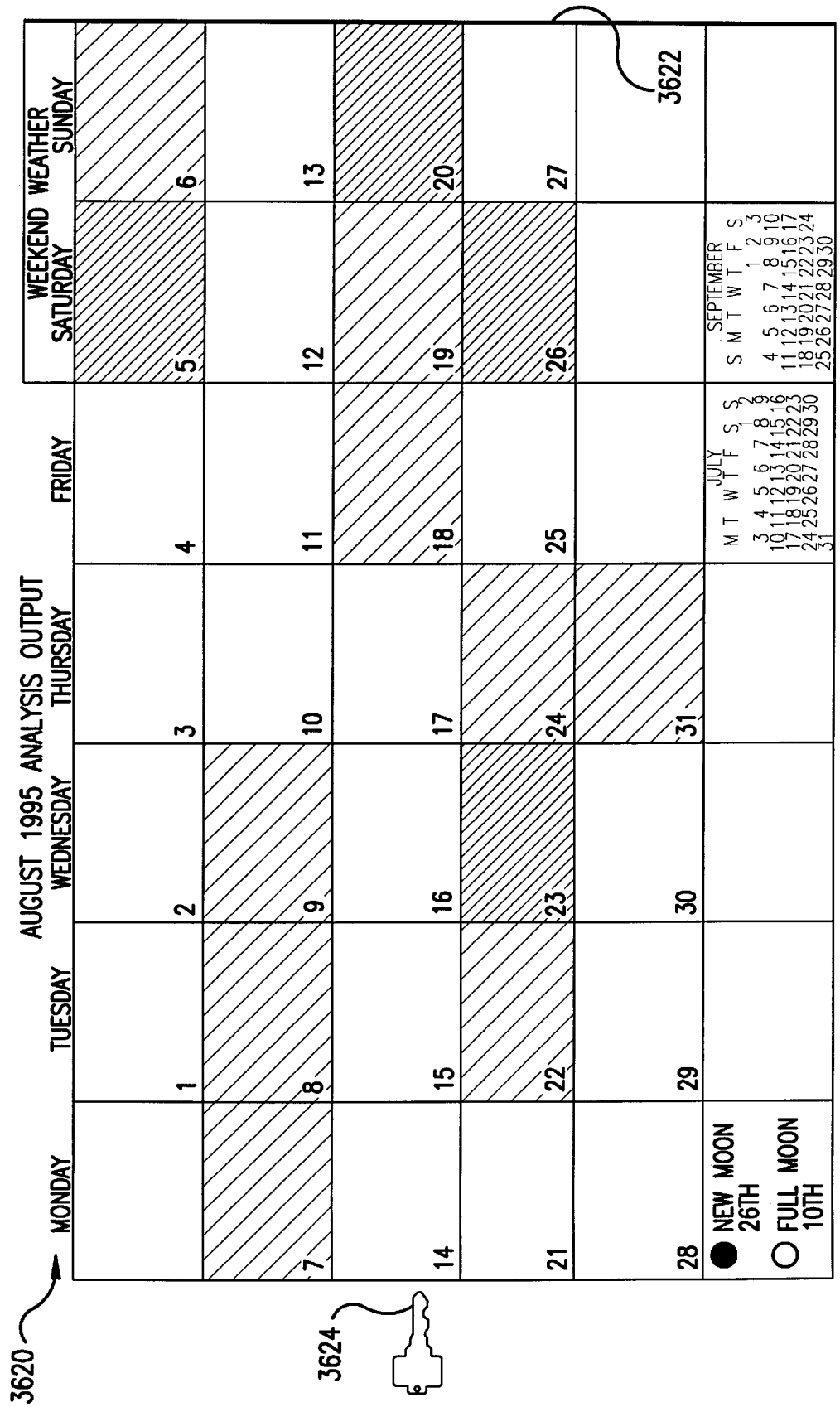

FIG. 36B illustrates the calendar format 3620 when displayed in conjunction with weather optimization 2012. The calendar format 3620 presents information for a user-selected location. An icon is displayed for each day. These icons are the same that are used in the decision view window 2802 (FIG. 28). A legend for these icons can be viewed by pressing an icon button 3624.

Scope of the Invention

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For example, for illustrative purposes, the present invention has been described above in the context of the retail industry. However, the invention is not limited to this embodiment. The present invention is well suited, adapted, and intended for use with any endeavor and/or industry and/or market that is potentially or actually impacted by weather. This includes, but is not limited to, retail products and services, manufacturing/production (i.e., construction, utilities, movie production companies, advertising agencies, forestry, mining), transportation, the entertainment industry, the restaurant industry, etc.

What is claimed is:

1. A system for forecasting business performance, comprising:
    a storage device storing a business history database, a weather history database, and a weather forecast database;
    an analyzer to determine the extent to which past business performance of a plurality of business units at a plurality of locations was affected by weather using said business history database and said weather history database;
    a configurator, coupled to said analyzer, to estimate expected future business performance of said business units at said locations for a plurality of future time periods using said weather forecast database and results produced by said analyzer; and
    a graphical user interface, coupled to said analyzer and said configurator, to enable users to view and manipulate results produced by said analyzer and said configurator to thereby forecast future business performance of said business units at said locations,
    wherein said graphical user interface comprises weather query means for locating and displaying any sequence of periods that match user-specified sequences of weather patterns.

2. The system of claim 1, wherein said analyzer comprises:
    means for selecting a first prior year and a second prior year, said second prior year being before said first prior year;
    means for selecting a location and a business unit;
    means for selecting a weather pattern; and
    business performance determining means for determining the extent to which said selected weather pattern affected business performance of said selected business unit in said selected location during said first prior year and said second prior year.

3. The system of claim 2, wherein said business performance determining means comprises:
    means for selecting a period in said first prior year and said second prior year for evaluation;
    means for determining whether said selected weather pattern occurs in said selected period of only one of said first prior year and said second prior year; and
    impact determining means for determining, if it is determined that said selected weather pattern occurs in said selected period of only one of said first prior year and said second prior year, whether said selected weather pattern had a positive impact, a negative impact, or no impact on business performance of said selected business unit in said selected location from said second prior year to said first prior year.

4. The system of claim 3, wherein said impact determining means comprises:
    means for determining that said selected weather pattern had a positive impact on business performance of said selected business unit in said selected location from said second prior year to said first prior year if business performance improved from said second prior year to said first prior year;
    means for determining that said selected weather pattern had a negative impact on business performance of said selected business unit in said selected location from said second prior year to said first prior year if business performance worsened from said second prior year to said first prior year; and
    means for determining that said selected weather pattern had no impact on business performance of said selected business unit in said selected location from said second prior year to said first prior year if business performance did not change from said second prior year to said first prior year.

5. The system of claim 2, wherein said analyzer further comprises:
    means for storing results of said business performance determining means in an analyzer output database.

6. The system of claim 1, wherein said configurator comprises:
    means for selecting a business unit;
    means for selecting a location;
    means for selecting a future period in a future time span; and
    business performance estimating means for estimating business performance of said selected business unit in said selected location during said selected future period in accordance with weather predicted to occur in said location during said future period.

7. The system of claim 6, wherein said business performance estimating means comprises:
    means for identifying all weather patterns predicted to occur in said location during said future period;
    past business performance determining means for determining the manner in which said identified weather patterns have previously affected business performance of said selected business unit in said selected location;
    score calculating means for calculating a score indicative of predicted business strength of said selected business unit in said selected location for said selected future period in accordance with said determination of said past business performance determining means; and means for storing said score in a configurator output database.

8. The system of claim 7, wherein said past business performance determining mean comprises:

count retrieving means for retrieving from an analyzer output database a positive count, a negative count, and a no change count corresponding to said selected business unit and said selected location for each of said identified weather patterns;

means for summing all positive counts retrieved by said count retrieving means to generate a total positive count; and means for summing all negative counts retrieved by said count retrieving means to generate a total negative count; and means for summing all no change counts retrieved by said count retrieving means to generate a total no change count.

9. The system of claim 8, wherein said score calculating means comprises:

means for summing said total positive count, said total negative count, and said total no change count to generate a total count, called totalcount;

count selecting means for selecting either said total positive count, said total negative count, or said total no change count, said selected count called selectedcount;

means for calculating a score for said selected business unit in said selected location for said selected future time period according to an equation:

$$\frac{\frac{selectedcount}{totalcount} - 0.5}{\sqrt{ABS \frac{(0.5 * (1 - 0.5))}{totalcount}}}$$

10. The system of claim 9, wherein said score calculating means further comprises:

means for setting a score for said selected business unit in said selected location for said selected future period equal to zero if said total count is equal to zero.

11. The system of claim 9, wherein said score calculating means further comprises:

means for limiting said score to values between a predetermined minimum value and a predetermined maximum value.

12. The system of claim 9, wherein said count selecting means comprises:

means for selecting the greater of either said total positive count, said total negative count, or said total no change count.

13. The system of claim 1, wherein said graphical user interface comprises:

administrator setup means for enabling an operator to specify parameters for a customized view; and means for filtering said business history database, said weather history database, and said weather forecast database in accordance with said specified parameters for as to create said customized view.

14. The system of claim 13, wherein said administrator setup means comprises:

means for enabling said operator to specify a time frame for evaluation, a first prior year and a second prior year for evaluation, business units for evaluation, locations for evaluation, weather patterns for evaluation, or business performance metrics for evaluation.

15. The system of claim 1, wherein said graphical user interface comprises:

weather impact means for displaying to users the manner in which past weather impacted business performance of selected business units in selected locations.

16. The system of claim 15, wherein said weather impact means comprises:

means for enabling a user to select one or more business units;

means for enabling the user to select a location;

record retrieval means for retrieving all records from an analyzer output database corresponding to said selected business units and said selected location, said retrieved records representing past business performance of said business units in said location as affected by weather;

score calculating means for using said retrieved records to calculate a score indicative of predicted business strength of said selected business units in said selected location; and means for displaying said score to the user.

17. The system of claim 16, wherein each of said retrieved records includes a positive count, a negative count, and a no change count, said weather impact means further comprising:

means for summing all positive counts in said retrieved records to generate a total positive count;

means for summing all negative counts in said retrieved records to generate a total negative count; and means for summing all no change counts in said retrieved records to generate a total no change count.

18. The system of claim 17, wherein said score calculating means comprises:

means for summing said total positive count, said total negative count, and said total no change count to generate a total count, called a totalcount;

count selecting means for selecting either said total positive count, said total negative count, or said total no change count, said selected count called a selectedcount;

means for calculating a score for said selected business unit in said selected location for said selected future period according to an equation:

$$\frac{\frac{selectedcount}{totalcount} - 0.5}{\sqrt{ABS \frac{(0.5 * (1 - 0.5))}{totalcount}}}$$

19. The system of claim 18, wherein said score calculating means further comprises:

means for setting a score for said selected business unit in said selected location for said selected future period equal to zero if said total count is equal to zero.

20. The system of claim 18, wherein said score calculating means further comprises:

means for limiting said score to values between a predetermined minimum value and a predetermined maximum value.

21. The system of claim 18, wherein said count selecting means comprises:

means for selecting the greater of either said total positive count, said total negative count, or said total no change count.

22. The system of claim 15, wherein said weather impact means comprises:

details means for displaying to users the manner in which past weather impacted business performance of selected business units in a user-selected location.

23. The system of claim 22, wherein said details means comprises:
   means for retrieving all records from an analyzer output database corresponding to said selected business units and said user-selected location, said retrieved records representing past business performance of said business units in said user-selected location as affected by weather;
   score calculating means for using said retrieved records to calculate for each weather pattern represented by said retrieved records a score indicative of predicted business strength of said selected business units in said selected location in view of said each weather pattern; and
   score displaying means for displaying to users a subset of scores calculated by said score calculating means.

24. The system of claim 23, wherein said score displaying means comprises:
   means for displaying the two highest scores and the two lowest scores.

25. The system of claim 1, wherein said graphical user interface comprises:
   weather optimization means for displaying to users predicted future business performance of selected business units at selected locations in view of predicted weather at said selected locations.

26. The system of claim 25, wherein said weather optimization means comprises:
   means for enabling a user to select a business unit for evaluation;
   means for enabling the user to select a location for evaluation;
   means for retrieving from a configurator output database all records corresponding to said selected business unit and said selected location, said retrieved records representing predicted future business performance of said selected business unit in said selected location; and
   displaying means for displaying to users information contained in said retrieved records.

27. The system of claim 26, wherein said displaying means comprises:
   table displaying means for displaying a table having a plurality of rows and a plurality of columns, each row corresponding to a business unit or location, and each column corresponding to a future time period; and
   score displaying means for displaying in a row corresponding to said selected business unit or location scores contained in said retrieved records, each score corresponding to a future time period and displayed in a column of said table associated with said future time period.

28. The system of claim 1, wherein said graphical user interface comprises:
   weather pattern search means for identifying and displaying any future periods where user-specified weather patterns are predicted to occur.

29. The system of claim 28, wherein said weather pattern search means comprises:
   means for enabling a user to select a weather pattern;
   means for enabling the user to select one or more locations;
   weather search means for searching through said weather history database or said weather forecast database to locate time periods where said selected weather pattern occurs at said selected locations; and
   weather pattern displaying means for displaying results of said weather search means to the user.

30. The system of claim 29, wherein said weather pattern displaying means comprises:
   table displaying means for displaying a table having a plurality of rows and a plurality of columns, each row corresponding to a location, and each column corresponding to a future time period; and
   means for displaying in rows respectively corresponding to said selected locations said results of said weather search means.

31. The system of claim 1, wherein said weather query means comprises:
   means for enabling a user to enter weather search criteria;
   means for enabling the user to enter one or more locations;
   weather search means for searching through said weather history database or said weather forecast database to locate time periods where said weather search criteria are satisfied; and
   weather query displaying means for displaying results of said weather search means to the user.

32. A method of forecasting business performance, comprising the steps of:
   (1) storing in a storage device a business history database, a weather history database, and a weather forecast database;
   (2) determining by an analyzer the extent to which past business performance of a plurality of business units at a plurality of locations was affected by weather using said business history database and said weather history database;
   (3) estimating by a configurator expected future business performance of said business units at said locations for a plurality of future time periods using said weather forecast database and results produced by said analyzer; and
   (4) enabling users to view and manipulate results produced by said analyzer and said configurator to thereby forecast future business performance of said business units at said locations for said time periods, and further comprising the step of locating and displaying any sequence of time periods that match user-specified sequences of weather patterns.

33. The method of claim 32, wherein step (2) comprises the steps of:
   (a) selecting a first prior year and a second prior year, said second prior year being before said first prior year;
   (b) selecting a location and a business unit;
   (c) selecting a weather pattern; and
   (d) determining the extent to which said selected weather pattern affected business performance of said selected business unit in said selected location during said first prior year and said second prior year.

34. The method of claim 33, wherein step (d) comprises the steps of:
   (I) selecting a period in said first prior year and said second prior year for evaluation;
   (II) determining whether said selected weather pattern occurs in said selected period of only one of said first prior year and said second prior year; and
   (III) determining, if it is determined that said selected weather pattern occurs in said selected period of only one of said first prior year and said second prior year, whether said selected weather pattern had a positive impact, a negative impact, or no impact or business performance of said selected business unit in said selected location from said second prior year to said first prior year.

35. The method of claim 34, wherein step (III) comprises the steps of:
   determining that said selected weather pattern had a positive impact on business performance of said selected business unit in said selected location from said second prior year to said first prior year if business performance improved from said second prior year to said first prior year relative to user-specified criteria;
   determining that said selected weather pattern had a negative impact on business performance of said selected business unit in said selected location from said second prior year to said first prior year if business performance worsened from said second prior year to said first prior year relative to user-specified criteria; and
   determining that said selected weather pattern had no impact on business performance of said selected business unit in said selected location from said second prior year to said first prior year if business performance did not change from said second prior year to said first prior year relative to user-specified criteria.

36. The method of claim 33, wherein step (2) further comprises the step of:
   (e) storing results of said business performance determining means in an analyzer output database.

37. The method of claim 32, wherein step (3) comprises the steps of:
   (a) selecting a business unit;
   (b) selecting a location;
   (c) selecting a future period in a future time span; and
   (d) estimating business performance of said selected business unit in said selected location during said selected future period in accordance with weather predicted to occur in said location during said future period.

38. The method of claim 37, wherein step (d) comprises the steps of:
   (I) identifying all weather patterns predicted to occur in said location during said future period;
   (II) determining the manner in which said identified weather patterns have previously affected business performance of said selected business unit in said selected location;
   (III) calculating a score indicative of predicted business strength of said selected business unit in said selected location for said selected future period in accordance with said determination of said past business performance determining means; and
   (IV) storing said score in a configurator output database.

39. The method of claim 38, wherein step (II) comprises the steps of:
   (A) retrieving from an analyzer output database a positive count, a negative count, and a no change count corresponding to said selected business unit and said selected location for each of said identified weather patterns;
   (B) summing all positive counts retrieved by said count retrieving means to generate a total positive count;
   (C) summing all negative counts retrieved by said count retrieving means to generate a total negative count; and
   (D) summing all no change counts retrieved by said count retrieving means to generate a total no change count.

40. The method of claim 39, wherein step (III) comprises the steps of:
   (I) summing said total positive count, said total negative count, and said total no change count to generate a total count, called totalcount;
   (II) selecting either said total positive count, said total negative count, or said total no change count, said selected count called selectedcount;
   (III) calculating a score for said selected business unit in said selected location for said selected future period according to an equation:

$$\frac{\frac{selectedcount}{totalcount} - 0.5}{\sqrt{ABS\frac{(0.5 * (1 - 0.5))}{totalcount}}}$$

41. The method of claim 40, wherein step (III) further comprises the step of:
   setting a score for said selected business unit in said selected location for said selected future period equal to zero if said total count is equal to zero.

42. The method of claim 40, wherein step (III) further comprises the step of:
   limiting said score to values between a predetermined minimum value and a predetermined maximum value.

43. The method of claim 40, wherein step (II) comprises the step of:
   selecting the greater of either said total positive count, said total negative count, or said total no change count.

44. The method of claim 32, wherein step (4) comprises the steps of:
   (a) enabling an operator to specify parameters for a customized view; and
   (b) filtering said business history database, said weather history database, and said weather forecast database in accordance with said specified parameters to create said customized view.

45. The method of claim 44, wherein step (a) comprises the step of:
   enabling said operator to specify any combination of a time frame for evaluation, a first prior year and a second prior year for evaluation, business units for evaluation, locations for evaluation, weather patterns for evaluation, or business performance metrics for evaluation.

46. The method of claim 32, wherein step (4) comprises the step of:
   (a) displaying to users the manner in which past weather impacted business performance of selected business units in selected locations.

47. The method of claim 46, wherein step (a) comprises the steps of:
   (I) enabling a user to select one or more business units;
   (II) enabling the user to select a location;
   (III) retrieving all records from an analyzer output database corresponding to said
   selected business units and said selected location, said retrieved records representing past business performance of said business units in said location as affected by weather;
   (IV) using said retrieved records to calculate a score indicative of predicted business strength of said selected business units in said selected location; and (V) displaying said score to the user.

48. The method of claim 47, wherein each of said retrieved records includes a positive count, a negative count, and a no change count, step (a) further comprising the steps of:
- (VI) summing all positive counts in said retrieved records to generate a total positive count;
- (VII) summing all negative counts in said retrieved records to generate a total negative count; and
- (VIII) summing all no change counts in said retrieved records to generate a total no change count.

49. The method of claim 48, wherein step (IV) comprises the steps of:
- (A) summing said total positive count, said total negative count, and said total no change count to generate a total count, called a totalcount;
- (B) selecting either said total positive count, said total negative count, or said total no change count, said selected count called a selectedcount;
- (C) calculating a score for said selected business unit in said selected location for said selected future period according to an equation:

$$\frac{\frac{selectedcount}{totalcount} - 0.5}{\sqrt{ABS\frac{(0.5 * (1 - 0.5))}{totalcount}}}$$

50. The method of claim 49, wherein step (IV) further comprises the step of:
- setting a score for said selected business unit in said selected location for said selected future period equal to zero if said total count is equal to zero.

51. The method of claim 49, wherein step (IV) further comprises the step of:
- limiting said score to values between a predetermined minimum value and a predetermined maximum value.

52. The method of claim 49, wherein step (B) comprises the step of:
- selecting the greater of either said total positive count, said total negative count, or said total no change count.

53. The method of claim 46, wherein step (a) comprises the step of:
- (I) displaying to users the manner in which past weather impacted business performance of selected business units in a user-selected location.

54. The method of claim 53, wherein step (I) comprises the step of:
- (A) retrieving all records from an analyzer output database corresponding to said selected business units and said user-selected location, said retrieved records representing past business performance of said business units in said user-selected location as affected by weather;
- (B) using said retrieved records to calculate for each weather pattern represented by said retrieved records a score indicative of predicted business strength of said selected business units in said selected location in view of said each weather pattern; and
- (C) displaying to users a subset of scores calculated by said score calculating means.

55. The method of claim 54, wherein step (C) comprises the step of:
- displaying the two highest scores and the two lowest scores.

56. The method of claim 32, wherein step (4) comprises the step of:
- (a) displaying to users predicted future business performance of selected business units at selected locations in view of predicted weather at said selected locations.

57. The method of claim 56, wherein step (a) comprises the steps of:
- (I) enabling a user to select a business unit for evaluation;
- (II) enabling the user to select a location and time period for evaluation;
- (III) retrieving from a configurator output database all records corresponding to said selected business unit and said selected location, said retrieved records representing predicted future business performance of said selected business unit in said selected location for said selected time period; and
- (IV) displaying to users information contained in said retrieved records.

58. The method of claim 57 wherein step (IV) comprises the steps of:
- displaying a table having a plurality of rows and a plurality of columns, each row corresponding to a location, and each column corresponding to a future time period; and
- displaying in a row corresponding to said selected location scores contained in said retrieved records, each score corresponding to a future time period and displayed in a column of said table associated with said future time period.

59. The method of claim 32, wherein step (4) comprises the step of:
- (a) identifying and displaying any future periods where user-specified weather patterns are predicted to occur.

60. The method of claim 59, wherein step (a) comprises the steps of:
- (I) enabling a user to select a weather pattern;
- (II) enabling the user to select one or more locations;
- (III) searching through said weather history database or said weather forecast database to locate time periods where said selected weather pattern occurs; and
- (IV) displaying results of said weather search means to the user.

61. The method of claim 60 wherein step (IV) comprises the steps of:
- displaying a table having a plurality of rows and a plurality of columns, each row corresponding to a location, and each column corresponding to a future time period; and
- displaying in rows respectively corresponding to said selected locations said results of said weather search means.

62. The method of claim 32, wherein said locating and displaying step comprises the steps of:
- enabling a user to enter weather search criteria;
- enabling the user to enter one or more locations;
- searching through said weather history database or said weather forecast database to locate time periods where said weather search criteria are satisfied; and
- displaying results of said weather search means to the user.

63. A system for forecasting business performance, comprising:
- a storage device storing a business history database, a weather history database, and a weather forecast database;

an analyzer to determine the to which past business performance of a plurality of business units at a plurality of locations was affected by weather using said business history database and said weather history database;
a configurator, coupled to said analyzer, to estimate expected future business performance of said business units at said locations for a plurality of future time periods using said weather forecast database and results produced by said analyzer; and
a graphical user interface, coupled to said analyzer and said configurator, to enable users to view and manipulate results produced by said analyzer and said configurator to thereby forecast future business performance of said business units at said locations;
wherein said configurator comprises:
 means for selecting a business unit;
 means for selecting a location;
 means for selecting a future period in a future time span; and
 business perforce estimating means for estimating business performance of said selected business unit in said selected location during said selected future period in accordance with weather predicted to occur in said location during said future period;
wherein said business performance estimating means comprises:
 means for identifying weather patterns predicted to occur in said location during said future period;
 past business performance determining means for determining the manner in which said identified weather patterns have previously affected business performance if said selected business unit in said selected location;
 score calculating means for calculating a score indicative of predicted business strength of said selected business unit in said selected location for said selected further period in accordance with said determination of said past business performance determining means; and
 means for storing said in a configurator output database; wherein said past business performance determining means comprises:
 count retrieving means for retrieving from an analyzer output database a positive count, a negative count, and a no change count corresponding to said selected business unit and sad selected location for each of said identified weather patterns;
 means for summing positive counts retrieved by said count retrieving means to generate a total positive count;
 means for summing negative counts retrieved by said count retrieving means to generate a total negative count; and
 means for summing no change counts retrieved by said count retrieving means to generate a total no change count.

64. A system for forecasting business performance, comprising:
 a storage device storing a business history database, a weather history database, and a weather forecast database;
 an analyzer to determine the extent to which past business performance of a plurality of business units at a plurality of locations was affected by weather using said business history database and said weather history database;
 a configurator, coupled to said analyzer, to estimate expected future business performance of said business units at said locations for a plurality of future time periods using said weather forecast database and results produced by said analyzer; and
 a graphical user interface, coupled to said analyzer and said configurator, to enable users to view and manipulate results produced by said analyzer and said configurator to thereby forecast future business performance of said business units at said locations;
 wherein said graphical user interface comprises:
  weather impact means for displaying to users the manner in which past weather impacted business performance of selected business units in selected locations;
 wherein said weather impact means comprises:
  means for enabling a user to select one or more business units;
  means for enabling the user to select a location;
  record retrieval means for retrieving records from an analyzer output database corresponding to said selected business units and said selected location, said retrieved records representing past business performance of said business units in said location as affected by weather;
  score calculating means for using said retrieved records to calculate a score indicative of predicted business strength of said selected business units in said selected location; and
  means for displaying said score to the user;
 wherein each of said retrieved records includes a positive count, a negative count, and a no change count, said weather impact means further comprising:
  means for summing positive counts in said retrieved records to generate a total positive count;
  means for summing negative counts in said retrieved records to generate a total negative count; and
  means for summing no change counts in said retrieved records to generate a total no change count.

65. A system for forecasting business performance, comprising:
 a storage device storing a business history database, a weather history database, and a weather forecast database;
 an analyzer to determine the extent to which past business performance of a plurality of business units at a plurality of locations was affected by weather using said business history database and said weather history database;
 a configurator, coupled to said analyzer, to estimate expected future business performance of said business units at said locations for a plurality of future time periods using said weather forecast database and results produced by said analyzer; and
 a graphical user interface, coupled to said analyzer and said configurator, to enable users to view and manipulate results produced by said analyzer and said configurator to thereby forecast future business performance of said business units at said locations;
 wherein said graphical user interface comprises:
  weather impact means for displaying to users the manner in which past weather impacted business performance of selected business units in selected locations;
 wherein said weather impact means comprises:

details means for displaying to users the manner in which past weather impacted business performance of selected business units in a user-selected location;

wherein said detail s means comprises:

means for retrieving records from an analyzer output database corresponding to said selected business units and sad user-selected location, said retrieved records representing past business performance of said business units in said user-selected location as affected by weather;

score calculating means for using sad retrieved records to calculate for each weather pattern represented by said retrieved records a score indicative of predicted business strength of said selected business units in said selected location in view of said each weather pattern; and score displaying means for displaying to users a subset of scores calculated by said score calculating means;

wherein said score displaying means comprises:

means for displaying the two highest scores and the two lowest scores.

66. A system for forecasting business performance, comprising:

a storage device storing a business history database, a weather history database, and a weather forecast database;

an analyzer to determine the extent to which past business performance of a plurality of business units at a plurality of locations was affected by weather using said business history database and said weather history database;

a configurator, coupled to said analyzer, to estimate expected future business performance of said business units at said locations for a plurality of future time periods using said weather forecast database and results produced by said analyzer; and a graphical user interface, coupled to said analyzer and said configurator, to enable users to view and manipulate results produced by said analyzer and said configurator to thereby forecast future business performance of said business units at said locations;

wherein said graphical user interface comprises:

weather optimization means for displaying to users predicted future business performance of selected business its at selected locations in view of predicted weather at said selected locations;

wherein said weather optimization means comprises:

means for enabling a user to select a business unit for evaluation;

means for enabling the user to select a location for evaluation, means for retrieving from a configurator output database records corresponding to said selected business unit and said selected locations said retrieved records representing predicted future business performance of said selected business unit in said selected location; and displaying means for displaying to users information contained in said retrieved records, wherein said displaying means comprises:

table displaying means for displaying a table having a plurality of rows and a plurality of columns, each row corresponding to a business unit or location, and each column corresponding to a future time period; and score displaying means for displaying in a row corresponding to said selected business unit or location scores contained in said retrieved records, each score corresponding to a future time period and displayed in a column of said table associated with said future time period.

67. A system for foretasting business performance, comprising:

a storage device storing a business history database, a weather history database, and a weather forecast database;

an analyze to determine the extent to which past business performance of a plurality of business units at a plurality of locations was affected by weather using said business history database and said weather history database;

a configurator, coupled to said analyzer, to estimate expected future business performance of said business units at said locations for a plurality of future time periods using said weather forecast database and results produced by said analyzer; and a graphical user interface, coupled to said analyzer and said configurator, to enable users to view and manipulate results produced by said analyzer and said configurator to thereby forecast future business performance of said business units at said locations;

wherein said graphical user interface comprises:

weather pattern search means for identifying and displaying any future periods where user-specified weather patterns are predicted to occur;

wherein said weather pattern search means comprises:

means for enabling a user to select a weather pattern, means for enabling the user to select one or more locations;

weather search means for searching through said weather history database or said weather forecast database to locate time periods where said selected weather pattern occurs at said selected locations; and weather pattern displaying means for displaying results of said weather search means to the user;

wherein said weather pattern displaying means comprises:

table displaying means for displaying a table having a plurality of rows and a plurality of columns, each row corresponding to a location, and each column corresponding to a future time period; and means for displaying in rows respectively corresponding to said selected locations said results of said weather search means.

68. A method of forecasting business performance, comprising the steps of:

(1) storing in a storage device a business history database, a weather history database, and a weather forecast database;

(2) determining by an analyzer the extent to which past business performance of a plurality of business units at a plurality of locations was affected by weather using said business history database and said weather history database;

(3) estimating by a configurator expected future business performance of said business units at said locations for a plurality of fixture time periods using said weather forecast database and results produced by said analyzer; and (4) enabling users to view and manipulate results produced by said analyzer and said configurator to thereby forecast future business performance of said business units at said locations for said time periods;

wherein step (3) comprises the steps of:
  (a) selecting a business unit;
  (b) selecting a location;
  (c) selecting a future period in a future time span; and
  (d) estimating business performance of said selected business unit in said selected location during said selected future period in accordance with weather predicted to occur;
wherein step (d) comprises the steps of:
  (I) identifying weather patterns predicted to occur in said location during said future period,
  (II) determining the manner in which said identified weather patterns have previously affected business performance of said selected business unit in said selected location;
  (III) calculating a score indicative of predicted business strength of said selected business unit in said selected location for said selected future period in accordance with said determination of said past business performance determining means; and
  (IV) storing said score in a configurator output database;
wherein step (II) comprises the steps of:
  (A) retrieving from an analyzer output database a positive count, a negative count, and a no change count corresponding to said selected business unit and said selected location for each of said identified weather patterns;
  (B) summing positive counts retrieved by said count retrieving means to generate a total positive count;
  (C) summing negative counts retrieved by said count retrieving means to generate a total negative count; and
  (D) summing no change counts retrieved by said count retrieving means to generate a total no change count.

69. A method of forecasting business performance, comprising the steps of:
  (1) storing in a storage device a business history database, a weather history database, and a weather forecast database;
  (2) determining by an analyzer the extent to which past business performance of a plurality of business units at a plurality of locations was affected by weather using said business history database and said weather history database;
  (3) estimating by a configurator expected future business performance of said business units at said locations for a plurality of future time periods using said weather forecast database and results produced by said analyzer; and
  (4) enabling users to view and manipulate results produced by said analyzer and said configurator to thereby forecast future business performance of said business units at said locations for said time periods;
wherein step (4) comprises the step of:
  (a) displaying to users the manner in which past weather impacted business performance of selected business units in selected locations;
wherein step (a) comprises the steps of:
  (I) enabling a user to select one or more business units;
  (II) enabling the user to select a location;
  (III) retrieving records for an analyzer output database corresponding to said selected business units and said selected location, said retrieved records representing past business performance of said business units in said location as affected by weather, wherein each of said retrieved records includes a positive count, a negative count, and a no change count;
  (IV) using said retrieved records to calculate a score indicative of predicted business strength of said selected business units in said selected location;
  (V) displaying said score to the user;
  (VI) summing positive counts in said retrieved records to generate a total positive count;
  (VII) summing negative counts in said retrieved records to generate a total negative count; and
  (VIII) so change counts in said retrieved records to generate a total no change count.

70. A method of forecasting business performance, comprising the steps of:
  (1) storing in a storage device a business history database, a weather history database, and a weather forecast database;
  (2) determining by an analyzer the extent to which past business performance of a plurality of business units at a plurality of locations was affected by weather using said business history database and said weather history database;
  (3) estimating by a configurator expected future business performance of said business units at said locations for a plurality of future time periods using said weather forecast database and results produced by said analyzer; and
  (4) enabling users to view and manipulate results produced by said analyzer and said configurator to thereby forecast fixture business performance of said business units at said locations for said time periods;
wherein step (4) comprises the step of:
  (a) displaying to users the manner in which past weather impacted business performance of selected business units in selected locations;
wherein step (a) comprises the step of:
  (I) displaying to users the manner in which past weather impacted business performance of selected business units in a user-selected location;
wherein step (I) comprises the steps of:
  (A) retrieving records from an analyzer output database corresponding to said selected business units and said user-selected location, said retrieved records representing past business performance of said business units in said user-selected location as affected by weather;
  (B) using said retrieved records to calculate for each weather pattern represented by said retrieved records a score indicative of predicted business strength of said selected business units in said selected location in view of said each weather pattern; and
  (C) displaying to users a subset of scores calculated by said score calculating means;
wherein step (C) comprises the step of:
  displaying the two highest scores and the two lowest scores.

71. A method of forecasting business performance, comprising the steps of:
  (1) storing in a storage device a business history database, a weather history database, and a weather forecast database;
  (2) determining by an analyzer the extent to which past business performance of a plurality of business units at a plurality of locations was affected by weather using said business history database and said weather history database;

(3) estimating by a configurator expected future business performance of said business units at said locations for a plurality of future time periods using said weather forecast database and results produced by said analyzer; and
(4) enabling users to view and manipulate results produced by said analyzer and said configurator to thereby forecast future business performance of said business units at said locations for said time periods;

wherein step (4) comprises the step of:
  (a) displaying to users predicted future business performance of selected business units at selected locations in view of predicted weather at said selected locations wherein step (a) comprises the steps of:
  (I) enabling a user to select a business unit for evaluation;
  (II) enabling the user to select a location and time period for evaluation;
  (III) retrieving from a configurator output database records corresponding to said selected business unit and said selected location, said retrieved records representing predicted future business performance of said selected business unit in said selected location for said selected time period; and
  (IV) displaying to users information contained in said retrieved records;

step (IV) comprises the steps of:
  displaying a table having a plurality of rows and a plurality of columns, each row corresponding to a location, and each column corresponding to a future time period; and
  displaying in a row corresponding to said selected location scores contained in said retrieved records, each score corresponding to a future time period and displayed in a column of said table associated with said future time period.

72. A method of forecasting business performance, comprising the steps of:
  (1) storing in a storage device a business history database, a weather history database, and a weather forecast database;
  (2) determining by an analyzer the extent to which past business performance of a plurality of business units at a plurality of locations was affected by weather using said business history database and said weather history database;
  (3) estimating by a configurator expected future business performance of said business units at said locations for a plurality of future time periods using said weather forecast database and results produced by said analyzer; and
  (4) enabling users to view and manipulate results produced by said analyzer and said configurator to thereby forecast future business performance of said business units at said locations for said time periods;

wherein step (4) comprises the step of:
  (a) identifying and displaying any future periods where user-specified weather patterns are predicted to occur;

wherein step (a) comprises the steps of:
  (I) enabling a user to select a weather pattern;
  (II) enabling the user to select one or more locations;
  (III) searching through said weather history database or said weather forecast database to locate time periods where said selected weather pattern occurs; and
  (IV) displaying results of said weather search means to the user wherein step (IV) comprises the steps of:
  displaying a table having a plurality of rows and a plurality of columns, each row corresponding to a location, and each column corresponding to a future time period; and (1) storing in a storage device a business history databases a weather history database, and a weather forecast database;
(2) determining by an analyzer the extent to which past business performance of a plurality of business units at a plurality of locations was affected by weather using said business history database and said weather history database;
(3) estimating by a configurator expected future business performance of said business units at said locations for a plurality of future time periods using said weather forecast database and results produced by said analyzer; and
(4) enabling users to view and manipulate results produced by said analyzer and said configurator to thereby forecast future business performance of said business units at said locations for said time periods;

wherein step (4) comprises the step of:
  (a) identifying and displaying any future periods where user-specified weather patterns are predicted to occur;

wherein step (a) comprises the steps of:
  (I) enabling a user to select a weather pattern;
  (II) enabling the user to select one or more locations;
  (III) searching through said weather history database or said weather forecast database to locate time periods where said selected weather patter occurs; and
  (IV) displaying results of said weather search means to the user wherein step (IV) comprises the steps of:
  displaying a table having a plurality of rows and a plurality of columns, each row corresponding to a location, and each column corresponding to a future time period; and
  displaying in rows respectively corresponding to said selected locations said results of said weather search means.

* * * * *